US012783298B2

(12) United States Patent
Kim

(10) Patent No.: US 12,783,298 B2
(45) Date of Patent: Nov. 3, 2026

(54) NEURAL PROCESSING UNIT

(71) Applicant: DEEPX CO., LTD., Seongnam-si (KR)

(72) Inventor: Lok Won Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 29 days.

(21) Appl. No.: 18/625,236

(22) Filed: Apr. 3, 2024

(65) Prior Publication Data

US 2024/0264864 A1 Aug. 8, 2024

Related U.S. Application Data

(63) Continuation of application No. 17/431,152, filed as application No. PCT/KR2020/019488 on Dec. 31, 2020, now Pat. No. 11,977,916.

(30) Foreign Application Priority Data

Aug. 21, 2020 (KR) ........................ 10-2020-0105509
Aug. 25, 2020 (KR) ........................ 10-2020-0107324

(51) Int. Cl.
*G06F 9/48* (2006.01)
*G06F 15/80* (2006.01)

(52) U.S. Cl.
CPC ............ *G06F 9/4881* (2013.01); *G06F 15/80* (2013.01)

(58) Field of Classification Search
CPC ..................................................... G06F 9/4881
See application file for complete search history.

(56) References Cited

U.S. PATENT DOCUMENTS

2019/0026078 A1* 1/2019 Bannon ................... G06F 7/575
2019/0187963 A1* 6/2019 Bokhari .................... G06F 8/35
2019/0251442 A1 8/2019 Koivisto et al.
2019/0266015 A1 8/2019 Chandra et al.
2019/0279072 A1 9/2019 Gao
2019/0325295 A1 10/2019 Modha et al.
(Continued)

FOREIGN PATENT DOCUMENTS

CN 107016175 A 8/2017
CN 107491811 A 12/2017
(Continued)

OTHER PUBLICATIONS

Korean Office Action dated Oct. 30, 2024 issued on Application No. 10-2023-7022541.
(Continued)

*Primary Examiner* — Michael J Metzger
(74) *Attorney, Agent, or Firm* — WTA IP Law P.C.

(57) ABSTRACT

A neural network processing unit (NPU) includes a processing element array, a SRAM memory configured to store at least one data of the artificial neural network model processed in the processing element array; and an NPU scheduler configured to control the processing element array and the SRAM memory based on predefined operation order information of the artificial neural network model processed by the processing element array and the NPU scheduler is configured to reuse a memory address value in which an operation value of a first layer of a first scheduling is stored as a memory address value corresponding to an input data of a second layer of a second scheduling, which is a next scheduling of the first scheduling.

20 Claims, 12 Drawing Sheets

100

(56) References Cited

U.S. PATENT DOCUMENTS

| | | | | |
|---|---|---|---|---|
| 2019/0347550 | A1 | 11/2019 | Jung | |
| 2020/0042860 | A1* | 2/2020 | Sun | G06F 9/544 |
| 2020/0133725 | A1 | 4/2020 | Thomas et al. | |
| 2020/0159809 | A1* | 5/2020 | Catthoor | G06F 15/825 |
| 2020/0174748 | A1* | 6/2020 | Roberts | G06F 7/22 |
| 2020/0183837 | A1 | 6/2020 | Gu et al. | |
| 2020/0233803 | A1* | 7/2020 | Vengallur | G06N 3/045 |
| 2020/0293876 | A1 | 9/2020 | Phan | |
| 2020/0387800 | A1 | 12/2020 | Du et al. | |
| 2020/0409717 | A1* | 12/2020 | Huynh | G06F 8/4441 |
| 2020/0410327 | A1* | 12/2020 | Chinya | G06F 9/5027 |
| 2021/0174177 | A1 | 6/2021 | Yu | |

FOREIGN PATENT DOCUMENTS

| | | | |
|---|---|---|---|
| CN | 111465943 | A | 7/2020 |
| KR | 10-2011-0037184 | A | 4/2011 |
| KR | 10-2019-0030564 | A | 3/2019 |
| KR | 10-2019-0116024 | A | 10/2019 |
| KR | 10-2019-0116040 | A | 10/2019 |
| KR | 10-2019-0118635 | A | 10/2019 |
| KR | 10-2020-0002248 | A | 1/2020 |
| KR | 10-2020-0037028 | A | 4/2020 |
| KR | 10-2020-0095300 | A | 8/2020 |
| WO | 2019-128230 | A1 | 7/2019 |

OTHER PUBLICATIONS

Korean Notice of Allowance dated Oct. 30, 2024 issued on Application No. 10-2023-7022541.

Decision to grant of the Korean Patent Application No. 10-2023-7015212 (Issued Date: Mar. 28, 2025).

Decision to grant of the Korean Patent Application No. 10-2024-7008700 (Issued Date: Apr. 17, 2025).

KR Office Action dated Apr. 21, 2025 issued on Application No. 10-2024-7010033.

Office Action of the child U.S. Appl. No. 18/953,180 dated Feb. 17, 2026.

* cited by examiner

| Operation | Energy(pj) |
|---|---|
| 8b Add | 0.03 |
| 16b Add | 0.05 |
| 32b Add | 0.1 |
| 16b FP Add | 0.4 |
| 32b FP Add | 0.9 |
| 8b Mult | 0.2 |
| 32b Mult | 3.1 |
| 16b FP Mult | 1.1 |
| 32b FP Mult | 3.7 |
| 32b SRAM Read | 5 |
| 32b DRAM Read | 640 |

NEURAL PROCESSING UNIT

CROSS-REFERENCE TO RELATED APPLICATIONS

This application is a continuation application of U.S. patent application Ser. No. 17/431,152, filed on Aug. 14, 2021, which is the National Stage filing under 35 U.S.C. 371 of International Application No. PCT/KR2020/019488, filed on Dec. 31, 2020, which claims the priority of Korean Patent Application No. 10-2020-0105509 filed on Aug. 21, 2020, and Korean Patent Application No. 10-2020-0107324 filed on Aug. 25, 2020, in the Korean Intellectual Property Office, the disclosure of which is incorporated herein by reference.

BACKGROUND OF THE DISCLOSURE

Technical Field

The present disclosure relates to a neural network processing unit, and more particularly, to a low-power neural network processing unit.

Background Art

The human brain is made up of a multitude of nerve cells called neurons. Each neuron is connected to hundreds to thousands of other neurons through connections called synapses. The modeling of the working principle of biological neurons and the connection relationship between neurons operates to mimic human intelligence and is called an artificial neural network (ANN) model. In other words, an artificial neural network is a system in which nodes imitating neurons are connected in a layer structure.

These artificial neural network models are classified into “single layer neural networks” and “multilayer neural networks” according to the number of layers.

A general multilayer neural network consists of an input layer, a hidden layer, and an output layer. The input layer is a layer that receives external data, and the number of neurons in the input layer is the same as the number of input variables. At least one hidden layer is located between the input layer and the output layer, receives signals from the input layer, extracts features, and transmits them to the output layer. The output layer receives signals from at least one hidden layer and outputs them to the outside. The input signal between neurons is multiplied by each connection strength having a value between 0 and 1 and then summed. If the sum is greater than the threshold of the neuron, the neuron is activated and implemented as an output value through the activation function.

Meanwhile, in order to implement higher artificial intelligence, an increase in the number of hidden layers of an artificial neural network is called a deep neural network (DNN).

There are several types of DNNs, but a convolutional neural network (CNN) is known to be easy to extract features of input data and to understand a pattern of features.

The convolutional neural network (CNN) is a neural network that functions similar to image processing in the visual cortex of the human brain. Convolutional neural networks are known to be suitable for image processing.

Referring to FIG. 13, a convolutional neural network is configured in a form in which convolutional channels and pooling channels are repeated. In a convolutional neural network, most of the computation time is occupied by convolution operations. The convolutional neural network extracts features of an image of each channel by a kernel in the form of a matrix, and recognizes objects in a manner that provides homeostasis such as movement or distortion by pooling. In each channel, a feature map is obtained by convolution of the input data and the kernel, and then an activation function such as a rectified linear unit (ReLU) is applied to generate the activation map of the corresponding channel. After that, pooling can be applied. The neural network that actually classifies the pattern is located at the rear end of the feature extraction neural network and is called a fully connected layer. In convolutional neural networks, most operations are performed through convolution or matrix multiplication. At this time, the frequency of reading required kernels from memory is quite frequent. A significant part of the operation of such a convolutional neural network takes up time to read kernels corresponding to each channel from memory.

The memory consists of a plurality of memory cells, and each memory cell of the memory has a unique memory address. When a processor generates a read command for a kernel stored in a memory, a latency of several clocks may occur before accessing a memory cell corresponding to an address of the memory.

With the development of inferencing ability of artificial intelligence, various inference services such as sound recognition, voice recognition, image recognition, object detection, driver drowsiness detection, danger moment detection, and gesture detection using artificial intelligence are provided to various electronic devices such as an artificial intelligence speaker, a smart phone, a smart refrigerator, a VR device, an AR device, an artificial intelligence CCTV, an artificial intelligence robot vacuum cleaner, a tablet, a notebook computer, an autonomous vehicle, a biped walking robot, a quadruped walking robot, an industrial robot, and the like.

With the recent development of deep learning technology, the performance of artificial neural network inference services through big data-based learning is improving. This artificial neural network inference service iteratively learns a vast amount of training data in an artificial neural network, and infers various and complex data through the trained artificial neural network model. Accordingly, various services are provided to the above-described electronic devices using artificial neural network technology.

However, as functions and accuracy required for inference services using artificial neural networks increase, the size of data, the amount of computation, and the size of training data of the artificial neural network model are increasing exponentially. Therefore, the required performance of a processor and memory that can handle the inference operation of such an artificial neural network model is gradually increasing, and an artificial neural network inference service is actively provided in a cloud computing-based server that can easily process big data.

SUMMARY OF THE DISCLOSURE

The inventor of the present disclosure has studied a neural network processing unit (NPU) that can be applied to various electronic devices used for edge computing by using artificial neural network model technology. Edge computing refers to an edge or a periphery where computing takes place, and refers to a terminal that directly produces data or various electronic devices located close to the terminal, and edge computing may be referred to as an edge device.

To further explain, a computing system that is separated from the server of the data center in the cloud computing system, is located at the end of the cloud computing system, and communicates with the server of the data center may be defined as an edge device. Edge devices can also be used to perform tasks that must be performed immediately and reliably, such as an autonomous robot or an autonomous car, which needs to process vast amounts of data in less than 1/1,000th of a second. Thus, the field to which edge devices can be applied is rapidly increasing.

The inventor of the present disclosure attempted to provide a specialized inference function to various electronic devices to which an edge device can be applied at low-power and low cost by using an artificial neural network model technology.

The inventor of the present disclosure has recognized that artificial neural network technology that can be applied to each electronic device should also be optimized in consideration of the characteristics of each electronic device because of that the hardware performance of each of the various electronic devices is different from each other, and the performance and characteristics of the required inferencing function are also different from each other.

Accordingly, the inventor of the present disclosure has conducted research and development to develop a standalone, low-power, low-cost neural network processing unit that can be optimized for each of various electronic devices.

First, the inventor of the present disclosure recognized that it is necessary to develop an independent neural network processing unit in which processing elements optimized for inference are implemented to optimize the artificial neural network inference technology that is inherent in each electronic device and can operate independently.

That is, the inventor of the present disclosure recognized that the CPU, which can be embedded in various electronic devices, is optimized for serial computation and is not suitable for the artificial neural network computation method that processes massive amounts of data in parallel. Thus, there is a problem that the inference speed of the artificial neural network model is slowed and a lot of power is consumed. Further, since various tasks other than artificial neural network model inference must be performed, there is a problem in stably providing artificial neural network model inference calculation in real time.

That is, the inventor of the present disclosure recognized that the graphic processing unit (GPU), which can be embedded in various electronic devices, is optimized for image processing, and is more advantageous for artificial neural network model inference than the central processing unit. However, since the GPU is not optimized for artificial neural network model inference, the power consumption is too large, and the manufacturing cost is high. Thus, it is recognized that there is a cost problem to be applied to various electronic devices.

That is, if inference service of an artificial neural network model is provided to various electronic devices without a neural network processing unit implemented with an optimized artificial neural network inference processing element, efficiency problems exist in terms of power consumption, heat generation, memory, processing speed, and cost.

Accordingly, the inventor of the present disclosure recognized that most electronic devices have difficulty in embedding artificial neural network model inference technology due to problems such as power consumption, heat generation, memory, processing speed, and cost. Thus, it was recognized that it was necessary to develop a neural network processing unit capable of improving such things.

Accordingly, a problem to be solved by the present disclosure is to provide a standalone low-power low-cost neural network processing unit capable of improving the above-described problems.

In addition, the inventor of the present disclosure has studied a neuromorphic analog artificial neural network integrated circuit that mimics the human brain. These neuromorphic integrated circuits are an analog multiplier array composed of NOR logic, which have the advantages of being able to be implemented with two simple transistors and of providing an inference function using analog voltage with low-power, but which were vulnerable to various noises which is a problem. That is, the inventor of the present disclosure has recognized the problem that the analog artificial neural network inference result is inaccurate because the neuromorphic integrated circuit is affected by temperature, humidity, electromagnetic interference (EMI) of the surrounding circuit, coupling effect, parasitic capacitance, and the like. In addition, it is recognized that an analog-to-digital converter (ADC) that converts analog signals to digital signals must be provided for each output channel of the analog multiplier array, and it has also been recognized that since the area occupied by such an analog-to-digital conversion circuit is quite large, it is quite difficult to develop a compact neuromorphic integrated circuit when the analog-to-digital conversion circuit is embedded.

Accordingly, another problem to be solved by the present disclosure is to provide a standalone, low-power, low-cost neural network processing unit, including processing elements implemented in digital form rather than analog, that can improve the above-described problems.

Next, the inventor of the present disclosure has recognized the need for a standalone, low-power, low-cost neural network processing unit capable of efficiently performing at least one specialized artificial neural network model inference.

That is, the inventor of the present disclosure recognized that there is a need for an independent, low-power, low-cost neural network processing unit configured to efficiently perform not only the aforementioned artificial neural network model inference operation specialized for one specific function, but also a plurality of different artificial neural network model inference operations specialized for different functions. In other words, it was recognized that it was necessary to optimize the limited resources of the neural network processing unit and minimize power consumption.

For example, it was recognized that it was necessary to optimize the resources of the neural network processing unit and minimize power consumption at the same time in a such way that a portion of the processing elements of the neural network processing unit that can be embedded in various electronic devices are allocated to the inference operation of the first artificial neural network model, and another portion is allocated to the inference operation of the second artificial neural network model, and the remainder is stopped. That is, it was also recognized that the neural network processing unit needs a neural network processing unit configured to perform speech recognition inference and gesture inference, or infer different image data input from a plurality of cameras.

Accordingly, another problem to be solved by the present disclosure is to provide a neural network processing unit capable of inferring at least one specialized artificial neural network model capable of improving the above-described problems and reducing power consumption.

Furthermore, the inventor of the present disclosure has recognized that the data size of the trained artificial neural network model must be minimized in order to implement a standalone, low-power, low-cost neural network processing unit.

For example, each trained artificial neural network model can provide each specialized inference function. At this time, each trained artificial neural network model may have a significant amount of weight data, input data, and operation values. The operation value may be referred to as node data or feature map data.

As a specific example, the size of the weight data of the artificial neural network model having the VGG16 deep learning architecture, in which the inventor of the present disclosure has trained to recognize thirty specific keywords of speech, was 550 MB. For another example, the size of image data of cameras for autonomous driving that must be processed for one hour for autonomous driving of an autonomous vehicle may be three terabytes or more. In this case, the inventor of the present disclosure has recognized the problem that the memory size of the neural network processing unit and the number of processing elements must be increased exponentially in order to calculate a vast amount of artificial neural network model inference. In addition, the inventor of the present disclosure has recognized the problems of increased power consumption, increased heat generation, and reduced operation speed as the weight data size of the artificial neural network model increases, leading to increases in the physical size of the neural network processing unit due to the integration limitation of the semiconductor, such that there is a demand for increasing the number of processing elements and the size of memory.

Furthermore, the inventor of the present disclosure has recognized that in order to implement a standalone low-power low-cost neural network processing unit, the number of operation bits of a plurality of processing elements must be adjustable. That is, it is recognized that it is necessary to reduce the amount of computation and power consumption while minimizing the deterioration of inference accuracy such that the operation of a specific layer of a specific artificial neural network model may set to be an 8-bit operation and the operation of the other layers may set to be a 2-bit operation.

Accordingly, another problem to be solved by the present disclosure is to provide a lightened artificial neural network model capable of improving the above-described problems, and to provide a neural network processing unit and the operation method thereof configured to calculate a lightened artificial neural network model.

Accordingly, another problem to be solved by the present disclosure is to provide a neural network processing unit and the operation method thereof configured to use minimum power and memory by reducing weight of artificial neural network models under optimal conditions so that specific functions can be inferred with more than a predetermined accuracy.

Accordingly, another problem to be solved by the present disclosure is to provide a neural network processing unit and the operation method thereof including an artificial neural network model in which the number of bits of weight data, input data, or operation value of at least one layer is reduced by considering at least one of inference accuracy, computational amount, memory, and power consumption for each layer of the trained artificial neural network model.

Accordingly, another problem to be solved by the present disclosure is to provide a neural network processing unit including an artificial neural network model in which the number of bits of weight data, input data, or operation values of at least one layer is reduced by setting a relative priority among conditions when considering at least one of inference accuracy, computational amount, memory, and power consumption for each layer of the trained artificial neural network model.

Accordingly, another problem to be solved by the present disclosure is to provide a method of lightening an artificial neural network model so that the power consumption of the neural network processing unit is less than or equal to the target power consumption by setting the target power consumption of the neural network processing unit.

Accordingly, another problem to be solved by the present disclosure is to provide a method of lightening an artificial neural network model so that the inference speed of the neural network processing unit is greater than or equal to the target inference speed by setting the target inference speed of the neural network processing unit.

Accordingly, another problem to be solved by the present disclosure is to provide a method of setting a memory size of a neural network processing unit to reduce weight of an artificial neural network model in which memory usage is efficient when inferring a neural network processing unit.

Accordingly, another problem to be solved by the present disclosure is to provide a method of lightening the artificial neural network model so that the amount of computation is reduced when the neural network processing unit performs an inference operation by setting the maximum MAC limit for one inference of the neural network processing unit.

Accordingly, another problem to be solved by the present disclosure is to provide a neural network processing unit configured to optimize the number of bits of values of a plurality of processing elements for each layer in consideration of the characteristics of each layer of an artificial neural network model applied to the neural network processing unit.

Accordingly, another problem to be solved by the present disclosure is to provide a neural network processing unit configured such that the number of bits of values of a plurality of processing elements is less than or equal to the number of bits of weight data of a lightened artificial neural network model.

Next, the inventor of the present disclosure has recognized that various problems arise when providing a cloud-type artificial intelligence inference recognition function configured to always operate in various electronic devices.

For example, when a driver's voice recognition service applied to a vehicle is provided in a cloud method, the response speed may be slow depending on the state of the cloud server. Thus, depending on the state of the communication network, the service may not be provided, which is a problem.

For example, when only a cloud-type voice recognition function is provided to the electronic device, the electronic device may be connected to a cloud-type artificial intelligence voice recognition service through a communication network to receive the voice recognition function. That is, when only cloud-based voice recognition inference functions are always provided to an electronic device, the electronic device must be connected in real time with a cloud artificial intelligence voice recognition service based on big data. This connection method is inefficient. To further explain, almost all of the acoustic data transmitted by the electronic device through the communication network for a 24-hour period may be ambient noise. In addition, the noise data transmitted in this way increases the traffic of the communication network, wastes unnecessary power, and may cause a problem of delaying the response speed of the cloud artificial intelligence speech recognition service by delivering unnecessary queries to the server. In particular, if the response speed of voice recognition is delayed, user satisfaction with voice recognition may be degraded. In particular, battery-operated electronic devices also have a problem in that the operation time of the electronic device may be significantly reduced due to unnecessary power consumption.

Accordingly, another problem to be solved by the present disclosure is to provide a neural network processing unit and an artificial neural network model corresponding thereto capable of controlling the power consumption of electronic devices that is wasted unnecessary through the neural network processing unit, which recognize the user's voice command or keyword, control the functions of the electronic device according to recognized voice commands or keywords, or control power of specific elements of the corresponding electronic device.

Accordingly, another problem to be solved by the present disclosure is to provide a low-power, low-cost neural network processing unit in which a lightened AI speech recognition model is embedded in consideration of the processing capability of the neural network processing unit.

Accordingly, another problem to be solved by the present disclosure is to provide a low-power, low-cost neural network processing unit in which a lightened AI acoustic recognition model is embedded in consideration of the processing capability of the neural network processing unit.

Accordingly, another problem to be solved by the present disclosure is to provide a low-power, low-cost neural network processing unit in which a lightened AI keyword recognition model is embedded in consideration of the processing capability of the neural network processing unit.

Accordingly, another problem to be solved by the present disclosure is to provide a low-power, low-cost neural network processing unit in which a lightened AI event recognition model is embedded in consideration of the processing capability of the neural network processing unit.

Accordingly, another problem to be solved by the present disclosure is to provide a neural network processing unit with a plurality of artificial neural network models among the AI speech recognition model, AI acoustic recognition model, AI keyword recognition model, and AI event recognition model which are lightened in consideration of the processing power of the neural network processing unit and to provide a method of allocating processing elements and memory resources of a neural network processing unit so that the neural network processing unit infers at least a plurality of artificial neural network models simultaneously.

Accordingly, another problem to be solved by the present disclosure is to dramatically reduce unnecessary communication network traffic, to reduce unnecessary power consumption, and to reduce unnecessary queries by providing an electronic device with a lightened AI keyword recognition model and a neural network processing unit configured to control the power mode of the electronic device according to the keyword recognition of the artificial neural network model, and to connect an electronic device with a cloud artificial intelligence speech recognition service through a communication network.

Next, the inventor of the present disclosure has paid attention to a convolutional neural network in order to increase the accuracy of keyword recognition. Compared with the recurrent neural network or LSTM neural network used for speech recognition, the convolutional neural network has the advantage of providing relatively excellent accuracy in inferring the image similarity, although the ability to infer the continuity of words is relatively insufficient. Furthermore, the inventor of the present disclosure researched a technology capable of converting audio data of a keyword into an image and, specifically, a technology of converting audio data corresponding to a specific keyword into a two-dimensional image.

Accordingly, another problem to be solved by the present disclosure is to provide a neural network processing unit in which an AI keyword image recognition model trained to recognize an imaged keyword is embedded.

Next, the inventor of the present disclosure recognized that in order to increase the accuracy of keyword recognition, the recognition rate of the AI keyword recognition model can be improved when the training data of the AI keyword recognition model is generated in consideration of the learning characteristics of the AI keyword recognition model.

Accordingly, another problem to be solved by the present disclosure is to provide training data of an AI keyword image recognition model that has been trained to recognize imaged keywords.

The problems of the present disclosure are not limited to the problems mentioned above, and other problems that are not mentioned will be clearly understood by those skilled in the art from the following description.

The neural network processing unit according to an embodiment of the present disclosure may include a processing element array, a SRAM memory configured to store at least one data of the artificial neural network model processed in the processing element array; and an NPU scheduler configured to control the processing element array and the SRAM memory based on predefined operation order information of the artificial neural network model processed by the processing element array and the NPU scheduler is configured to reuse a memory address value in which an operation value of a first layer of a first scheduling is stored as a memory address value corresponding to an input data of a second layer of a second scheduling, which is a next scheduling of the first scheduling.

The processing element array may include a plurality of processing elements configured to perform MAC operations.

The NPU scheduler may be configured to control a read and write order of the processing element array and the SRAM memory.

The NPU scheduler may be configured to control the processing element array and the SRAM memory by analyzing predefined operation order information of the artificial neural network model.

The NPU scheduler may be configured to access a memory address value where a node data and a weight data of layers of the artificial neural network model are stored based on a predefined operation order information of the artificial neural network model.

The NPU scheduler is configured to schedule a processing order based on a structural data from an input layer to an output layer of the artificial neural network or an artificial neural network data locality information.

The NPU scheduler may be configured to schedule an operation sequence of a plurality of processing elements included in the processing element array based on the arrangement structure data of layers of the artificial neural network model among the artificial neural network model structure data.

The SRAM memory may include static memory.

The SRAM memory may include at least one of SRAM, MRAM, STT-MRAM, eMRAM, HBM, and OST-MRAM.

A neural network processing unit (NPU) for processing an artificial neural network model compiled by a compiler comprising a processing element array, a SRAM memory configured to store the artificial neural network model processed in the processing element array; and an NPU scheduler configured to control the processing element array and the SRAM memory based on predefined operation order information of the artificial neural network model processed by the processing element array, wherein the processing element array is configured to perform MAC operation, and the processing element array is configured to quantize and output the MAC operation result.

The processing element array may include a multiplier, an adder, an accumulator, and a bit quantization unit.

The NPU scheduler may be configured to recognize reusable variable values and reusable constant values based on predefined operation order information of the artificial neural network model and configured to control to reuse the SRAM memory using the reusable variable value and the reusable constant value.

A neural network processing unit (NPU) for processing an artificial neural network model compiled by a compiler comprising, a processing element array; a SRAM memory configured to store at least one data of the artificial neural network model processed in the processing element array; and an NPU scheduler configured to control the processing element array and the SRAM memory based on predefined operation order information of the artificial neural network model processed by the processing element array, wherein the NPU scheduler is configured to improve a reuse rate of the SRAM memory by utilizing a scheduling order based on predefined operation order information of the artificial neural network model The artificial neural network model may be configured to schedule a processing sequence based on a structure of layers of an artificial neural network and operation sequence data corresponding to the structure.

The NPU scheduler may be configured to schedule the processing sequence based on the structure data from the input layer to the output layer of the artificial neural network or the artificial neural network data locality information of the artificial neural network model.

The NPU scheduler may be configured to improve a memory reuse rate by controlling the NPU memory system by using a scheduling sequence based on the artificial neural network model structure data or the artificial neural network data locality information.

The NPU scheduler may be configured to reuse a memory address value in which the first operation value of the first scheduling is stored as a memory address value corresponding to the node data of the second layer of the second scheduling, which is the next scheduling from the first scheduling.

The NPU scheduler may be configured to reuse the value of the memory address in which the operation result is stored for a subsequent operation.

The NPU memory system may include a static memory.

The NPU memory system may include at least one of SRAM, MRAM, STT-MRAM, eMRAM, HBM, and OST-MRAM.

The edge device according to an embodiment of the present disclosure may be configured to include a central processing unit; a main memory system configured to store an artificial neural network model; a system bus that controls communication between the central processing unit and the main memory system; and a neural network processing unit comprising a processing element array, an NPU memory system, an NPU scheduler configured to control the processing element array and the NPU memory system, and an NPU interface. The NPU interface may be configured to communicate with the central processing unit through the system bus, and the NPU interface may be configured to directly communicate data related to the artificial neural network model with the main memory system.

The edge device may be one of a mobile phone, a smart phone, an artificial intelligence speaker, a digital broadcasting terminal, a navigation device, a wearable device, a smart watch, a smart refrigerator, a smart television, digital signage, a VR device, an AR device, an artificial intelligence CCTV, an artificial intelligence robot vacuum cleaner, a tablet, a laptop computer, an autonomous vehicle, an autonomous drone, an autonomous biped walking robot, an autonomous quadruped robot, a device using an autonomous driving mobility service, an artificial intelligence robot, a PDA, and a PMP.

The NPU memory system of the neural network processing unit may be configured such that a read/write speed of an inference operation of an artificial neural network model is faster than and consumes less power than the main memory system.

The neural network processing unit may be configured to improve a memory reuse rate of the NPU memory system based on the artificial neural network model structure data or the artificial neural network data locality information.

The neural network processing unit may be configured to acquire data of at least one of a number of memories, a memory type, a data transmission speed, and a memory size of the main memory system.

The neural network processing unit may be configured to control the reuse of data stored in the NPU memory system based on the artificial neural network model structure data or the artificial neural network data locality information, and may be configured to not request memory access to the main memory system when data is reused.

The NPU memory system may not include DRAM, and the NPU memory system may include static memory configured to have faster read and write speeds than and to consume less power than the main memory system.

The NPU memory system may be configured to control scheduling by comparing the data size of the artificial neural network model to be loaded from the main memory system and the memory size of the NPU memory system.

The neural network processing unit according to another embodiment of the present disclosure may be configured to include a processing element array, an NPU memory system configured to store an artificial neural network model processed in the processing element array, and an NPU scheduler configured to control the processing element array and the NPU memory system based on the artificial neural network model structure data or artificial neural network data locality information. The processing element array may be configured to perform a MAC operation, and the processing element array may be configured to quantize and output the MAC operation result.

A first input of each processing element of the processing element array may be configured to receive a variable value, and a second input of each processing element of the processing element array may be configured to receive a constant value.

The processing element may be configured to include a multiplier, an adder, an accumulator, and a bit quantization unit.

The NPU scheduler may be configured to recognize a reusable variable value and a reusable constant value based on the artificial neural network model structure data or the artificial neural network data locality information and to control the NPU memory system to reuse memory using the reusable variable values and the reusable constant values.

The NPU scheduler may be configured to reduce the number of bits of an operation value of the processing element array in consideration of MAC operation characteristics and power consumption characteristics of the processing element array.

The NPU memory system may be a low-power memory system configured to reuse a specific memory address in which weight data is stored in consideration of the data size and operation steps of the artificial neural network model.

The NPU scheduler stores the MAC operation value of the artificial neural network model according to the scheduling order in a specific memory address of the NPU memory system, and the specific memory address in which the MAC operation value is stored may be input data of the MAC operation in the next scheduling order.

The NPU system memory may be configured to preserve weight data of networks stored in the NPU system memory while the inference operation continues.

The number of updates at a memory address in which input data of the first input unit of each processing element of the processing element array is stored may be greater than the number of updates at a memory address in which input data of the second input unit is stored.

The NPU system memory may be configured to reuse the MAC operation value stored in the NPU system memory while the inference operation continues.

A neural network processing unit according to another embodiment of the present disclosure may include a processing element array comprising a plurality of processing elements and a plurality of register files, a NPU memory system configured to store the artificial neural network model processed in the processing element array, and an NPU scheduler configured to control the processing element array and the NPU memory system based on the artificial neural network model's structure data or artificial neural network data locality information.

The memory size of each of the plurality of register files is smaller than the memory size of the NPU memory system, and the maximum transmission speed of each of the plurality of register files may be higher than the maximum transmission speed of the NPU memory system.

The memory size of each of the plurality of register files may be configured to have a memory size having a maximum transmission speed that is faster than the memory size of the NPU memory system.

The memory size of each of the plurality of register files is smaller than the memory size of the NPU memory system, and the power consumption based on the same transmission speed of each of the plurality of register files may be lower than the power consumption based on the same transmission speed of the NPU memory system.

The memory size of each of the plurality of register files may be configured to have a memory size that is smaller in terms of power consumption based on the same transmission speed than the memory size of the NPU memory system.

Each of the plurality of register files may be configured as a memory having a higher maximum transmission speed than the NPU memory system and a smaller amount of power consumption based on the same transmission speed.

The NPU memory system may further include a first memory, a second memory, and a third memory having a hierarchical structure. The NPU scheduler may be configured to improve the memory reuse rate of the NPU memory system by controlling the first memory, the second memory, and the third memory of the NPU memory system according to the hierarchical structure, based on the artificial neural network model structure data or the artificial neural network data locality information running in the neural network processing unit.

The first memory may be configured to communicate with the second memory and the third memory, and the second memory and the third memory may be configured to communicate with a plurality of processing elements and a plurality of register files.

The NPU memory system may be configured to have a plurality of memory hierarchical structures optimized for memory reuse.

The NPU scheduler may be configured to determine the size of data for each scheduling sequence, and to sequentially store data for each scheduling sequence within an available limit of the first memory.

The NPU scheduler may be configured to selectively store a portion of the data stored in the first memory in one of the second memory and the third memory by comparing the memory reuse rate.

A memory reuse rate of data stored in the second memory may be higher than a memory reuse rate of data stored in the third memory.

The NPU scheduler may be configured to delete redundant data in the first memory when the characteristic data is stored in the second memory.

Data stored in the third memory may be configured to have variable characteristics that can be reused.

An edge device according to another embodiment of the present disclosure may include a microphone configured to detect acoustic data, a camera configured to detect image data, and a neural network processing unit configured to perform at least two different inference operations, wherein the neural network processing unit may be configured to drive an AI keyword recognition model trained to infer keywords based on acoustic data, and wherein the neural network processing unit may be configured to drive an AI gesture recognition model trained to infer a gesture based on image data in response to the keyword inference result.

The edge device further includes a central processing unit, wherein the central processing unit may generate a command to enter the first mode when there is no input for a predetermined period of time. The power control unit may be configured to supply power to the microphone and cut-off power to the camera in the first mode.

The neural network processing unit may be configured to stop the inference operation of the AI gesture recognition model in the first mode.

The central processing unit may be configured to receive the inference result of the AI keyword recognition model of the neural network processing unit and generate a command to enter the second mode. The power control unit may be configured to supply power to the camera in the second mode.

The neural network processing unit may be configured to perform an inference operation of the AI gesture recognition model in the second mode.

The neural network processing unit may be a standalone neural network processing unit.

Image data and sound data including privacy data may be configured to be deleted after an inference operation by a neural network processing unit.

In the first mode, when a specific keyword is input to the microphone, the AI gesture recognition model may be driven in response to an inference result of the AI keyword recognition model of the neural network processing unit.

An edge device according to another embodiment of the present disclosure may include an input unit configured to provide a plurality of sensing data, and a neural network processing unit configured to drive a plurality of artificial neural network models, wherein among the plurality of artificial neural network models, the first artificial neural network model may be an artificial neural network model that operates at all times, and the second artificial neural network model among the plurality of artificial neural network models may be an artificial neural network model configured to operate only under a preset condition.

The second artificial neural network model may be configured to be controlled whether to be driven or not according to the inference result of the first artificial neural network model.

The neural network processing unit further includes an NPU scheduler, and the NPU scheduler may be configured to determine a scheduling sequence based on structure data of a plurality of artificial neural network models or artificial neural network data locality information.

The neural network processing unit further includes a plurality of processing elements, wherein the NPU scheduler may be configured to determine the scheduling sequence based on the data size of the node data of each layer of the plurality of artificial neural network models and the weight of each network, and the structure data of the plurality of artificial neural network models or artificial neural network data locality information, and to allocate the processing elements according to the determined scheduling sequence.

The neural network processing unit further includes an NPU memory system, and the NPU scheduler may be configured to prioritize data stored in the NPU memory system.

The neural network processing unit (NPU) according to another embodiment of the present disclosure may include a processing element array, an NPU memory system configured to store an artificial neural network model processed in the processing element array, an NPU scheduler configured to control the processing element array and the NPU memory system, and an NPU batch mode configured to infer a plurality of different input data using an artificial neural network model.

A plurality of different input data may be a plurality of image data.

The NPU batch mode may be configured to increase an operation frame by combining a plurality of image data.

The NPU batch mode may be configured to recycle weight data of an artificial neural network model to perform an inference operation on a plurality of different input data.

The NPU batch mode may be configured to convert a plurality of input data into one continuous data.

The neural network processing unit (NPU) according to another embodiment of the present disclosure may include at least one processing element, an NPU memory system capable of storing an artificial neural network model that can be inferred by at least one processing element, and an NPU scheduler configured to control at least one processing element and an NPU memory system based on the artificial neural network model's structure data or artificial neural network data locality information.

The NPU scheduler may be configured to further receive structure data of the neural network processing unit.

The structure data of the neural network processing unit may include at least one of a memory size of an NPU memory system, a hierarchical structure of an NPU memory system, data on the number of at least one processing element, and an operator structure of at least one processing element.

The neural network processing unit includes an artificial neural network model trained to perform inference function; an array of processing elements configured to infer input data using the artificial neural network model; an NPU memory system configured to communicate with the processing element array; and an NPU scheduler configured to control the processing element array and the NPU memory system. The NPU compares the data size of the artificial neural network model with the memory size of the NPU memory system. The artificial neural network model may be configured to be optimized in consideration of the memory size of the NPU memory system by at least one of a quantization algorithm, a pruning algorithm, a relearning algorithm, a quantization recognition learning algorithm, a model compression algorithm, and an artificial intelligence-based optimization algorithm.

The artificial neural network model may be optimized for the neural network processing unit through an optimization system configured to communicate with the neural network processing unit.

The artificial neural network model may be optimized based on at least one of the artificial neural network model structure data or artificial neural network data locality information and the structure data of the processing unit.

In the artificial neural network model, a quantization algorithm can be applied after the pruning algorithm is applied.

In the artificial neural network model, after the pruning algorithm is applied, the quantization algorithm can be applied and then the relearning algorithm can be applied.

In the artificial neural network model, after the pruning algorithm is applied, the quantization algorithm is applied, after which the relearning algorithm is applied, and then a model compression algorithm can be applied.

The artificial neural network model includes a plurality of layers, each of the plurality of layers includes weight data, and each of the weight data may be pruned.

Among the weight data, one or more weight data having a relatively large data size may be preferentially pruned.

Among the weight data, one or more weight data having a relatively large computation amount may be preferentially pruned.

The artificial neural network model includes a plurality of layers, each of the plurality of layers includes node data and weight data, and the weight data may be quantized.

Node data can be quantized.

Node data and weight data of at least one layer may be quantized, respectively.

Among the weight data, one or more weight data having a relatively large size may be quantized with priority.

At least one node data having a relatively large size among the node data may be preferentially quantized.

The processing element array includes at least one processing element, and the at least one processing element may be configured to compute node data and weight data, each quantized in number of bits.

The processing element array further includes a bit quantization unit, and the number of bits of the output data of the processing element array may be configured to be quantized by the bit quantization unit.

The artificial neural network model is a quantized artificial neural network model, and the NPU memory system may be configured to store data of the artificial neural network model corresponding to the number of bits of the plurality of quantized weight data and the number of bits of the plurality of quantized node data of the artificial neural network model.

The artificial neural network model is a quantized artificial neural network model, and the processing element array may be configured to receive a plurality of quantized weight data and a plurality of quantized node data from the NPU memory system in response to the number of bits of the plurality of quantized weight data and the number of bits of the plurality of quantized node data of the artificial neural network model.

The neural network processing unit includes an artificial neural network model, a plurality of processing elements configured to process the artificial neural network model, an NPU memory system configured to supply data of the artificial neural network model to the processing element array, and an NPU scheduler configured to control the processing element array and the NPU memory system. The artificial neural network model may be quantized by at least one grouping policy.

The at least one grouping policy may use at least one of the operation sequence of the artificial neural network model, the size of the computational amount of the artificial neural network model, and the size of memory usage of the artificial neural network model as the criterion for determining the at least one grouping policy.

At least one grouping policy is a plurality of grouping policies, and each of the plurality of grouping policies may determine an order of the grouping policies according to respective weight values.

Neural network processing unit, in which the artificial neural network model is quantized in an order according to at least one grouping policy having a predetermined order of grouped data.

In the artificial neural network model, a quantization recognition learning algorithm can be applied.

When the artificial neural network model is quantized according to the grouping policy, it can be quantized with reference to the inference accuracy of the artificial neural network model including the data group being quantized.

In the artificial neural network model, when the evaluated inference accuracy of the artificial neural network model including the data group being quantized is higher than the preset target inference accuracy, the number of bits of the artificial neural network model including the data group being quantized may be reduced.

In the artificial neural network model, if the evaluated inference accuracy of the artificial neural network model including the data group being quantized is less than the preset target inference accuracy, the quantization can be terminated by returning the data group being quantized to the moment when the target inference accuracy was high.

The neural network processing unit further includes an edge device connected to the neural network processing unit, and the artificial neural network model may be quantized according to the grouping policy order determined based on at least one data of the processing power of edge devices, the computational processing power of the neural network processing unit, the available memory bandwidth of the edge device, the available memory bandwidth of the neural network processing unit, the maximum memory bandwidth of the edge device, the maximum memory bandwidth of the neural network processing unit, the maximum memory latency of the edge device, and the maximum memory latency of the neural network processing unit.

The neural network processing unit includes an artificial neural network model, a plurality of processing elements configured to process the artificial neural network model, an NPU memory system configured to supply data of the artificial neural network model to the processing element array, and an NPU scheduler configured to control the processing element array and the NPU memory system, wherein the artificial neural network model may quantize node data of at least one layer or weight data of at least one layer of the artificial neural network model based on the memory size of the NPU memory system.

The NPU memory system may be configured to store the data of the quantized number of bits of each of node data of at least one layer or weight data of at least one layer of the artificial neural network model.

The number of bits of data input to each input unit of the plurality of processing elements may be configured to operate in correspondence with information about the number of bits of the quantized input data.

The edge device includes a main memory system and a neural network processing unit configured to communicate with the main memory system. The neural network processing unit includes a processing element array; an NPU memory system; a processing element array; and an NPU scheduler configured to control the NPU memory system, and quantized node data, quantized weight data, quantized weight kernel, and/or quantized feature map of artificial neural network model stored in main memory system. The NPU memory system may be quantized with reference to the memory size of the main memory system and the memory size of the NPU memory system.

According to the examples of the present disclosure, there is an effect of providing a standalone, low-power, low-cost neural network processing unit.

According to examples of the present disclosure, by providing a neural network processing unit, there is an effect of reducing power consumption, heat generation, memory size, operation processing speed, and manufacturing cost of an edge device.

According to the examples of the present disclosure, there is an effect of providing a standalone low-power, low-cost neural network processing unit including digitally implemented processing elements.

The effects according to the present disclosure are not limited by the contents exemplified above, and more various effects are included in the present specification.

DETAILED DESCRIPTION OF THE DISCLOSURE

Figure 1:
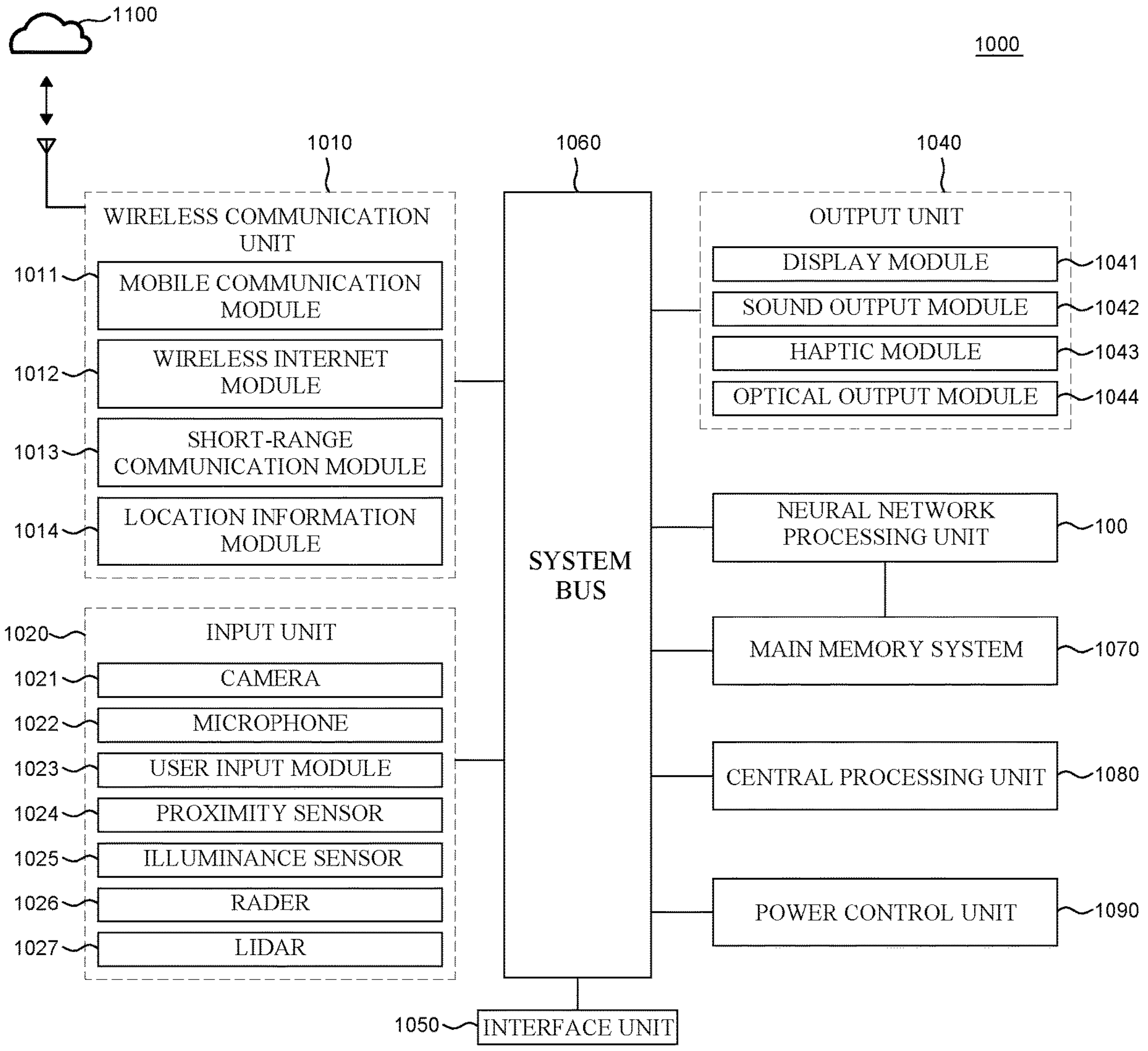
FIG. 1 is a schematic conceptual diagram for illustrating variously modified edge devices including a neural network processing unit applicable to embodiments of the present disclosure.

Advantages and features of the present disclosure, and a method of achieving them will become apparent with reference to various embodiments described below in detail with reference to the accompanying drawings. However, the present disclosure is not limited to the embodiments described below and may be implemented in various forms different from each other. The embodiments of the present disclosure are merely provided to completely inform the scope of the invention to those of ordinary skill in the art to which the present disclosure belongs, and the present invention is only defined by the scope of the claims.

A detailed description of the present disclosure may be described with reference to the drawings for convenience of description as an example of a specific embodiment in which the present disclosure may be practiced. Although elements of the various embodiments of the present disclosure are different from each other, a manufacturing method, an operation method, an algorithm, a shape, a process, a structure, and a characteristic described in a specific embodiment may be combined with or included with other embodiments. Further, the location or arrangement of individual components within each disclosed embodiment may be changed without departing from the spirit and scope of the present disclosure. Each feature of the various embodiments of the present disclosure may be partially or wholly combined or combined with each other, as those skilled in the art can fully understand, technically, various interlocking and driving are possible, and each of the embodiments may be implemented independently of each other or may be implemented together in a related relationship.

Since the shapes, sizes, ratios, angles, numbers, and the like disclosed in the drawings for describing the embodiments of the present disclosure are exemplary, the present disclosure refers to the drawings, but is not limited thereto. The same reference numerals refer to the same elements throughout the specification. Further, in describing the present disclosure, if it is determined that a detailed description of a related known technology may unnecessarily obscure the subject matter of the present disclosure, the detailed description may be omitted. In case of "include," "have," and "consist of" mentioned in the present specification, other elements may be added unless "only" is used. In the case of expressing the constituent elements in the singular, it includes the case of including the plural unless specifically stated otherwise. In the case of expressing an element in the singular, it includes the case of including the plural unless specifically stated otherwise. In interpreting the elements, it is interpreted as including a tolerance range even if there is no explicit description. In the case of a description of the positional relationship, for example, when the positional relationship of the two elements is described as "on," "on the upper portion," "under," "next to," or "adjacent to," one or more other elements may be located between the two elements unless "immediately" or "directly" is used. When an element or layer is referred to as "on" another element or layer, it includes all cases in which another layer or another element is interposed directly on or another layer or another element is interposed therebetween.

FIG. 1 is a schematic conceptual diagram illustrating an edge device that can be implemented with various modifications including a neural network processing unit that can be applied to embodiments of the present disclosure.

Referring to FIG. 1, an edge device 1000 illustrates an example of various electronic devices that may be variously modified.

The edge device 1000 may include an artificial neural network and may be, for example, a mobile phone, a smart phone, an artificial intelligence speaker, a digital broadcasting terminal, a navigation device, a wearable device, a smart watch, a smart refrigerator, a smart television, digital signage, a VR device, an AR device, an AI CCTV, an AI robot vacuum cleaner, a tablet, a laptop computer, an autonomous car, an autonomous drone, an autonomous bipedal robot, an autonomous quadrupedal robot, a device using an autonomous driving mobility service, an artificial intelligence robot, a personal digital assistant (PDA), a personal multimedia player (PMP), or the like.

The edge device 1000 includes the neural network processing unit 100 and may refer to various electronic devices that can be utilized for edge computing by using an artificial neural network model inferred by the neural network processing unit 100. Here, edge computing means computing where an edge or a periphery occurs, and may refer to a terminal that directly produces data or various electronic devices located close to the terminal. The neural network processing unit 100 may also be referred to as a neural processing unit (NPU).

However, the edge device 1000 according to embodiments of the present disclosure is not limited to the above-described electronic devices.

FIG. 1 is merely an embodiment of the edge device 1000 and illustrates various elements that the edge device 1000 may include. However, embodiments according to the present disclosure are not limited thereto, and each element may be selectively included or excluded according to the purpose and configuration of the embodiment. That is, some of the elements illustrated in FIG. 1 may not be essential elements in some cases, and each embodiment preferably includes or does not include some of the elements illustrated in FIG. 1 from the viewpoint of optimization.

The edge device 1000 includes at least a neural network processing unit 100, and may be configured to selectively further include at least a portion of wireless communication unit 1010, input unit 1020, sensing unit 1030, output unit 1040, interface unit 1050, system bus 1060, main memory system 1070, central processing unit 1080, and power control unit 1090. Also, the edge device 1000 may be configured to communicate with the cloud artificial intelligence service 1100 through the wireless communication unit 1010.

The system bus 1060 is configured to control data communication of respective elements of the edge device 1000. That is, the system bus 1060 is a data transportation system of the edge device 1000. The system bus 1060 may be referred to as a computer bus. All elements of the edge device 1000 may have a unique address, and the system bus 1060 may connect each element through the address. The system bus 1060 may process, for example, three types of data. First, the system bus 1060 may process an address in which data is stored in the main memory system 1070 when data is transmitted. Second, the system bus 1060 may process meaningful data such as an operation result stored in a corresponding address. Third, the system bus 1060 may process address data and data flow, such as how to process data and when and where data should be transferred. However, embodiments according to the present disclosure are not limited thereto. Various control signals generated by the central processing unit 1080 may be transmitted to corresponding elements through the system bus 1060.

The wireless communication unit 1010 may include one or more communication modules that enable wireless communication between the edge device 1000 and the wireless communication system, between the edge device 1000 and another edge device, or between the edge device 1000 and the cloud artificial intelligence service 1100.

For example, the wireless communication unit 1010 may include at least one of mobile communication module 1011, wireless Internet module 1012, short-range communication module 1013, and location information module 1014.

The mobile communication module 1011 of the wireless communication unit 1010 refers to a module for transmitting and receiving wireless data with at least one of a base station, an external terminal, and a server on a mobile communication network established according to technical standards or communication methods for mobile communication. The mobile communication module 1011 may be built-in or external to the edge device 1000. Technical standards are, for example, GSM (Global System for Mobile communication), CDMA (Code Division Multi Access), CDMA2000 (Code Division Multi Access 2000), EVDO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), 5G (Fifth Generation), and the like. However, embodiments according to the present disclosure are not limited thereto.

The wireless Internet module 1012 of the wireless communication unit 1010 means a module for wireless Internet access. The wireless Internet module 1012 may be built-in or external to the edge device 1000. The wireless Internet module 1012 is configured to transmit and receive wireless data in a communication network according to wireless Internet technologies. Wireless Internet technologies are, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), 5G (Fifth Generation), and the like. However, embodiments according to the present disclosure are not limited thereto. In addition, the wireless Internet module 1012 for performing wireless Internet access through a mobile communication network may be understood as a type of the mobile communication module 1011.

The short-range communication module 1013 of the wireless communication unit 1010 refers to a module for short-range communication. Short-range communication technologies are, for example, Bluetooth™, Radio Frequency Identification (RFID), Infrared Data Association (IrDA), Ultra-Wideband (UWB), ZigBee, Near Field Communication (NFC), Wi-Fi (Wireless-Fidelity), Wi-Fi Direct, Wireless USB (Wireless Universal Serial Bus), and the like. However, embodiments according to the present disclosure are not limited thereto. Such short-distance communication module 1013 can support wireless communication between the edge device 1000 and the wireless communication system, between other edge devices interworking with the edge device 1000, or between the edge device 1000 and a separate network through short-distance Wireless Area Networks. For example, another edge device may be a wearable device such as a smart watch, smart glass, or a head mounted display (HMD) capable of exchanging data with the edge device 1000 according to the present disclosure. However, embodiments according to the present disclosure are not limited thereto.

The location information module 1014 of the wireless communication unit 1010 means a module for acquiring the location of the edge device 1000. Location information technologies include, for example, a Global Positioning System (GPS) module or a Wireless Fidelity (Wi-Fi) module. For example, if the edge device 1000 utilizes a GPS module, it may acquire the location of the edge device 1000 using data transmitted from a GPS satellite. As another example, when the edge device 1000 utilizes the Wi-Fi module, the location of the edge device 1000 can be acquired based on the Wi-Fi module and data of a wireless AP (Wireless Access Point) that transmits or receives wireless data. However, embodiments according to the present disclosure are not limited thereto.

Through the wireless communication unit 1010, the edge device 1000 may be connected to the cloud artificial intelligence service 1100, and the edge device 1000 may request various types of artificial intelligence services from the cloud artificial intelligence service 1100 in the form of a query.

For example, the edge device 1000 may transmit voice data "How is the weather today?" to the cloud artificial intelligence service 1100 through the wireless communication unit 1010, and the cloud artificial intelligence service 1100 may transmit an inference result of the received voice data to the edge device 1000 through the wireless communication unit 1010. However, embodiments according to the present disclosure are not limited thereto.

The input unit 1020 may include various data input to the edge device 1000 or various elements that provide data. The input unit 1020 may include a camera 1021 for inputting image data, a microphone 1022 for inputting sound data, a user input module 1023 for receiving data from a user, a proximity sensor 1024 for detecting a distance, an illuminance sensor 1025 for detecting an amount of ambient light, a radar 1026 for detecting an object by emitting radio waves of a specific frequency, and a LiDar 1027 for detecting an object by emitting a laser, and the like.

The input unit 1020 may be configured to perform a function of providing at least one of image data, sound data, user input data, and distance data.

The camera 1021 of the input unit 1020 may be a camera for image processing, gesture recognition, object recognition, event recognition, etc. inferred by the neural network processing unit 100.

The camera 1021 of the input unit 1020 may provide a still image or video data.

Image data of the camera 1021 of the input unit 1020 may be transmitted to the central processing unit 1080. When the image data is transmitted to the central processing unit 1080, the central processing unit 1080 may be configured to transmit the image data to the neural network processing unit 100. In this case, the central processing unit 1080 may perform image processing, and image-processed image data may be transmitted to the neural network processing unit 100. However, it is not limited thereto, and the system bus 1060 may transmit image data to the neural network processing unit 100.

Image data of the camera 1021 of the input unit 1020 may be transmitted to the neural network processing unit 100. When the image data is transmitted to the neural network processing unit 100, the neural network processing unit 100 may be configured to transmit the inferred result to the central processing unit 1080. At this time, inference operations such as image processing, gesture recognition, object recognition, and event recognition may be performed according to the artificial neural network model operated by the neural network processing unit 100, and the inferred result may be transmitted to the central processing unit 1080. However, it is not limited thereto, and the neural network processing unit 100 may transmit the inferred result to an element other than the central processing unit 1080 through the system bus 1060.

The input unit 1020 may be configured to include one or more instances of camera 1021. For example, the camera 1021 of the input unit 1020 may be a plurality of cameras that provide image data in the directions of front, rear, left, and right for autonomous driving of an autonomous vehicle. In addition, a vehicle indoor camera for detecting the condition of the indoor driver may be further included. For example, the camera 1021 of the input unit 1020 may be a plurality of cameras having different angles of view in the smart phone.

The camera 1021 of the input unit 1020 may be configured as at least one of a visible-light camera, a near-infrared camera, and a thermal-imaging camera. However, it is not limited thereto, and the camera 1021 may be configured as a composite image sensor configured to simultaneously detect visible light and near-infrared rays, and may be configured to simultaneously detect visible light and near-infrared rays.

When the camera 1021 of the input unit 1020 is a plurality of cameras, in order to improve the inference performance of the neural network processing unit 100, the edge device 1000 may provide image data to the neural network processing unit 100 in a batch mode form.

The microphone 1022 of the input unit 1020 converts external sound data into electrical voice data and outputs it. The voice data may be output as analog data or digital data. Various noise removal algorithms for removing noise generated in the process of receiving external sound data may be implemented in the microphone 1022.

At least one microphone 1022 of the input unit 1020 may be configured. For example, the plurality of microphones 1022 may be microphones disposed in each of two earphones positioned at both ears.

Sound data of the microphone 1022 of the input unit 1020 may be transmitted to the central processing unit 1080. When the acoustic data is transmitted to the central processing unit 1080, the acoustic data may be transmitted to the neural network processing unit 100 through the system bus 1060. In this case, the central processing unit 1080 may convert the sound data into the frequency domain by a Fourier transform function, and the converted sound data may be transmitted to the neural network processing unit 100. However, it is not limited thereto, and it is also possible to transmit image data to the neural network processing unit 100 through an element other than the central processing unit 1080 through the system bus 1060.

The acoustic data of the microphone 1022 of the input unit 1020 may be transmitted to the neural network processing unit 100. When the acoustic data is transmitted to the neural network processing unit 100, the neural network processing unit 100 may be configured to transmit the inferred result to the central processing unit 1080. At this time, inference operations such as sound processing, keyword recognition, noise removal, sentence recognition, and translation into another language may be performed according to the artificial neural network model operated in the neural network processing unit 100, and the inferred result is output to the central processing unit 1080. However, it is not limited thereto, it is also possible to pass inferred results to other elements such as power control unit 1090, wireless communication unit 1010, interface unit 1050, output unit 1040, or main memory system 1070, and the like other than the central processing unit 1080.

The user input module 1023 of the input unit 1020 may include for example, at least one of a touch button, a push button, a touch panel, a mouse, a keyboard, and a touch pad. However, embodiments according to the present disclosure are not limited thereto. The neural network processing unit 100 may be configured to receive data from the user input module 1023 according to the artificial neural network model being operated, and to perform a corresponding inference operation. However, embodiments according to the present disclosure are not limited thereto.

The user input module 1023 of the input unit 1020 is for receiving data from a user, when data is input through the user input module 1023, the central processing unit 1080 may control the operation of the edge device 1000 to correspond to the input data. Such user input module 1023 may include a mechanical input means, a button, a switch, and a touch input means. The touch input means may include a visual key displayed on the touch screen through software processing or a touch key disposed on a portion other than the touch screen. The touch screen may sense a touch input to the display module 1041 using at least one of various touch types such as a resistive film type, a capacitive type, an infrared type, an ultrasonic type, and a magnetic field type. The touch screen may be configured to detect the position, area, pressure, and the like of the touch object. For example, the capacitive touch screen may be configured to convert a change in pressure applied to a specific part or capacitance occurring in a specific part into an electrical input signal. For example, the touch object may be a finger, a touch pen or a stylus pen, a pointer, or the like.

The proximity sensor 1024 of the input unit 1020 means a sensor that detects the presence or absence of an object approaching the edge device 1000 or an object existing in the vicinity without mechanical contact using the force of an electromagnetic field or infrared rays. For example, the proximity sensor 1024 includes a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, an infrared proximity sensor, and the like. However, embodiments according to the present disclosure are not limited thereto. The neural network processing unit 100 may be configured to receive a signal from the proximity sensor 1024 according to an artificial neural network model to be operated, and to perform a corresponding inference operation. However, embodiments according to the present disclosure are not limited thereto.

The illuminance sensor 1025 of the input unit 1020 refers to a sensor capable of detecting the amount of ambient light of the edge device 1000 by using a photodiode. The neural network processing unit 100 may be configured to receive a signal from the illuminance sensor 1025 according to the artificial neural network model to be operated, and to perform a corresponding inference operation. However, embodiments according to the present disclosure are not limited thereto.

The radar 1026 of the input unit 1020 may detect a signal reflected by an object by transmitting electromagnetic waves, and may provide data such as a distance and an angular velocity of the object. The edge device 1000 may be configured to include a plurality of radars 1026. The radar 1026 may be configured to include at least one of a short-range radar, a middle-range radar, and a long-range radar. The neural network processing unit 100 may be configured to receive data from the radar 1026 according to the artificial neural network model being operated, and to perform a corresponding inference operation. However, embodiments according to the present disclosure are not limited thereto.

The LiDar 1027 of the input unit 1020 may provide surrounding 3D spatial data by irradiating an optical signal in a predetermined manner and analyzing the optical energy reflected by the object. The edge device 1000 may be configured to include a plurality of LiDars 1027.

The neural network processing unit 100 may be configured to receive the data of the LiDar 1027 according to the artificial neural network model being operated, and to perform a corresponding inference operation. However, embodiments according to the present disclosure are not limited thereto.

However, the input unit 1020 is not limited to the above-described examples, and may be configured to further include at least one of an acceleration sensor, a magnetic sensor, a gravity sensor (G-sensor), a gyroscope sensor, a motion sensor, a fingerprint recognition sensor, an ultrasonic sensor, a battery gauge, a barometer, a hygrometer, a thermometer, a radiation detection sensor, a thermal sensor, a gas detection sensor, and a chemical detection sensor.

The neural network processing unit 100 of the edge device 1000 according to the embodiments of the present disclosure may be configured to receive data from the input unit 1020 according to an operating artificial neural network model and perform a corresponding inference operation.

The edge device 1000 according to embodiments of the present disclosure may be configured to provide various input data input from the input unit 1020 to the neural network processing unit 100 to perform various inference operations. It is also possible for input data to be input to the neural network processing unit 100 after being pre-processed in the central processing unit 1080.

For example, the neural network processing unit 100 may be configured to selectively receive input data of each of the camera 1021, the radar 1026, and the LiDar 1027, and infer surrounding environment data for autonomous driving.

For example, the neural network processing unit 100 may be configured to receive input data of the camera 1021 and the radar 1026 and infer surrounding environment data required for autonomous driving.

The output unit 1040 is for generating an output related to visual, auditory or tactile sense, and includes at least one of a display module 1041, a sound output module 1042, a haptic module 1043, and an optical output module 1044. The display module 1041 may be a liquid crystal panel or an organic light emitting display panel including an array of plurality pixels. However, embodiments according to the present disclosure are not limited thereto. The sound output module 1042 may be a receiver of a phone, a speaker for outputting sound, a buzzer, or the like. However, embodiments according to the present disclosure are not limited thereto. The light output module 1044 may output an optical signal for notifying the occurrence of an event using the light of the light source of the edge device 1000. Examples of the generated event may be an instance of message reception, a missed call, alarm, schedule notification, email reception, data reception through an application, and the like.

The interface unit 1050 serves as a passage with all external devices connected to the edge device 1000. The interface unit 1050 receives data from an external device, receives power and transmits it to each element inside the edge device 1050, or allows internal data of the edge device 1050 to be transmitted to an external device. For example, a wired/wireless headset port, an external charger port, a wired/wireless data port, a memory card port, a port for connecting a device equipped with an identification module, an audio I/O (Input/Output) port, a video I/O (Input/Output) port, an earphone port, and the like may be included in the interface unit 1050.

The main memory system 1070 is a device for storing data under the control of the edge device 1000. The main memory system 1070 may selectively include a volatile memory and a non-volatile memory.

The volatile memory device may be a memory device that stores data only when power is supplied and loses stored data when power supply is cut-off. The non-volatile memory device may be a device in which data is stored even when power supply is cut-off.

A program for the operation of the central processing unit 1080 or the neural network processing unit 100 may be stored, and input/output data may be temporarily stored. The main memory system 1070 may include at least one type of storage medium among flash memory, hard disk, SSD (Solid State Disk), SDD (Silicon Disk Drive), multimedia micro card, card (such as SD or XD) memory, random access memory (RAM), dynamic random access memory (DRAM), high bandwidth memory (HBM), static random access memory (SRAM), magnetic random access memory (MRAM), spin-transfer torque magnetic random access memory (STT-MRAM), embedded magnetic random access memory (eMRAM), OST-MRAM (orthogonal spin transfer magnetic random access memory), PRAM (phase change RAM), FeRAM (ferroelectric RAM), ROM (read-only memory), electrically erasable programmable read-only memory (EEPROM), programmable read-only memory (PROM), magnetic memory, magnetic disks, and optical disks. Various artificial neural network models to be described later may be stored in a volatile and/or non-volatile memory device of the main memory system 1070.

However, it is not limited thereto. At least one of the artificial neural network models may be stored in the volatile memory of the neural network processing unit 100 according to a command of the edge device 1000 to provide an inference operation function.

The central processing unit 1080 may control the overall operation of the edge device 1000. For example, the central processing unit 1080 may be a central processing unit (CPU), an application processor (AP), or a digital signal processing unit (DSP). The central processing unit 1080 may control the edge device 1000 or perform various commands. The central processing unit 1080 may provide or receive data necessary for the neural network processing unit 100. The central processing unit 1080 may control various elements connected to the system bus 1060.

The power control unit 1090 is configured to control the power of each element. The central processing unit 1080 may be configured to control the power control unit 1090. The power control unit 1090 receives external power and internal power and supplies power to each element included in the edge device 1000. Such power control unit 190 may include a battery. When control data is not provided from the central processing unit 1080 for a specific time, the power control unit 1090 may selectively cut-off the supply of power to each element of the edge device 1000. In addition, the neural network processing unit 100 may be configured to operate at all times, infer a specific situation, and provide wake-up data to the central processing unit 1080. The central processing unit 1080 may control the power control unit 1090 to supply power to a specific element of the edge device 1000 according to an inference result of the neural network processing unit 100.

The neural network processing unit 100 is configured to perform various artificial neural network inference operations. It is characterized that the neural network processing unit 100 is configured to efficiently compute an artificial neural network inference operation which is inefficient for the central processing unit 1080 to calculate.

The neural network processing unit 100 may call the artificial neural network model trained to make a specific inference from the main memory system 1070. Hereinafter, with reference to FIG. 2, the neural network processing unit 100 will be described in more detail.

Figure 2:
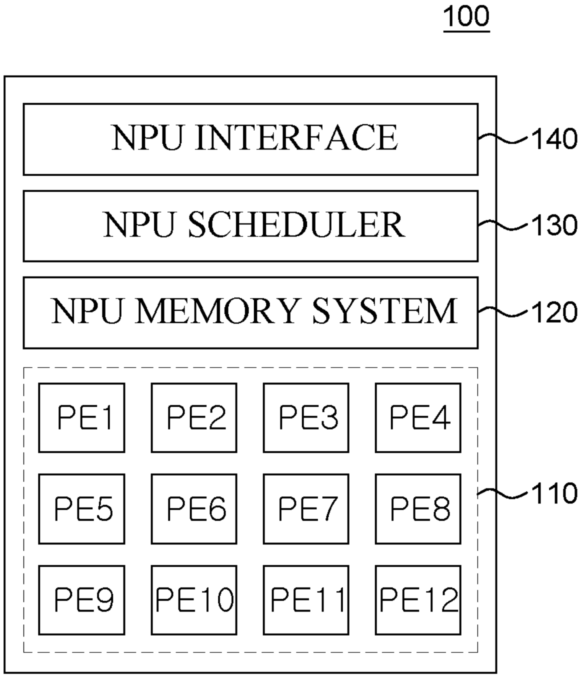
FIG. 2 is a schematic conceptual diagram illustrating a neural network processing unit according to an embodiment of the present disclosure.

FIG. 2 is a schematic conceptual diagram illustrating a neural network processing unit according to an embodiment of the present disclosure.

The neural network processing unit 100 according to an embodiment of the present disclosure is configured to include a processing element array 110, an NPU memory system 120, an NPU scheduler 130, and an NPU interface 140.

For example, the neural network processing unit 100 may be configured to include a processing element array 110, an NPU memory system 120 configured to store an artificial neural network model that can be inferred from the processing element array 110 or to store at least some data of the artificial neural network model, and an NPU scheduler 130 configured to control the processing element array 110 and the NPU memory system 120 based on the artificial neural network model structure data or the artificial neural network data locality information. Here, the artificial neural network model may include artificial neural network model structure data or artificial neural network data locality information. The artificial neural network model may refer to an AI recognition model trained to perform a specific inference function. The NPU interface 140 may communicate with various elements of the edge device 1000, such as the central processing unit 1080, the main memory system 1070, the input unit 1020, the wireless communication unit 1010 of the edge device 1000, through the system bus 1060.

For example, the central processing unit 1080 may instruct the neural network processing unit 100 through the NPU interface 140 to operate a specific artificial neural network model.

For example, the neural network processing unit 100 may call the data of the artificial neural network model stored in the main memory system 1070 through the NPU interface 140 to the NPU memory system 120.

For example, the NPU interface 140 may transmit data provided from the camera 1021 and the microphone 1022 of the input unit 1020 to the neural network processing unit 100.

For example, the neural network processing unit 100 may provide the inference result of the artificial neural network model to the central processing unit 1080 through the NPU interface 140.

That is, the NPU interface 140 may be configured to perform data communication with various elements capable of communicating with the neural network processing unit 100.

When the NPU interface 140 directly connected to the main memory system 1070 is provided, the neural network processing unit 100 may be configured to communicate directly with the main memory system 1070 without going through the system bus 1060. Therefore, the NPU interface has the effect of directly receiving various data of the artificial neural network model that can be stored in the main memory system 1070.

For example, the edge device 1000 may include a central processing unit 1080, a main memory system 1070 configured to store an artificial neural network model, a system bus 1060 that controls communication of the central processing unit 1080 and the main memory system 1070, and a neural network processing unit comprising a processing element array 110, an NPU memory system 120, an NPU scheduler 130 configured to control the processing element array 110 and the NPU memory system 120, and an NPU interface 140. The NPU interface 140 is configured to communicate with the central processing unit 1080 through the system bus 1060, and the NPU interface 140 may be configured to directly communicate data related to the artificial neural network model with the main memory system 1070. However, embodiments of the present disclosure are not limited thereto.

In this case, the neural network processing unit 100 may improve the problem that a processing sequence may be pushed back caused by other processing that has high-priority generated by the central processing unit 1080 of the edge device 1000 which is irrelevant to the neural network processing unit 100. Therefore, according to the above-described configuration, there is an effect of the neural network processing unit 100 operating stably and improving the response speed latency problem.

The neural network processing unit 100 according to an embodiment of the present disclosure is not limited to inclusion of the NPU interface 140. It is also possible to configure the neural network processing unit 100 by excluding the NPU interface 140, and it is also possible that the neural network processing unit 100 is configured to communicate directly via the system bus 1060 of the edge device 1000.

The NPU scheduler 130 is configured to control the operation of the processing element array 100 for the inference operation of the neural network processing unit 100 and the read and write sequence of the NPU memory system 120.

The NPU scheduler 130 may be configured to control the processing element array 100 and the NPU memory system 120 by analyzing the artificial neural network model structure data or the artificial neural network data locality information.

The NPU scheduler 130 may analyze the structure of the artificial neural network model to operate in the processing element array 100 or may receive the analyzed structure information. The artificial neural network data of the artificial neural network model may include node data of each layer, arrangement structure data of layers, weight data of each connection network connecting nodes of each layer, or artificial neural network data locality information. The data of the artificial neural network may be stored in a memory provided inside the NPU scheduler 130 or the NPU memory system 120. The NPU scheduler 130 may utilize the necessary data by accessing the memory in which the data of the artificial neural network is stored. However, it is not limited thereto, and artificial neural network model structure data or artificial neural network data locality information may be generated based on data such as node data and weight data of the artificial neural network model. It is also possible that the weight data is referred to as a weight kernel. The node data may also be referred to as a feature map. For example, the data in which the structure of the artificial neural network model is defined may be generated when the artificial neural network model is designed or training is completed. However, it is not limited thereto.

The NPU scheduler 130 may schedule the operation sequence of the artificial neural network model based on artificial neural network model structure data or the artificial neural network data locality information.

The neural network processing unit 100 may sequentially process calculations for each layer according to the structure of the artificial neural network model. That is, when the structure of the artificial neural network model is determined, the operation sequence for each kernel or layer can be determined. Such information can be defined as structure data of the artificial neural network model. The NPU scheduler 130 may obtain a memory address value in which node data of a layer of an artificial neural network model and weight data of a connection network are stored on the basis of artificial neural network model structure data or artificial neural network data locality information. For example, the NPU scheduler 130 may obtain a memory address value storing the node data of a layer and the weight data of a connection network of an artificial neural network model, which are stored in the main memory system 1070. Therefore, the NPU scheduler 130 may bring the node data of the layer and the weight data of the connection network of the artificial neural network model to be driven from the main memory system 1070 and store it in the NPU memory system 120. Node data of each layer may have a corresponding respective memory address value. Weight data of each connection network may have a corresponding respective memory address value.

The NPU scheduler 130 may schedule an operation sequence of the processing element array 110 based on the artificial neural network model structure data or the artificial neural network data locality information, for example, the arrangement structure data or the artificial neural network data locality information of the artificial neural network layers of the artificial neural network model.

The NPU scheduler 130 may operate differently from the scheduling concept of the central processing unit 1080 because it schedules based on the artificial neural network model structure data or the artificial neural network data locality information. The scheduling of the central processing unit 1080 operates to achieve the best efficiency in consideration of fairness, efficiency, stability, response time, and the like. That is, it is scheduled to perform the most processing within the same time in consideration of priority and operation time.

Conventional CPUs use an algorithm for scheduling tasks in consideration of data such as priority order of each processing and operation processing time.

Alternatively, the NPU scheduler 130 may determine the processing sequence based on the artificial neural network model structure data or the artificial neural network data locality information.

Further, the NPU scheduler 130 may determine the processing sequence based on the structure data of the neural network model or the neural network data locality information and/or the structure data of the neural network processing unit 100 to be used.

However, the present disclosure is not limited to the structure data of the neural network processing unit 100. For example, structure data of the neural network processing unit 100 may determine a processing sequence by using one or more data of the memory size of the NPU memory system 130, the hierarchical structure of the NPU memory system 130, the number data of the processing elements PE1 to PE12, and the operator structure of the processing elements PE1 to PE12. That is, the structure data of the neural network processing unit 100 may include one or more data of the memory size of the NPU memory system 130, the hierarchical structure of the NPU memory system 130, the number data of the processing elements PE1 to PE12, and the operator structure of the processing elements PE1 to PE12. However, the present disclosure is not limited to the structure data of the neural network processing unit 100. The memory size of the NPU memory system 130 includes information about the memory capacity. The hierarchical structure of the NPU memory system 130 includes information about a connection relationship between specific layers for each hierarchical structure. The operator structure of the processing elements PE1 to PE12 includes information about the elements inside the processing element.

A neural network processing unit 100 according to an embodiment of the present disclosure may be configured to include at least one processing element, an NPU memory system 120 that can store an artificial neural network model that can be inferred by at least one processing element or can store at least some data of the artificial neural network model, and an NPU scheduler 130 configured to control the at least one processing element and the NPU memory system 120 based on the artificial neural network model structure data or the artificial neural network data locality information. The NPU scheduler 130 may be configured to further receive the structure data of the neural network processing unit 100. In addition, the structure data of the neural network processing unit 100 may be configured to include at least one data of the memory size of the NPU memory system 120, the hierarchical structure of the NPU memory system 120, the number data of at least one processing element, and the operator structure of the at least one processing element.

Hereinafter, artificial neural network data locality information will be described.

When the compiler compiles the artificial neural network model so that the artificial neural network model is executed in the neural network processing unit 100, the artificial neural network data locality of the artificial neural network model can be configured at the processing element array-NPU memory system level. The compiler may be implemented as separate software. However, it is not limited thereto.

That is, the compiler can properly configure the data locality of the artificial neural network model at the processing element array-NPU memory system level according to algorithms applied to the artificial neural network model and hardware operating characteristics of the neural network processing unit 100.

For example, even in the case of the same artificial neural network model, the artificial neural network data locality of the artificial neural network model may be configured differently according to a method in which the neural network processing unit 100 calculates the corresponding artificial neural network model.

For example, the neural network data locality of the artificial neural network model may be configured based on algorithms such as feature map tiling, a stationary technique of processing elements, and memory reuse.

For example, the artificial neural network data locality of the artificial neural network model may be configured based on the number of processing elements of the neural network processing unit 100, memory capacity of the NPU memory system 120 to store feature map, weight, and the like, and memory hierarchy in the neural network processing unit 100 and the like.

The compiler configures the neural network data locality of the neural network model at the processing element array-NPU memory system level in a word unit of the neural network processing unit 100 to determine the sequence of data required for arithmetic processing. The word unit may vary according to quantization of the corresponding kernel, and may be, for example, 4 bits, 8 bits, 16 bits, or 32 bits. However, it is not limited thereto.

That is, the artificial neural network data locality of the artificial neural network model existing at the processing element array-NPU memory system level may be defined as operation sequence information of the artificial neural network model processed by the processing element array 110.

When the NPU scheduler 130 is provided with artificial neural network data locality information, since the NPU scheduler 130 can know the operation sequence of the artificial neural network model in a word unit, there is an effect that can store necessary data from the main memory system 1070 to the NPU memory system 120 in advance.

Accordingly, the NPU scheduler 130 may be configured to store the neural network data locality information and/or structure data of the artificial neural network.

That is, the above-described structure data means structure data of the concept of layers and kernel units of an artificial neural network model. The above-described structure data may be utilized at an algorithm level.

That is, the aforementioned artificial neural network data locality means processing sequence information of the neural network processing unit 100 determined when a corresponding artificial neural network model is converted to operate in a specific neural network processing unit by a compiler.

In more detail, the artificial neural network data locality may mean the sequence information in a word unit of data required for the neural network processing unit 100 to operate and process the corresponding artificial neural network according to the structure and calculation algorithm of the corresponding artificial neural network model when the neural network processing unit 100 processes a specific artificial neural network model. A word unit may mean an element unit, which is a basic unit that the neural network processing unit 100 can process. Artificial neural network data locality can be utilized at the hardware-memory level.

The NPU scheduler 130 may predict in advance the memory read/write operation to be requested by the neural network processing unit 100 based on structure data or artificial neural network data locality, and may store data to be processed by the neural network processing unit 100 in advance from the main memory system 1070 to the NPU memory system 120. Accordingly, there is an effect of minimizing or substantially eliminating the data supply latency.

That is, the NPU scheduler 130 may determine the processing sequence even if only the structure data of the artificial neural network of the artificial neural network model or the artificial neural network data locality information is utilized. That is, the NPU scheduler 130 may determine the operation sequence by using the structure data from the input layer to the output layer of the artificial neural network or artificial neural network data locality information. For example, an input layer operation may be scheduled first and an output layer operation may be scheduled last. Therefore, when the NPU scheduler 130 receives the artificial neural network model structure data or the artificial neural network data locality information, it is possible to know all the operation sequence of the artificial neural network model. Therefore, there is an effect that all scheduling sequences can be determined.

Furthermore, the NPU scheduler 130 may determine the processing sequence in consideration of the artificial neural network model structure data or the artificial neural network data locality information and the structure data of the neural network processing unit 100, and processing optimization for each determined sequence is also possible.

Therefore, when the NPU scheduler 130 receives the artificial neural network model structure data or both of the artificial neural network data locality information and the structure data of the neural network processing unit 100, there is an effect of further improving the computational efficiency of each scheduling sequence determined by the artificial neural network model structure data or the artificial neural network data locality information. For example, the NPU scheduler 130 may obtain four layers of artificial neural network layers and network data having weight data of three layers connecting each layer. In this case, a method of scheduling the processing sequence by the NPU scheduler 130 based on the structure data of the neural network model or the artificial neural network data the locality information will be described below by way of example.

For example, the NPU scheduler 130 may set the input data for the inference operation to the node data of the first layer, which is the input layer of the artificial neural network model, and may schedule to first perform a multiply and accumulate (MAC) operation on the node data of the first layer and the weight data of the first connection network corresponding to the first layer. However, the embodiment of the present disclosure is not limited to the MAC operation, and the artificial neural network operation may be performed using multipliers and adders that can be variously modified and implemented to perform the artificial neural network operation. Hereinafter, for convenience of description, a corresponding operation may be referred to as a first operation, a result of the first operation may be referred to as a first operation value, and corresponding scheduling may be referred to as a first scheduling.

For example, the NPU scheduler 130 may set the first operation value to the node data of the second layer corresponding to the first connection network, and may schedule the MAC operation of the node data of the second layer and the weight data of the second connection network corresponding to the second layer to be performed after the first scheduling. Hereinafter, for convenience of description, a corresponding operation may be referred to as a second operation, a result of the second operation may be referred to as a second operation value, and a corresponding scheduling may be referred to as a second scheduling.

For example, the NPU scheduler 130 may set the second operation value to the node data of the third layer corresponding to the second connection network, and may schedule the MAC operation of the node data of the third layer and the weight data of the third connection network corresponding to the third layer to be performed at the second scheduling. Hereinafter, for convenience of description, a corresponding operation may be referred to as a third operation, a result of the third operation may be referred to as a third operation value, and a corresponding scheduling may be referred to as a third scheduling.

For example, the NPU scheduler 130 may set the third operation value to the node data of the fourth layer corresponding to the third connection network, and may schedule to store the inference result stored in the node data of the fourth layer in the NPU memory system 120. Hereinafter, for convenience of description, the corresponding scheduling may be referred to as a fourth scheduling. The inference result value may be transmitted to and utilized in various elements of the edge device 1000.

For example, if the inference result value is a result of detecting a specific keyword, the neural network processing unit 100 transmits the inference result to the central processing unit 1080 so that the edge device 1000 may perform an operation corresponding to the specific keyword.

In summary, the NPU scheduler 130 may control the NPU memory system 120 and the processing element array 110 so that the operation is performed in the first scheduling, the second scheduling, the third scheduling, and the fourth scheduling sequence. That is, the NPU scheduler 130 may be configured to control the NPU memory system 120 and the processing element array 110 so that operations are performed in a set scheduling sequence.

In summary, the neural network processing unit 100 according to an embodiment of the present disclosure may be configured to schedule a processing sequence based on a structure of layers of an artificial neural network and operation sequence data corresponding to the structure. The scheduled processing sequence may be one or more. For example, since the neural network processing unit 100 can predict all operation sequences, it is also possible to schedule the next operation, and it is also possible to schedule the operation in a specific sequence.

For example, the NPU scheduler 130 may be configured to schedule a processing sequence based on structure data from an input layer to an output layer of an artificial neural network of an artificial neural network model or artificial neural network data locality information.

The NPU scheduler 130 controls the NPU memory system 120 by utilizing the scheduling sequence based on the artificial neural network model structure data or the artificial neural network data locality information to improve the operation rate of the neural network processing unit. Accordingly, there is an effect of improving the operation rate of the neural network processing unit and the memory reuse rate.

Due to the nature of the artificial neural network operation driven by the neural network processing unit 100 according to an embodiment of the present disclosure, the operation value of one layer may have a characteristic that becomes input data of the next layer.

Thus, when the neural network processing unit 100 controls the NPU memory system 120 according to the scheduling sequence, there is an effect that can improve the memory reuse rate of the NPU memory system 120. Memory reuse can be determined by the number of times the data stored in the memory is read. For example, if specific data is stored in the memory and then the specific data is read only once and then the corresponding data is deleted or overwritten, the memory reuse rate may be 100%. For example, if specific data is stored in the memory, the specific data is read four times, and then the corresponding data is deleted or overwritten, the memory reuse rate may be 400%. The memory reuse rate may be defined as the number of reuses of initially stored data. That is, memory reuse may mean reusing data stored in the memory or a specific memory address in which specific data is stored.

Specifically, if the NPU scheduler 130 is configured to receive structure data or artificial neural network data locality information of an artificial neural network model, and when the provided structure data of an artificial neural network model or the artificial neural network data locality information can determine the sequence data of the artificial neural network operation, then the NPU scheduler 130 recognized the fact that the operation result of the node data of the specific layer of the artificial neural network model and the weight data of the specific connection network becomes the node data of the next corresponding layer. That is, the neural network processing unit 100 of the edge device 1000 may be configured to improve the memory reuse rate of the NPU memory system 120 based on the artificial neural network model structure data or the artificial neural network data locality information.

Therefore, the NPU scheduler 130 may reuse the value of the memory address in which the specific operation result is stored in the subsequent operation. Accordingly, the memory reuse rate may be improved.

For example, in the case of a convolutional neural network, the neural network processing unit 100 stores the calculated output feature map data in the NPU memory system 120, and controls the NPU scheduler 130 and/or the NPU memory system 120 to use the data as input feature map data of the next layer.

For example, the first operation value of the above-described first scheduling is set as node data of the second layer of the second scheduling. Specifically, the NPU scheduler 130 may reset the memory address value corresponding to the first operation value of the first scheduling stored in the NPU memory system 120 to a memory address value corresponding to the node data of the second layer of the second scheduling. That is, the memory address value can be reused. Therefore, as the NPU scheduler 130 reuses the data of the memory address of the first scheduling, there is an effect that the NPU memory system 120 may utilize the second layer node data of the second scheduling without a separate memory write operation.

For example, the second operation value of the above-described second scheduling is set as node data of the third layer of the third scheduling. Specifically, the NPU scheduler 130 may reset the memory address value corresponding to the second operation value of the second scheduling stored in the NPU memory system 120 to a memory address value corresponding to the node data of the third layer of the third scheduling. That is, the memory address value can be reused. Therefore, as the NPU scheduler 130 reuses the data of the memory address of the second scheduling, there is an effect that the NPU memory system 120 may utilize the third layer node data of the third scheduling without a separate memory write operation.

For example, the third operation value of the above-described third scheduling is set as node data of the fourth layer of the fourth scheduling. Specifically, the NPU scheduler 130 may reset the memory address value corresponding to the third operation value of the third scheduling stored in the NPU memory system 120 to a memory address value corresponding to the node data of the fourth layer of the fourth scheduling. That is, the memory address value can be reused. Therefore, as the NPU scheduler 130 reuses the data of the memory address of the third scheduling, there is an effect that the NPU memory system 120 may utilize the fourth layer node data of the fourth scheduling without a separate memory write operation.

Furthermore, it is also possible that the NPU scheduler 130 is configured to control the NPU memory system 120 by determining the scheduling sequence and memory reuse. In this case, there is an effect that the NPU scheduler 130 can provide efficient scheduling by analyzing the artificial neural network model structure data or the artificial neural network data locality information. In addition, since data required for memory reusable operation may not be duplicated and stored in the NPU memory system 120, there is an effect that memory usage can be reduced. In addition, the NPU scheduler 130 has an effect that can increase the efficiency of the NPU memory system 120 by calculating the memory usage reduced by the memory reuse.

Furthermore, the NPU scheduler 130 may be configured to determine the scheduling sequence based on the artificial neural network data locality information, and to store the data required in the NPU memory system 120 in advance. Therefore, when the processing element array 110 is operating according to the scheduled sequence, there is an effect of utilizing the data prepared in advance in the NPU memory system 120 without requesting data from the main memory system 1070.

Furthermore, the NPU scheduler 130 may be configured to monitor the resource usage of the NPU memory system 130, the resource usage of the processing elements PE1 to PE12, based on the structure data of the neural network processing unit 100. Accordingly, there is an effect of improving the hardware resource utilization efficiency of the neural network processing unit 100.

The NPU scheduler 130 of the neural network processing unit 100 according to an embodiment of the present disclosure has the effect of reusing the memory by utilizing the artificial neural network model structure data or the artificial neural network data locality information.

In other words, when the artificial neural network model is a deep neural network, the number of layers and the number of connections can be significantly increased, and in this case, the effect of memory reuse can be further maximized.

That is, if the neural network processing unit 100 does not identify the structure data or the artificial neural network data locality information and the operation sequence of the artificial neural network model, the NPU scheduler 130 cannot determine whether to reuse the memory of the values stored in the NPU memory system 120. Accordingly, the NPU scheduler 130 unnecessarily generates a memory address required for each processing, and substantially the same data must be copied from one memory address to another. Therefore, unnecessary memory read and write operations are generated, and duplicate values are stored in the NPU memory system 120, which may cause a problem in which memory is wasted unnecessarily.

The processing element array 110 means a configuration in which a plurality of processing elements PE1 to PE12, configured to calculate node data of an artificial neural network and weight data of a connection network, are disposed. Each processing element may be configured to include a multiply and accumulate (MAC) operator and/or an arithmetic logic unit (ALU) operator. However, embodiments according to the present disclosure are not limited thereto.

Although in FIG. 2, illustratively a plurality of processing elements is shown, it is also possible to configure operators implemented as a plurality of multipliers and adder trees to be arranged in parallel by replacing the MAC in one processing element. In this case, the processing element array 110 may be referred to as at least one processing element including a plurality of operators.

The processing element array 110 is configured to include a plurality of processing elements PE1 to PE12. The plurality of processing elements PE1 to PE12 illustrated in FIG. 2 is merely an example for convenience of description, and the number of the plurality of processing elements PE1 to PE12 is not limited thereto. The size or number of the processing element array 110 may be determined by the number of the plurality of processing elements PE1 to PE12. The size of the processing element array 110 may be implemented in the form of an N×M matrix. Here, N and M are integers greater than zero. The processing element array 110 may include N×M processing elements. That is, there may be one or more processing elements.

The size of the processing element array 110 may be designed in consideration of the characteristics of the artificial neural network model in which the neural network processing unit 100 operates. In other words, the number of processing elements may be determined in consideration of the data size of the artificial neural network model to be operated, the required operating speed, the required power consumption, and the like. The size of the data of the artificial neural network model may be determined in correspondence with the number of layers of the artificial neural network model and the weight data size of each layer.

Accordingly, the size of the processing element array 110 of the neural network processing unit 100 according to an embodiment of the present disclosure is not limited thereto. As the number of processing elements of the processing element array 110 increases, the parallel computing power of the artificial neural network model which is operating increases, but manufacturing cost and physical size of the neural network processing unit 100 may increase.

For example, the artificial neural network model operated in the neural network processing unit 100 may be an artificial neural network trained to detect 30 specific keywords, that is, an AI keyword recognition model. In this case, the size of the processing element array 110 of the neural network processing unit 100 may be designed to be 4×3 in consideration of the computational amount characteristic. In other words, the neural network processing unit 100 may be configured to include twelve processing elements. However, it is not limited thereto, and the number of the plurality of processing elements PE1 to PE12 may be selected within a range of, for example, 8 to 16,384. That is, embodiments of the present disclosure are not limited in the number of processing elements.

The processing element array 110 is configured to perform functions such as addition, multiplication, and accumulation required for an artificial neural network operation. In other words, the processing element array 110 may be configured to perform a multiplication and accumulation (MAC) operation.

Hereinafter, the first processing element PE1 of the processing element array 110 will be described as an example.

Figure 3:
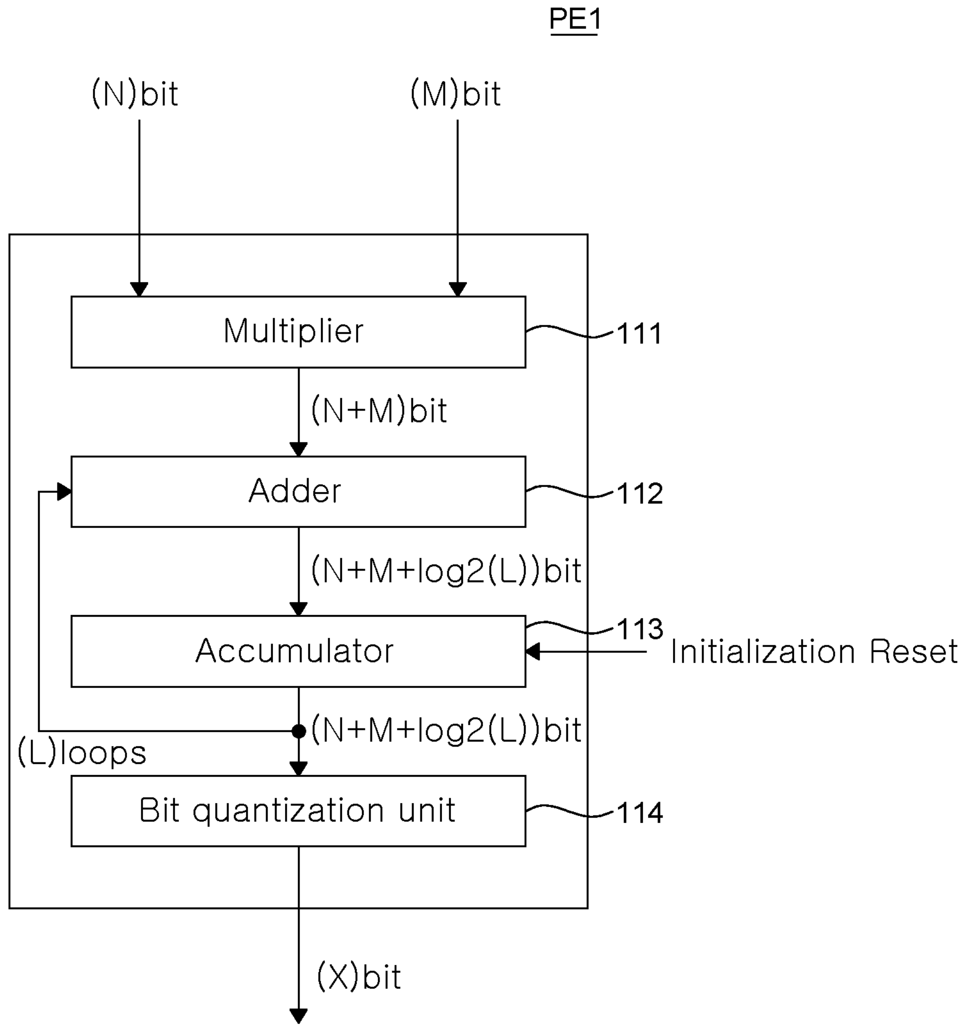
FIG. 3 is a schematic conceptual diagram illustrating one processing element of an array of processing elements that can be applied to an embodiment of the present disclosure.

FIG. 3 is a schematic conceptual diagram illustrating one processing element of an array of processing elements that may be applied to an embodiment of the present disclosure.

Neural network processing unit 100 according to an embodiment of the present disclosure includes a processing element array 110, an NPU memory system 120 configured to store an artificial neural network model that can be inferred from the processing element array 110 or to store at least some data of the artificial neural network model, and an NPU scheduler 130 configured to control the processing element array 110 and the NPU memory system 120 based on the artificial neural network model structure data or the artificial neural network data locality information, and the processing element array 110 may be configured to quantize and output a MAC operation result. However, embodiments of the present disclosure are not limited thereto.

The NPU memory system 120 may store all or part of the artificial neural network model according to the memory size and the data size of the artificial neural network model.

The first processing element PE1 may be configured to include a multiplier 111, an adder 112, an accumulator 113, and a bit quantization unit 114. However, embodiments according to the present disclosure are not limited thereto, and the processing element array 110 may be modified in consideration of the computational characteristics of the artificial neural network.

The multiplier 111 multiplies the received (N) bit data and (M) bit data. The operation value of the multiplier 111 is output as (N+M) bit data, where N and M are integers greater than zero. The first input unit for receiving (N) bit data may be configured to receive a value having a characteristic such as a variable, and the second input unit for receiving the (M) bit data may be configured to receive a value having a characteristic such as a constant.

When the NPU scheduler 130 distinguishes the variable value and the constant value characteristic, the NPU scheduler 130 has the effect of increasing the memory reuse rate of the NPU memory system 120. However, the input data of the multiplier 111 is not limited to constant values and variable values. That is, according to the embodiments of the present disclosure, since the input data of the processing element may operate by understanding the characteristics of the constant value and the variable value, the computational efficiency of the neural network processing unit 100 may be improved. However, the neural network processing unit 100 is not limited to the characteristics of constant values and variable values of input data.

Here, the meaning of a value having a variable-like characteristic or the meaning of a variable means that a value of a memory address in which the corresponding value is stored is updated whenever incoming input data is updated. For example, the node data of each layer may be a MAC operation value in which the weight data of the artificial neural network model is applied. In the case of inferring object recognition of moving image data with the corresponding artificial neural network model, since the input image changes every frame, the node data of each layer changes.

Here, the meaning of a value having constant-like characteristics or the meaning of a constant means that the value of the memory address in which the corresponding value is stored is preserved regardless of the update of incoming input data. For example, the weight data of the connection network is a unique inference determination criterion of the artificial neural network model, and even if object recognition of moving image data is inferred by the artificial neural network model, the weight data of the connection network may not change.

That is, the multiplier 111 may be configured to receive one variable and one constant. In more detail, the variable value input to the first input unit may be node data of the layer of the artificial neural network, and the node data may be input data of the input layer of the artificial neural network, the accumulated value of the hidden layer, and the accumulated value of the output layer. The constant value input to the second input unit may be weight data of a connection network of an artificial neural network.

NPU scheduler 130 may be configured to improve the memory reuse rate in consideration of the characteristics of the constant value.

The variable value is the calculated value of each layer, and the NPU scheduler 130 may control the NPU memory system 120 to recognize reusable variable values and reuse the memory based on the artificial neural network model structure data or the artificial neural network data locality information.

The constant value is the weight data of each network, and the NPU scheduler 130 may control the NPU memory system 120 to recognize the constant value of the repeatedly used connection network and reuse the memory based on the artificial neural network model structure data or the artificial neural network data locality information.

That is, the NPU scheduler 130 recognizes reusable variable values and reusable constant values based on structure data or artificial neural network data locality information of an artificial neural network model, and the NPU scheduler 130 may be configured to control the NPU memory system 120 to reuse the memory.

When zero is inputted to one of the first input unit and the second input unit of the multiplier 111, the processing element knows that the result of the operation is zero even if it does not perform the operation. Thus, the operation of the multiplier 111 may be limited so that the operation is not performed.

For example, when zero is inputted to one of the first input unit and the second input unit of the multiplier 111, the multiplier 111 may be configured to operate in a zero-skipping manner.

The number of bits of data input to the first input unit and the second input unit may be determined according to quantization of node data and weight data of each layer of the artificial neural network model. For example, node data of the first layer may be quantized to five bits and weight data of the first layer may be quantized to seven bits. In this case, the first input unit may be configured to receive five-bit data, and the second input unit may be configured to receive seven-bit data. That is, the number of bits of data input to each input unit may be different from each other.

The processing element may be configured to receive quantization information of data input to each input unit.

The artificial neural network data locality information may include quantization information of input data and output data of a processing element.

The neural network processing unit 100 may control the number of quantized bits to be converted in real time when the quantized data stored in the NPU memory system 120 is input to the inputs of the processing element. That is, the number of quantized bits can be different for each layer, and when the number of bits of input data is converted, the processing element may be configured to receive bit number information from the neural network processing unit 100 in real time and convert the number of bits in real time to generate input data.

The accumulator 113 accumulates the operation value of the multiplier 111 and the operation value of the accumulator 113 by using the adder 112 for a number of L loops. Accordingly, the number of bits of data in the output unit and the input unit of the accumulator 113 may be output as (N+M+log 2(L)) bits, where L is an integer greater than zero.

When the accumulation is finished, the accumulator 113 may receive an initialization reset to initialize the data stored in the accumulator 113 to zero. However, embodiments according to the present disclosure are not limited thereto.

The bit quantization unit 114 may reduce the number of bits of data output from the accumulator 113. The bit quantization unit 114 may be controlled by the NPU scheduler 130. The number of bits of the quantized data may be output as X bits, where X is an integer greater than zero. According to the above configuration, the processing element array 110 is configured to perform a MAC operation, and the processing element array 110 has an effect of quantizing and outputting the MAC operation result. In particular, such quantization has the effect of further reducing power consumption as the number of L loops increases. In addition, if the power consumption is reduced, there is an effect that the heat generation of the edge device can also be reduced. In particular, reducing heat generation has an effect of reducing the possibility of malfunction due to high temperature of the neural network processing unit 100.

The output data X bit of the bit quantization unit 114 may be node data of a next layer or input data of convolution. If the artificial neural network model has been quantized, the bit quantization unit 114 may be configured to receive quantized information from the artificial neural network model. However, it is not limited thereto, and the NPU scheduler 130 may be configured to extract quantized information by analyzing the artificial neural network model. Therefore, the output data X bits may be converted into the quantized number of bits to correspond to the quantized data size and output. The output data X bit of the bit quantization unit 114 may be stored in the NPU memory system 120 as the number of quantized bits.

The processing element array 110 of the neural network processing unit 100 according to an embodiment of the present disclosure includes a multiplier 111, an adder 112, an accumulator 113, and a bit quantization unit 114. The processing element array 110 may reduce the number of bits of (N+M+log 2(L)) bit data output from the accumulator 113 by the bit quantization unit 114 to the number of bits of X bit. The NPU scheduler 130 may control the bit quantization unit 114 to reduce the number of bits of the output data by a predetermined bit from a least significant bit (LSB) to a most significant bit (MSB). When the number of bits of output data is reduced, power consumption, calculation amount, and memory usage may be reduced. However, when the number of bits is reduced below a specific length, there may be a problem in that the inference accuracy of the artificial neural network model may be rapidly reduced. Accordingly, the reduction in the number of bits of the output data, that is, the quantization degree, can be determined by comparing the reduction in power consumption, the amount of computation, and the amount of memory usage compared to the reduction in inference accuracy of the artificial neural network model. It is also possible to determine the quantization degree by determining the target inference accuracy of the artificial neural network model and testing it while gradually reducing the number of bits. The quantization degree may be determined for each operation value of each layer.

According to the above-described first processing element PE1, by adjusting the number of bits of N-bit data and M-bit data of the multiplier 111 and reducing the number of bits of the operation value X bit by the bit quantization unit 114, the processing element array 110 has the effect of reducing power consumption while improving the MAC operation speed, and has the effect of more efficiently performing the convolution operation of the artificial neural network.

The NPU memory system 120 of the neural network processing unit 100 may be a memory system configured in consideration of the MAC operation characteristics and power consumption characteristics of the processing element array 110.

For example, the neural network processing unit 100 may be configured to reduce the number of bits of an operation value of the processing element array 110 in consideration of MAC operation characteristics and power consumption characteristics of the processing element array 110.

The NPU memory system 120 of the neural network processing unit 100 may be configured to minimize power consumption of the neural network processing unit 100.

The NPU memory system 120 of the neural network processing unit 100 may be a memory system configured to control the memory with low power in consideration of the data size and operation steps of the artificial neural network model to be operated.

The NPU memory system 120 of the neural network processing unit 100 may be a low-power memory system configured to reuse a specific memory address in which weight data is stored in consideration of the data size and operation steps of the artificial neural network model.

The neural network processing unit 100 may provide various activation functions for providing non-linearity. For example, a sigmoid function, a hyperbolic tangent function, or a ReLU function may be provided. The activation function may be selectively applied after the MAC operation. The operation value to which the activation function is applied may be referred to as an activation map.

Figure 4:
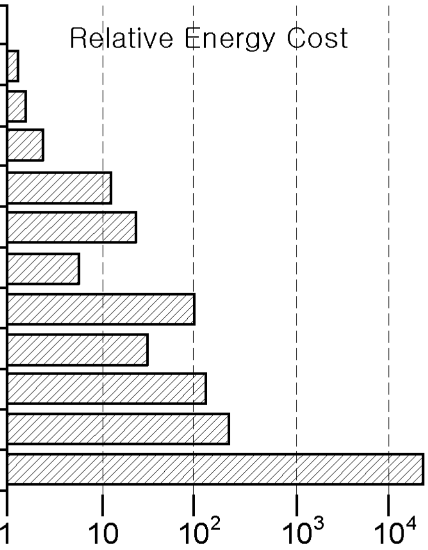
FIG. 4 is a table schematically illustrating energy consumption per unit operation of a neural network processing unit.

FIG. 4 is a table schematically illustrating energy consumption per unit operation of the neural network processing unit 100.

Hereinafter, FIG. 4 will be described with respect to the power consumption reduction technology of the NPU memory system 120 of the neural network processing unit 100.

Referring to FIG. 4, this is a table schematically explaining energy consumed per unit operation of the neural network processing unit 100. Energy consumption can be divided into memory access, addition operation, and multiplication operation.

"8b Add" refers an 8-bit integer addition operation of the adder 112. An 8-bit integer addition operation may consume 0.03 pj of energy.

"16b Add" refers to the 16-bit integer addition operation of the adder 112. A 16-bit integer addition operation may consume 0.05 pj of energy.

"32b Add" refers a 32-bit integer addition operation of the adder 112. A 32-bit integer addition operation may consume 0.1 pj of energy.

"16b FP Add" refers a 16-bit floating-point addition operation of the adder 112. A 16-bit floating-point addition operation may consume 0.4 pj of energy.

"32b FP Add" refers a 32-bit floating-point addition operation of the adder 112. A 32-bit floating-point addition operation may consume 0.9 pj of energy.

"8b Mult" refers an 8-bit integer multiplication operation of the multiplier 111. An 8-bit integer multiplication operation may consume 0.2 pj of energy.

"32b Mult" refers a 32-bit integer multiplication operation of the multiplier 111. A 32-bit integer multiplication operation may consume 3.1 pj of energy.

"16b FP Mult" refers a 16-bit floating-point multiplication operation of the multiplier 111. A 16-bit floating-point multiplication operation may consume 1.1 pj of energy.

"32b FP Mult" refers a 32-bit floating-point multiplication operation of the multiplier 111. A 32-bit floating-point multiplication operation may consume 3.7 pj of energy.

"32b SRAM Read" refers to 32-bit data read access when the internal memory of the NPU memory system 120 is a static random access memory (SRAM). To read 32-bit data from the NPU memory system 120 may consume 5 pj of energy.

"32b DRAM Read" refers to a 32-bit data read access when the memory of the main memory system 1070 of the edge device 1000 is DRAM. It may consume 640 pj of energy to read 32-bit data from the main memory system 1070 to the NPU memory system 120. The energy unit is the picojoule (pj).

When the neural network processing unit 100 performs 32-bit floating-point multiplication and 8-bit integer multiplication, the energy consumption per unit operation is approximately 18.5 times different. When 32-bit data is read from the main memory system 1070 of the edge device 1000 composed of DRAM and when 32-bit data is read from the NPU memory system 120 composed of SRAM, the energy consumption per unit operation is approximately 128 times different.

That is, in terms of power consumption, as the number of bits of data increases, power consumption increases. In addition, using floating-point arithmetic increases power consumption compared to integer arithmetic. Also, when data is read from DRAM, power consumption increases rapidly.

Accordingly, the NPU memory system 120 of the neural network processing unit 100 according to an embodiment of the present disclosure may be configured to include a high-speed static memory such as an SRAM and to not include a DRAM. However, the neural network processing unit according to embodiments of the present disclosure is not limited to the SRAM.

For example, the NPU memory system 120 may be configured to exclude DRAM and to include a static memory configured to have faster read and write speeds and less power consumption than the main memory system 1070.

Accordingly, the NPU memory system 120 of the neural network processing unit 100 according to an embodiment of the present disclosure may be configured such that the read/write speed of the inference operation of the artificial neural network model is faster than that of the main memory system 1070 and consumes less power.

Static memories capable of high-speed driving such as SRAM include SRAM, MRAM, STT-MRAM, eMRAM, OST-MRAM and the like. Furthermore, MRAM, STT-MRAM, eMRAM, and OST-MRAM are static memories having non-volatile characteristics.

Therefore, when the edge device 1000 is rebooted after the power is cut-off, there is an effect that the artificial neural network model does not need to be provided again from the main memory system 1070. However, embodiments according to the present disclosure are not limited thereto.

According to the above configuration, the neural network processing unit 100 has the effect of significantly reducing power consumption by the DRAM during the inference operation of the artificial neural network model. In addition, the memory cell of the SRAM of the NPU memory system 120 is composed of, for example, 4 to 6 transistors to store one bit data. However, embodiment according to the present disclosure are not limited thereto. In addition, the memory cell of the MRAM of the NPU memory system 120 is composed of, for example, one magnetic tunnel junction (MTJ) and one transistor to store one bit data. However, embodiments according to the present disclosure are not limited thereto.

Furthermore, the neural network processing unit 100 may be configured to check one or more data among the number of memories, type of memory, data transfer rate, and memory size of the main memory system 1070 of the edge device 1000. For example, the neural network processing unit 100 may request system data from the edge device 1000 to receive data such as a memory size and speed of the memory system 1070. However, embodiments according to the present disclosure are not limited thereto.

If the main memory system 1070 of the edge device 1000 includes DRAM, the neural network processing unit 100 may operate to minimize memory access with the main memory system 1070. However, embodiments according to the present disclosure are not limited thereto. That is, the NPU memory system 120 may be a low-power memory system configured to reuse a specific memory address in consideration of the data size and operation steps of the artificial neural network model.

That is, the neural network processing unit 100 of the edge device 1000 may be configured to control the reuse of data stored in the NPU memory system 120 based on the artificial neural network model structure data or the artificial neural network data locality information, and not to make a memory access request to the main memory system 120 when data is reused.

That is, the neural network processing unit 100 according to an embodiment of the present disclosure may minimize the memory access request to the main memory system 1070 based on the artificial neural network model structure data or the artificial neural network data locality information to be operated in the neural network processing unit 100, and may increase the reuse frequency of data stored inside the NPU memory system 120. Therefore, the frequency of use of the static memory of the NPU memory system 120 can be increased, and there is an effect of reducing power consumption of the neural network processing unit 100 and improving the operation speed.

That is, the neural network processing unit 100 may be configured to control the reuse of data stored in the NPU memory system 120 and not to make a memory access request to the main memory system 1070 when data is reused based on the artificial neural network model structure data or the artificial neural network data locality information.

The neural network processing unit 100 may be configured to receive the artificial neural network model to be driven at the time of booting the edge device 100 from the main memory system 1070 and stores it in the NPU memory system 120, and to perform an inference operation based on structure data or artificial neural network data locality information of an artificial neural network model stored in the NPU memory system 120.

When the neural network processing unit 100 operates to reuse data stored in the NPU memory system 120, the neural network processing unit 100 may minimize the number of data access requests to the main memory system 1070 to reduce power consumption. Furthermore, the neural network processing unit 100 may be configured to receive the artificial neural network model data only once for the first time when the edge device 1000 boots, and reuse the data stored in the NPU memory system 120 for subsequent inference operations.

For example, when the artificial neural network model stored in the neural network processing unit 100 is an AI keyword recognition model, the voice data for keyword inference calculation is received from the microphone 1022 and provided to the neural network processing unit 100, voice data for keyword inference operation is received from the microphone 1022 and provided to the neural network processing unit 100, the data of the artificial neural network model is stored in the NPU memory system 120, and reusable data is analyzed among the stored data. Thus, data reuse rate can be improved.

For example, when the artificial neural network model stored in the neural network processing unit 100 is an AI object recognition model, the image data for object inference operation is received from the camera 1021 and provided to the neural network processing unit 100, the data of the artificial neural network model is stored in the NPU memory system 120, and reusable data is analyzed among the stored data. Thus, data reuse rate can be improved.

At this time, the neural network processing unit 100 may compare the data size of the artificial neural network model to be fetched from the main memory system 1070 and the memory size of the NPU memory system 120 to operate only with the data stored in the NPU memory system 120. If the memory size of the NPU memory system 120 is larger than the data size of the artificial neural network model, the neural network processing unit 100 may be configured to operate only with data stored in the NPU memory system 120.

That is, the neural network processing unit 100 may be configured to compare the data size of the artificial neural network model to be fetched from the main memory system 1070 and the memory size of the NPU memory system 120.

That is, the neural network processing unit 100 may be configured to compare the data size of the artificial neural network model stored in the main memory system 1070 and the memory size of the NPU memory system 120. When the data size of the artificial neural network model is smaller than the memory size of the NPU memory system 120, there is an effect that the inference operation can be repeated while reusing the data stored in the NPU memory system 120.

When the data stored in the NPU memory system 120 stored in the neural network processing unit 100 according to an embodiment of the present disclosure is reused, the NPU memory system 120 may reduce additional memory access. Therefore, there is an effect that the NPU memory system 120 can reduce the operation time required for memory access, and can reduce the power consumption required for memory access. That is, there is an effect of reducing power consumption and improving the inference speed at the same time.

Figure 5:
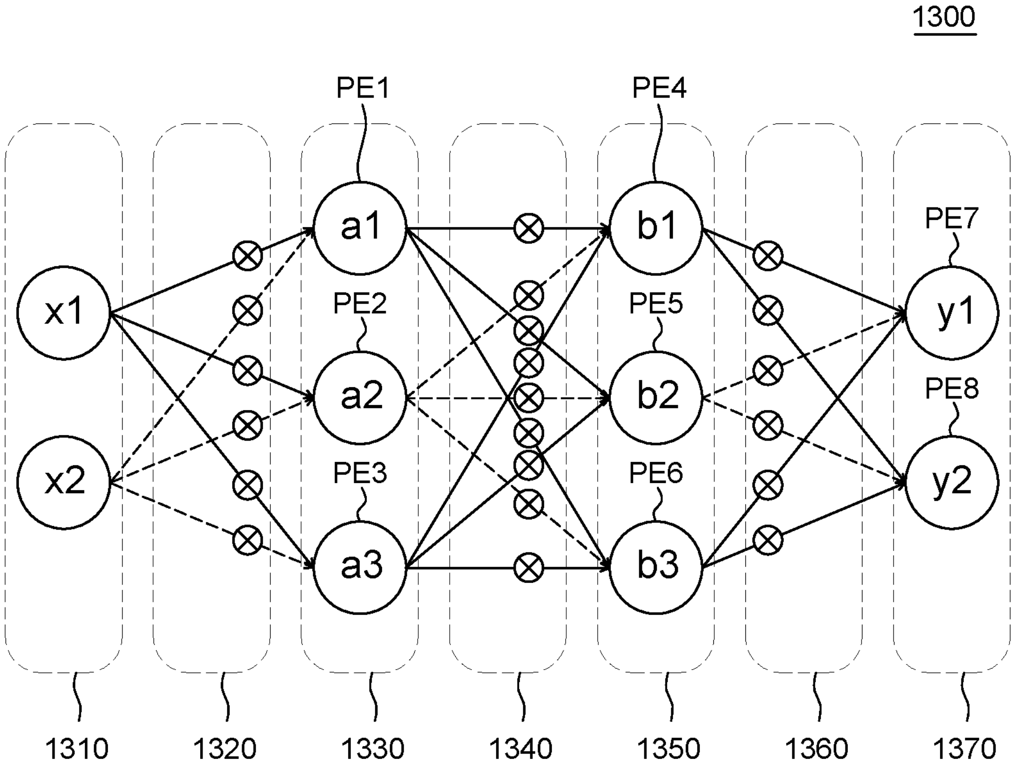
FIG. 5 is a schematic conceptual diagram illustrating an exemplary artificial neural network model applicable to embodiments of the present disclosure.

FIG. 5 is a schematic conceptual diagram illustrating an exemplary artificial neural network model applicable to embodiments of the present disclosure.

Hereinafter, the operation of the exemplary artificial neural network model 1300 that can be operated in the neural network processing unit 100 will be described with reference to FIGS. 2 to 5.

The exemplary artificial neural network model 1300 of FIG. 5 may be an artificial neural network trained by the edge device 100 or by a separate machine learning apparatus. The artificial neural network model 1300 may be an artificial neural network trained to perform various inference functions, such as object recognition and voice recognition.

The artificial neural network model 1300 may be a convolutional neural network (CNN), which is a type of a deep neural network (DNN). A convolutional neural network may be configured of a combination of one or several convolutional layers, a pooling layer, and fully connected layers. The convolutional neural network has a structure suitable for learning and inferencing of two-dimensional data, and can be trained through a backpropagation algorithm.

However, the artificial neural network model 1300 according to embodiments of the present disclosure is not limited to a deep neural network.

For example, the artificial neural network model 1300 can be implemented as models such as VGG, VGG16, DenseNet and Fully Convolutional Network (FCN) with encoder-decoder structure, Deep Neural Networks (DNN) such as SegNet, DeconvNet, DeepLAB V3+, U-net, SqueezeNet, Alexnet, ResNet18, MobileNet-v2, GoogLeNet, Resnet-v2, Resnet50, Resnetl01, Inception-v3, and the like. However, the present disclosure is not limited to the above-described models. Also, the artificial neural network model 1300 may be an ensemble model based on at least two different models.

The artificial neural network model 1300 may be stored in the NPU memory system 120 of the neural network processing unit 100. It can be implemented in a way that the artificial neural network model 1300 may be stored in the non-volatile memory and/or volatile memory of the main memory system 1070 of the edge device 1000 and then stored in the neural network processing unit 100 when the artificial neural network model 1300 is operated. However, it is not limited thereto, and the artificial neural network model 1300 may be provided to the neural network processing unit 100 by the wireless communication unit 1010 of the edge device 1000.

Hereinafter, a process in which an exemplary artificial neural network model 1300 is inferred by the neural network processing unit 100 will be described with reference to FIG. 5.

The artificial neural network model 1300 is an exemplary deep neural network model configured to include an input layer 1310, a first connection network 1320, a first hidden layer 1330, a second connection network 1340, a second hidden layer 1350, a third connection network 1360, and an output layer 1370. However, the artificial neural network model according to the examples of the present disclosure is not limited thereto. The first hidden layer 1330 and the second hidden layer 1350 may be referred to as a plurality of hidden layers. However, the artificial neural network model according to the embodiments of the present disclosure is not limited thereto. The first hidden layer 1330 and the second hidden layer 1350 may be referred to as a plurality of hidden layers.

The input layer 1310 may include, for example, x1 and x2 input nodes. That is, the input layer 1310 may include node data including two node values. The NPU scheduler 130 may set a memory address in which the input data of the input layer 1310 is stored in the NPU memory system 120.

The first connection network 1320, may include, for example, connections having weight data including six weight values connecting each node of the input layer 1310 and each node of the first hidden layer 1330. Each connection network includes respective weight data.

The NPU scheduler 130 may set a memory address in which the weight data of the first connection network 1320 is stored in the NPU memory system 120. Weight data of each connection network is multiplied with corresponding input node data, and an accumulated value of the multiplied values is stored in the first hidden layer 1330.

The first hidden layer 1330 may include, for example, nodes a1, a2, and a3. That is, the first hidden layer 1330 may include node data including three node values. The NPU scheduler 130 may set a memory address in which the node data of the first hidden layer 1330 is stored in the NPU memory system 120.

The second connection network 1340 may include, for example, connections having weight data including nine weight values connecting each node of the first hidden layer 1330 and each node of the second hidden layer 1350. Each connection network includes respective weight data. The NPU scheduler 130 may set a memory address in which the weight data of the second connection network 1340 is stored in the NPU memory system 120. The weight data of each connection network is multiplied by the corresponding input node data, and the accumulated value of the multiplied values is stored in the second hidden layer 1350.

The second hidden layer 1350 may include, for example, nodes b1, b2, and b3. That is, the second hidden layer 1350 may include node data including three node values. The NPU scheduler 130 may set a memory address in which node data of the second hidden layer 1350 is stored in the NPU memory system 120.

The third connection network 1360 may include, for example, connections having weight data including six weight values connecting each node of the second hidden layer 1350 and each node of the output layer 1370. Each connection network includes respective weight data. The NPU scheduler 130 may set a memory address in which the weight data of the third connection network 1360 is stored in the NPU memory system 120. Weight data of each connection network is multiplied with corresponding input node data, and the accumulated value of the multiplied values is stored in the output layer 1370.

The output layer 1370 may include, for example, y1 and y2 nodes. That is, the output layer 1370 may include node data including two node values. The NPU scheduler 130 may set a memory address in which the node data of the output layer 1370 is stored in the NPU memory system 120.

That is, the NPU scheduler 130 may analyze or receive the structure of an artificial neural network model to operate in the processing element array 100. The artificial neural network data that the artificial neural network model can include may include node data of each layer, layout structure data of layers, weight data of each connection network connecting nodes of each layer, or the artificial neural network data locality information.

As the NPU scheduler 130 is provided with structure data or artificial neural network data locality information of the exemplary neural network model 1300, the NPU scheduler 130 is also capable of analyze the operation sequence from the input to the output of the artificial neural network model 1300 for each layer of the artificial neural network or in a unit of a word processed by the neural network processing unit.

Accordingly, the NPU scheduler 130 may set the memory address in which the MAC operation values of each layer are stored in the NPU memory system 120 in consideration of the scheduling sequence. For example, the specific memory address may be a MAC operation value of the input layer 1310 and the first connection network 1320, and may be input data of the first hidden layer 1330 at the same time. However, the present disclosure is not limited to the MAC operation value, and the MAC operation value may also be referred to as an artificial neural network operation value.

At this time, since the NPU scheduler 130 knows that the MAC operation result of the input layer 1310 and the first connection network 1320 is the input data of the first hidden layer 1330, the same memory address can be used. That is, the NPU scheduler 130 may reuse the MAC operation value based on the artificial neural network model structure data or the artificial neural network data locality information. Therefore, there is an effect that the NPU system memory 120 can provide a memory reuse function. That is, the NPU scheduler 130 may reuse the MAC operation value based on the artificial neural network model structure data or the artificial neural network data locality information. Therefore, there is an effect that the NPU system memory 120 can provide a memory reuse function.

That is, the NPU scheduler 130 stores the MAC operation value of the artificial neural network model 1300 according to the scheduling sequence in a specific memory address of the NPU memory system 120, and the specific memory address in which the MAC operation value is stored may be used as input data for the MAC operation of the next scheduling order.

The MAC operation will be described in detail from the perspective of the first processing element PE1. The first processing element PE1 may be designated to perform a MAC operation of the a1 node of the first hidden layer 1330.

First, the first processing element PE1 inputs the x1 node data of the input layer 1310 to the first input unit and the weight data between the x1 node and the a1 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the first processing element PE1 inputs the x2 node data of the input layer 1310 to the first input unit and the weight data between the x2 node and the a1 node to the second input unit of the multiplier 111. The adder 112 adds the operation value of the multiplier 111 and the operation value of the accumulator 113. At this time, when the number of L loops is one, the multiplication value of the x1 node data and the weight between the x1 node and the a1 node calculated in the previous step is stored. Accordingly, the adder 112 generates a MAC operation value of the x1 node and the x2 node corresponding to the a1 node.

Third, the NPU scheduler 130 may terminate the MAC operation of the first processing element PE1 based on the structure data of the neural network model or the artificial neural network data locality information. At this time, the accumulator 113 may be initialized by inputting an initialization reset. That is, the counter value of L loops can be initialized to zero.

The bit quantization unit 114 may be appropriately adjusted according to the accumulated value. In more detail, as the number of L loops increases, the number of bits of an output value increases. At this time, the NPU scheduler 130 may remove a predetermined lower bit so that the number of bits of the operation value of the first processing element PE1 becomes x bits.

The MAC operation will be described in detail in terms of the second processing element PE2. The second processing element PE2 may be designated to perform a MAC operation of the a2 node of the first hidden layer 1330.

First, the second processing element PE2 inputs the x1 node data of the input layer 1310 to the first input unit and the weight data between the x1 node and the a2 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the second processing element PE2 inputs the x2 node data of the input layer 1310 to the first input unit and the weight data between the x2 node and the a2 node to the second input unit of the multiplier 111. The adder 112 adds the operation value of the multiplier 111 and the operation value of the accumulator 113. At this time, when the number of L loops is one, the multiplication value of the x1 node data and the weight between the x1 node and the a2 node calculated in the previous step is stored. Accordingly, the adder 112 generates a MAC operation value of the x1 node and the x2 node corresponding to the a2 node.

Third, the NPU scheduler 130 may terminate the MAC operation of the second processing element PE2 based on the structure data of the neural network model or the artificial neural network data locality information. At this time, the accumulator 113 may be initialized by inputting an initialization reset. That is, the counter value of L loops can be initialized to zero. The bit quantization unit 114 may be appropriately adjusted according to the accumulated value.

The MAC operation will be described in detail in terms of the third processing element PE3. The third processing element PE3 may be designated to perform the MAC operation of the a3 node of the first hidden layer 1330.

First, the third processing element PE3 inputs the x1 node data of the input layer 1310 to the first input unit and the weight data between the x1 node and the a3 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the third processing element PE3 inputs the x2 node data of the input layer 1310 to the first input unit and the weight data between the x2 node and the a3 node to the second input unit of the multiplier 111. The adder 112 adds the operation value of the multiplier 111 and the operation value of the accumulator 113. At this time, when the number of L loops is one, the multiplication value of the x1 node data and the weight between the x1 node and the a3 node calculated in the previous step is stored. Accordingly, the adder 112 generates a MAC operation value of the x1 node and the x2 node corresponding to the a3 node.

Third, the NPU scheduler 130 may terminate the MAC operation of the third processing element PE3 based on the structure data of the neural network model or the artificial neural network data locality information. At this time, the accumulator 113 may be initialized by inputting an initialization reset. That is, the counter value of L loops can be initialized to zero. The bit quantization unit 114 may be appropriately adjusted according to the accumulated value.

Accordingly, the NPU scheduler 130 of the neural network processing unit 100 may perform the MAC operations of the first hidden layer 1330 using the three processing elements PE1 to PE3 at the same time.

The MAC operation will be described in detail in terms of the fourth processing element PE4. The fourth processing element PE4 may be designated to perform a MAC operation of the b1 node of the second hidden layer 1350.

First, the fourth processing element PE4 inputs the a1 node data of the first hidden layer 1330 to the first input unit and the weight data between the a1 node and the b1 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the fourth processing element PE4 inputs the a2 node data of the first hidden layer 1330 to the first input unit and the weight data between the a2 node and the b1 node to the second input unit of the multiplier 111. The adder 112 adds the operation value of the multiplier 111 and the operation value of the accumulator 113. At this time, when the number of L loops is one, the multiplication value of the a1 node data and the weight between the a1 node and the b1 node calculated in the previous step is stored. Accordingly, the adder 112 generates a MAC operation value of the a1 node and the a2 node corresponding to the b1 node. In this case, the counter value of L loops can be two.

Third, the fourth processing element PE4 inputs the a3 node data of the input layer 1310 to the first input unit and the weight data between the a3 node and the b1 node to the second input unit of the multiplier 111. The adder 112 adds the operation value of the multiplier 111 and the operation value of the accumulator 113. At this time, when the number of L loops is two, the MAC operation value of the a1 node and the a2 node corresponding to the b1 node calculated in the previous step is stored. Accordingly, the adder 112 generates a MAC operation value of the a1 node, the a2 node, and the a3 node corresponding to the b1 node.

Fourth, the NPU scheduler 130 may terminate the MAC operation of the fourth processing element PE4 based on the structure data of the neural network model or the artificial neural network data locality information. At this time, the accumulator 113 may be initialized by inputting an initialization reset. That is, the counter value of L loops can be initialized to zero. The bit quantization unit 114 may be appropriately adjusted according to the accumulated value.

The MAC operation will be described in detail in terms of the fifth processing element PE5. The fifth processing element PE5 may be designated to perform a MAC operation of the b2 node of the second hidden layer 1350.

First, the fifth processing element PE5 inputs the a1 node data of the first hidden layer 1330 to the first input unit and the weight data between the a1 node and the b2 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the fifth processing element PE5 inputs the a2 node data of the first hidden layer 1330 to the first input unit and the weight data between the a2 node and the b2 node to the second input unit of the multiplier 111. The adder 112 adds the operation value of the multiplier 111 and the operation value of the accumulator 113. At this time, when the number of L loops is one, the multiplication value of the a1 node data and the weight between the a1 node and the b2 node calculated in the previous step is stored. Accordingly, the adder 112 generates a MAC operation value of the a1 node and the a2 node corresponding to the b2 node. In this case, the counter value of L loops can be two.

Third, the fifth processing element PE5 inputs the a3 node data of the first hidden layer 1330 to the first input unit and the weight data between the a3 node and the b2 node to the second input unit of the multiplier 111. The adder 112 adds the operation value of the multiplier 111 and the operation value of the accumulator 113. At this time, when the number of L loops is two, the MAC operation value of the a1 node and the a2 node corresponding to the b2 node calculated in the previous step is stored. Accordingly, the adder 112 generates a MAC operation value of the a1 node, the a2 node, and the a3 node corresponding to the b2 node.

Fourth, the NPU scheduler 130 may terminate the MAC operation of the fifth processing element PE5 based on the structure data of the neural network model or the artificial neural network data locality information. At this time, the accumulator 113 may be initialized by inputting an initialization reset. That is, the counter value of L loops can be initialized to zero. The bit quantization unit 114 may be appropriately adjusted according to the accumulated value.

The MAC operation will be described in detail in terms of the sixth processing element PE6. The sixth processing element PE6 may be designated to perform a MAC operation of the b3 node of the second hidden layer 1350.

First, the sixth processing element PE6 inputs the a1 node data of the first hidden layer 1330 to the first input unit and the weight data between the a1 node and the b3 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the sixth processing element PE6 inputs the a2 node data of the first hidden layer 1330 to the first input unit and the weight data between the a2 node and the b3 node to the second input unit of the multiplier 111. The adder 112 adds the operation value of the multiplier 111 and the operation value of the accumulator 113. At this time, when the number of L loops is one, the multiplication value of the a1 node data and the weight between the a1 node and the b3 node calculated in the previous step is stored. Accordingly, the adder 112 generates a MAC operation value of the a1 node and the a2 node corresponding to the b3 node. In this case, the counter value of L loops can be two.

Third, the sixth processing element PE6 inputs the a3 node data of the first hidden layer 1330 to the first input unit and the weight data between the a3 node and the b3 node to the second input unit of the multiplier 111. The adder 112 adds the operation value of the multiplier 111 and the operation value of the accumulator 113. At this time, when the number of L loops is two, the MAC operation value of the a1 node and the a2 node corresponding to the b3 node calculated in the previous step is stored. Accordingly, the adder 112 generates a MAC operation value of the a1 node, the a2 node, and the a3 node corresponding to the b3 node.

Fourth, the NPU scheduler 130 may terminate the MAC operation of the sixth processing element PE6 based on the structure data of the neural network model or the artificial neural network data locality information. At this time, the accumulator 113 may be initialized by inputting an initialization reset. That is, the counter value of L loops can be initialized to zero. The bit quantization unit 114 may be appropriately adjusted according to the accumulated value.

Accordingly, the NPU scheduler 130 of the neural network processing unit 100 may perform the MAC operations of the second hidden layer 1350 using the three processing elements PE4 to PE6 at the same time.

The MAC operation will be described in detail in terms of the seventh processing element PE7. The seventh processing element PE7 may be designated to perform a MAC operation of the y1 node of the output layer 1370.

First, the seventh processing element PE7 inputs the b1 node data of the second hidden layer 1350 to the first input unit and the weight data between the b1 node and the y1 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the seventh processing element PE7 inputs the b2 node data of the second hidden layer 1350 to the first input unit and the weight data between the b2 node and the y1 node to the second input unit of the multiplier 111. The adder 112 adds the operation value of the multiplier 111 and the operation value of the accumulator 113. At this time, when the number of L loops is one, the multiplication value of the b1 node data and the weight between the b1 node and the y1 node calculated in the previous step is stored. Accordingly, the adder 112 generates a MAC operation value of the b1 node and the b2 node corresponding to the y1 node. In this case, the counter value of L loops can be two.

Third, the seventh processing element PE7 inputs the b3 node data of the second hidden layer 1350 to the first input unit and the weight data between the b3 node and the y1 node to the second input unit of the multiplier 111. The adder 112 adds the operation value of the multiplier 111 and the operation value of the accumulator 113. At this time, when the number of L loops is two, the MAC operation value of the b1 node and the b2 node corresponding to the y1 node calculated in the previous step is stored. Accordingly, the adder 112 generates a MAC operation value of the b1 node, the b2 node, and the b3 node corresponding to the y1 node.

Fourth, the NPU scheduler 130 may terminate the MAC operation of the seventh processing element PE7 based on the structure data of the neural network model or the artificial neural network data locality information. At this time, the accumulator 113 may be initialized by inputting an initialization reset. That is, the counter value of L loops can be initialized to zero. The bit quantization unit 114 may be appropriately adjusted according to the accumulated value.

The MAC operation will be described in detail in terms of the eighth processing element PE8. The eighth processing element PE8 may be designated to perform a MAC operation of the y2 node of the output layer 1370.

First, the eighth processing element PE8 inputs the b1 node data of the second hidden layer 1350 to the first input unit and the weight data between the b1 node and the y2 node to the second input unit of the multiplier 111. The adder 112 adds the operation value of the multiplier 111 and the operation value of the accumulator 113. At this time, when the number of L loops is zero, since there is no accumulated value, the accumulated value is zero. Accordingly, the operation value of the adder 112 may be the same as the operation value of the multiplier 111. In this case, the counter value of L loops can be one.

Second, the eighth processing element PE8 inputs the b2 node data of the second hidden layer 1350 to the first input unit and the weight data between the b2 node and the y2 node to the second input unit of the multiplier 111. The adder 112 adds the operation value of the multiplier 111 and the operation value of the accumulator 113. At this time, when the number of L loops is one, the multiplication value of the b1 node data and the weight between the b1 node and the y2 node calculated in the previous step is stored. Accordingly, the adder 112 generates a MAC operation value of the b1 node and the b2 node corresponding to the y2 node. In this case, the counter value of L loops can be two.

Third, the eighth processing element PE8 inputs the b3 node data of the second hidden layer 1350 to the first input unit and the weight data between the b3 node and the y2 node to the second input unit of the multiplier 111. The adder 112 adds the operation value of the multiplier 111 and the operation value of the accumulator 113. At this time, when the number of L loops is two, the MAC operation value of the b1 node and the b2 node corresponding to the y2 node calculated in the previous step is stored. Accordingly, the adder 112 generates a MAC operation value of the b1 node, the b2 node, and the b3 node corresponding to the y2 node.

Fourth, the NPU scheduler 130 may terminate the MAC operation of the eighth processing element PE8 based on the structure data of the neural network model or the artificial neural network data locality information. At this time, the accumulator 113 may be initialized by inputting an initialization reset. That is, the counter value of L loops can be initialized to zero. The bit quantization unit 114 may be appropriately adjusted according to the accumulated value.

Accordingly, the NPU scheduler 130 of the neural network processing unit 100 may perform the MAC operations of the output layer 1370 using the two processing elements PE7 to PE8 at the same time.

When the MAC operation of the eighth processing element PE8 is finished, the inference operation of the artificial neural network model 1300 may be completed. That is, it may be determined that the artificial neural network model 1300 has completed the inference operation of one frame. If the neural network processing unit 100 infers video data in real time, image data of the next frame may be input to the x1 and x2 input nodes of the input layer 1310. In this case, the NPU scheduler 130 may store the image data of the next frame in the memory address storing the input data of the input layer 1310. If this process is repeated for each frame, the neural network processing unit 100 may process the inference operation in real time. Also, there is an effect that a preset memory address can be reused.

Summarizing the case of the artificial neural network model 1300 of FIG. 5, the NPU scheduler 130 of the neural network processing unit 100 may determine the operation scheduling sequence based on the artificial neural network model structure data 1300 or the artificial neural network data locality information for the inference operation of the artificial neural network model 1300. The NPU scheduler 130 may set a memory address required for the NPU memory system 120 based on the operation scheduling sequence. The NPU scheduler 130 may set a memory address for reusing the memory, based on the structure data or the artificial neural network data locality information of the neural network model 1300. The NPU scheduler 130 may perform an inference operation by designating the processing elements PE1 to PE8 required for the inference operation.

In addition, if the number of the weight data connected to one node increases by L, the number of L loops of the accumulator of the processing element may be set to L−1. That is, even if the number of the weight data of the artificial neural network increases, the accumulator has the effect of easily performing an inference operation by increasing the number of accumulations of the accumulator.

That is, the NPU scheduler 130 of the neural network processing unit 100 according to an embodiment of the present disclosure may control the processing element array 100 and the NPU memory system 120 based on the structure data including structure data of an input layer 1310, a first connection network 1320, a first hidden layer 1330, a second connection network 1340, a second hidden layer 1350, a third connection network 1360, and an output layer 1370 or the artificial neural network data locality information of an artificial neural network model.

That is, the NPU scheduler 130 may set memory address values corresponding to node data of the input layer 1310, weight data of the first connection network 1320, node data of the first hidden layer 1330, weight data of the second connection network 1340, node data of the second hidden layer 1350, weight data of the third connection network 1360, and node data of the output layer 1370 in the NPU memory system 110.

Hereinafter, the scheduling of the NPU scheduler 130 will be described in detail. The NPU scheduler 130 may schedule the operation sequence of the artificial neural network model based on the artificial neural network model structure data or the artificial neural network data locality information.

The NPU scheduler 130 may obtain a memory address value in which node data of a layer and weight data of a connection network of an artificial neural network model is stored on the basis of the artificial neural network model structure data or the artificial neural network data locality information.

For example, the NPU scheduler 130 may obtain a memory address value in which node data of a layer and weight data of a connection network of an artificial neural network model stored in the main memory system 1070. Therefore, the NPU scheduler 130 may bring the node data of the layer and the weight data of the connection network of the artificial neural network model to be driven from the main memory system 1070 and store it in the NPU memory system 120. Node data of each layer may have a corresponding respective memory address value. Weight data of each connection network may have a corresponding respective memory address value.

The NPU scheduler 130 may schedule an operation sequence of the processing element array 110 based on the structure data of an artificial neural network model or artificial neural network data locality information, for example, arrangement structure data of the layers of the artificial neural network of the artificial neural network model or the artificial neural network data locality information, constructed at the time of compilation.

For example, the NPU scheduler 130 may obtain weight data having weight values of four artificial neural network layers and three layers connecting each layer, that is, the network connection data. In this case, a method of scheduling the processing sequence by the NPU scheduler 130 based on the structure data of the neural network model or the artificial neural network data locality information will be described below with an example.

For example, the NPU scheduler 130 sets the input data for the inference operation to the node data of the first layer, which is the input layer 1310 of the artificial neural network model 1300, and may schedule to perform the MAC operation of the node data of the first layer and the weight data of the first connection network corresponding to the first layer at first. Hereinafter, for convenience of description, a corresponding operation may be referred to as a first operation, a result of the first operation may be referred to as a first operation value, and a corresponding scheduling may be referred to as a first scheduling.

For example, the NPU scheduler 130 sets the first operation value to the node data of the second layer corresponding to the first connection network, and may schedule the MAC operation of the node data of the second layer and the weight data of the second connection network corresponding to the second layer to be performed after the first scheduling. Hereinafter, for convenience of description, a corresponding operation may be referred to as a second operation, a result of the second operation may be referred to as a second operation value, and a corresponding scheduling may be referred to as a second scheduling.

For example, the NPU scheduler 130 sets the second operation value to the node data of the third layer corresponding to the second connection network, and may schedule the MAC operation of the node data of the third layer and the weight data of the third connection network corresponding to the third layer to be performed in the second scheduling. Hereinafter, for convenience of description, a corresponding operation may be referred to as a third operation, a result of the third operation may be referred to as a third operation value, and a corresponding scheduling may be referred to as a third scheduling.

For example, the NPU scheduler 130 sets the third operation value to the node data of the fourth layer, which is the output layer 1370, corresponding to the third connection network, and may schedule to store the inference result stored in the node data of the fourth layer in the NPU memory system 120. Hereinafter, for convenience of description, the corresponding scheduling may be referred to as a fourth scheduling. The inference result value may be transmitted and utilized to various elements of the edge device 1000.

For example, if the inference result value is a result value of detecting a specific keyword, the neural network processing unit 100 transmits the inference result to the central processing unit 1080 so that the edge device 1000 can perform an operation corresponding to the specific keyword.

For example, the NPU scheduler 130 may drive the first to third processing elements PE1 to PE3 in the first scheduling.

For example, the NPU scheduler 130 may drive the fourth to sixth processing elements PE4 to PE6 in the second scheduling.

For example, the NPU scheduler 130 may drive the seventh to eighth processing elements PE7 to PE8 in the third scheduling.

For example, the NPU scheduler 130 may output an inference result in the fourth scheduling.

In summary, the NPU scheduler 130 may control the NPU memory system 120 and the processing element array 110 so that the operation is performed in the first scheduling, the second scheduling, the third scheduling, and the fourth scheduling sequence. That is, the NPU scheduler 130 may be configured to control the NPU memory system 120 and the processing element array 110 so that operations are performed in a set scheduling sequence.

In summary, the neural network processing unit 100 according to an embodiment of the present disclosure may be configured to schedule a processing sequence based on a structure of layers of an artificial neural network and operation sequence data corresponding to the structure.

The NPU scheduler 130 has the effect of improving the memory reuse rate by controlling the NPU memory system 120 by utilizing the scheduling sequence based on the artificial neural network model structure data or the artificial neural network data locality information.

Due to the nature of the artificial neural network operation driven by the neural network processing unit 100 according to an embodiment of the present disclosure, the operation value of one layer may have a characteristic that becomes input data of the next layer.

Accordingly, when the neural network processing unit 100 controls the NPU memory system 120 according to the scheduling sequence, there is an effect that can improve the memory reuse rate of the NPU memory system 120.

Specifically, if the NPU scheduler 130 is configured to receive structure data or artificial neural network data locality information of an artificial neural network model, and the sequence in which the computation of the artificial neural network is performed can be determined based on the provided artificial neural network model structure data or the artificial neural network data locality information, the NPU scheduler 130 may determine that the operation result of the node data of a specific layer and the weight data of the specific connection network of the artificial neural network model becomes the node data of the successive layer. Therefore, the NPU scheduler 130 may reuse the value of the memory address in which the operation result is stored in the subsequent operation.

For example, the first operation value of the above-described first scheduling is set as node data of the second layer of the second scheduling. Specifically, the NPU scheduler 130 may reset the memory address value corresponding to the first operation value of the first scheduling stored in the NPU memory system 120 to a memory address value corresponding to the node data of the second layer of the second scheduling. That is, the memory address value can be reused. Therefore, by reusing the memory address value of the first scheduling by the NPU scheduler 130, there is an effect that the NPU memory system 120 can employ the second layer node data of the second scheduling without a separate memory write operation.

For example, the second operation value of the above-described second scheduling is set as node data of the third layer of the third scheduling. Specifically, the NPU scheduler 130 may reset the memory address value corresponding to the second operation value of the second scheduling stored in the NPU memory system 120 to a memory address value corresponding to the node data of the third layer of the third scheduling. That is, the memory address value can be reused. Therefore, by reusing the memory address value of the second scheduling by the NPU scheduler 130, there is an effect that the NPU memory system 120 can employ the third layer node data of the third scheduling without a separate memory write operation.

For example, the third operation value of the above-described third scheduling is set as node data of the fourth layer of the fourth scheduling. Specifically, the NPU scheduler 130 may reset the memory address value corresponding to the third operation value of the third scheduling stored in the NPU memory system 120 to a memory address value corresponding to the node data of the fourth layer of the fourth scheduling. That is, the memory address value can be reused. Therefore, by reusing the memory address value of the third scheduling by the NPU scheduler 130, there is an effect that the NPU memory system 120 can employ the fourth layer node data of the fourth scheduling without a separate memory write operation.

Furthermore, it is also possible that the NPU scheduler 130 is configured to control the NPU memory system 120 by determining the scheduling sequence and whether memory is reused or not. In this case, there is an effect that the NPU scheduler 130 can provide optimized scheduling by analyzing the artificial neural network model structure data or the artificial neural network data locality information. In addition, there is an effect that can reduce memory usage because the data required for memory reusable operation may not be duplicated and stored in the NPU memory system 120. In addition, the NPU scheduler 130 has the effect of optimizing the NPU memory system 120 by calculating the memory usage reduced by the memory reuse.

The neural network processing unit 100 according to an embodiment of the present disclosure, the first processing element PE1 may be configured such that a first input having an N-bit input receives a variable value and a second input having an M-bit input receives a constant value. Also, such a configuration may be identically set for other processing elements of the processing element array 110. That is, one input of the processing element may be configured to receive a variable value and the other input to receive a constant value. Accordingly, there is an effect that the number of times of data update of the constant value can be reduced.

At this time, the NPU scheduler 130 utilizes the artificial neural network model structure data 1300 or the artificial neural network data locality information, and may set the node data of the input layer 1310, the first hidden layer 1330, the second hidden layer 1350, and the output layer 1370 as variables, and the weight data of the first connection network 1320, the weight data of the second connection network 1340, and the weight data of the third connection network 1360 as constants. That is, the NPU scheduler 130 may distinguish a constant value from a variable value. However, the present disclosure is not limited to constant and variable data types, and in essence, it is possible to improve the reuse rate of the NPU memory system 120 by distinguishing a value that is frequently changed and a value that is not.

That is, the NPU system memory 120 may be configured to preserve the weight data of the connections stored in the NPU system memory 120 while the inference operation of the neural network processing unit 100 continues. Accordingly, there is an effect of reducing memory read/write operations.

That is, the NPU system memory 120 may be configured to reuse the MAC operation value stored in the NPU system memory 120 while the inference operation is continued.

That is, the frequency of data update of the memory address in which the N-bit input data of the first input are stored may be greater than the frequency of data update of the memory address in which the M-bit input data of the second input unit are stored of each processing element of the processing element array 110. That is, there is an effect that the frequency of data updates of the second input unit may be less than the frequency of data updates of the first input unit.

Figure 6:
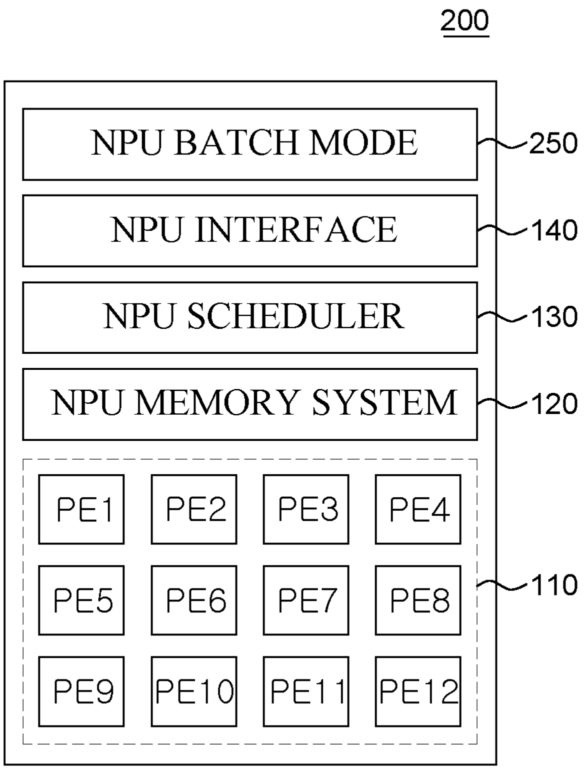
FIG. 6 is a schematic conceptual diagram illustrating a neural network processing unit according to another embodiment of the present disclosure.

FIG. 6 is a schematic conceptual diagram illustrating a neural network processing unit according to another embodiment of the present disclosure.

The neural network processing unit 200 according to another embodiment of the present disclosure is configured to include a processing element array 110, an NPU memory system 120, an NPU scheduler 130, and an NPU interface 140, and to further include an NPU batch mode 250.

Since the neural network processing unit 200 according to another embodiment of the present disclosure is substantially the same as the neural network processing unit 100 according to an embodiment of the present disclosure, except for the NPU batch mode 250, hereinafter, redundant descriptions may be omitted for convenience of explanation.

The neural network processing unit 200 according to another embodiment of the present disclosure may be configured to operate in a batch mode. The batch mode refers to a mode in which multiple different inference operations can be performed simultaneously using one artificial neural network model.

For example, there may be a plurality of cameras 1021 of the edge device 1000 according to embodiments of the present disclosure. In this case, the neural network processing unit 200 may be configured to activate the NPU batch mode 250. If the NPU batch mode 250 is activated, the neural network processing unit 200 may operate in the batch mode.

For example, when the edge device 1000 is an autonomous vehicle including six cameras, the neural network processing unit 200 may activate the NPU batch mode 250. When the NPU batch mode 250 is activated, the neural network processing unit 200 may be configured to sequentially infer input images of six cameras by using one artificial neural network model trained to infer pedestrian recognition, vehicle recognition, obstacle recognition, and the like.

That is, the neural network processing unit 200 may be configured to include a processing element array PE1 to PE12, an NPU memory system 120 configured to store an artificial neural network model that can be inferred from the processing element array PE1 to PE12 or to store at least a portion of the data of the artificial neural network model, an NPU scheduler 130 configured to control the processing element array PE1 to PE12 and the NPU memory system 120, and an NPU batch mode 250 configured to infer a plurality of different input data using an artificial neural network model. The NPU memory system 120 may store all or a portion of the artificial neural network model according to the memory size and the data size of the artificial neural network model.

In addition, when inferring six images in 512×512×3 format at thirty frames per second in the conventional way, the neural network processing unit should allocate each artificial neural network model for each image inference, and set each memory for inference operation for each artificial neural network model. That is, in the conventional case, it is necessary for the neural network processing unit to individually operate six artificial neural network models, and each artificial neural network model within the neural network processing unit cannot determine a correlation with each other. That is, in the conventional method, six artificial neural network models must be simultaneously driven in parallel, and the conventional method may cause a problem in that the memory of the NPU memory system is required six times more than in the batch mode according to another embodiment of the present disclosure. Moreover, when the capacity of the NPU system memory is significantly small, the NPU memory system may not be able to store six artificial neural network models at once. In this case, the neural network processing unit stores six artificial neural network models in the main memory system, and after the inference operation of one artificial neural network model is finished through the NPU interface, the data of the other artificial neural network model must be read from the main memory system to the NPU memory system. As described above with respect to FIG. 4, since the difference in power consumption between SRAM of NPU memory system and DRAM of main memory system is large, the time required to read the artificial neural network model from the main memory system to the NPU memory system is long. In such a case, the number of neural network processing units had to be increased, and thus, there was a problem in that power consumption and cost increased accordingly.

On the other hand, the arrangement mode of the neural network processing unit 200 according to another embodiment of the present disclosure is characterized in that it is configured to sequentially infer a plurality of input data using one artificial neural network model.

The NPU batch mode 250 of the neural network processing unit 200 may be configured to convert a plurality of input data into one continuous data.

For example, the NPU batch mode 250 may convert thirty frames of video data input from six cameras into a single video data of one hundred eighty frames. That is, the NPU batch mode 250 may increase the operation frames by combining a plurality of image data.

For example, the NPU batch mode 250 may sequentially infer frames of input images input from six cameras by using one artificial neural network model. That is, the NPU batch mode 250 may perform inference operations on a plurality of different input data by reusing the weight data of the artificial neural network model.

In more detail, the NPU batch mode 250 of the neural network processing unit 200 may store the weight data of the first layer of the artificial neural network model in the NPU memory system 120. In addition, six of the first operation values or first feature maps may be obtained by calculating a plurality of input data, for example, six camera input images and weight data of the first layer. That is, six operation values may be sequentially calculated using the weight data of the first layer. The calculated plurality of first operation values may be reused in an operation of a next layer.

Next, the NPU batch mode 250 of the neural network processing unit 200 may store the weight data of the second layer of the artificial neural network model in the NPU memory system 120. In addition, second operation values may be obtained by using the plurality of calculated first operation values and weight data of the second layer. That is, six operation values may be sequentially calculated using the second layer weight data. Accordingly, the reuse rate of the weight data of the second layer may be improved.

Next, the NPU batch mode 250 of the neural network processing unit 200 may store the weight data of the third layer of the artificial neural network model in the NPU memory system 120. In addition, third operation values may be obtained by using the plurality of calculated second operation values and weight data of the third layer. That is, six operation values may be sequentially calculated using the third layer weight data. Accordingly, the reuse rate of the weight data of the third layer may be improved.

The NPU batch mode 250 of the neural network processing unit 200 may operate in the above-described manner.

According to the above-described configuration, the weight data of each layer can be reused as much as the number of input data. Accordingly, there is an effect that the memory reuse rate of weight data can be further improved. In particular, as the number of input data increases, memory reuse may be proportionally improved.

According to the above-described configuration, it is possible to significantly reduce the case in which weight data is read from the main memory system 1070. In particular, the weight data size of the artificial neural network model is often larger than the data size of the input image. Therefore, reusing weight data is more effective in reducing power consumption, improving operation speed, and reducing memory read time.

In detail, since the main memory system 1070 transfers data through the system bus 1060, the memory transfer speed may be significantly lower than that of the NPU memory system 120, and power consumption may increase rapidly. However, since the NPU batch mode 250 can perform a plurality of inference operations using one artificial neural network model, there is an effect that can improve the above-described problems.

According to the above-described configuration, the NPU scheduler 130 has an effect of inferring the input data of the six cameras by using one artificial neural network model. In particular, when the data size of one artificial neural network model is, for example, 7 MB, and the SRAM memory size of the NPU memory system 120 is 10 MB, all data of the artificial neural network model can be stored in the NPU memory system 120 by the NPU batch mode 250. In addition, when the NPU memory system 120 is, for example, a static memory such as SRAM and the main memory system 1070 is a DRAM, the NPU memory system 120 may operate more than ten times faster than the main memory system 1070 due to the characteristics of the type of memory. Therefore, when the actual neural network processing unit 200 operates in the NPU batch mode 250, the amount of inference operation can be increased by six times, since only the NPU memory system 120 can be used, so there is an effect that the operating speed can be substantially faster than the conventional method. That is, since the neural network processing unit 200 can compare the data size of the artificial neural network model and the memory size of the NPU memory system 120, there is an effect that can eliminate or minimize communications with the main memory system 1070.

However, the above-described configuration is not limited to the NPU batch mode 250 and it is also possible to apply to other embodiment of the present disclosure without the NPU batch mode 250.

However, the NPU batch mode 250 according to the present disclosure is not limited to being implemented inside the neural network processing unit 200, and it is also possible to include the NPU batch mode 250 in the edge device 1000.

Figure 7:
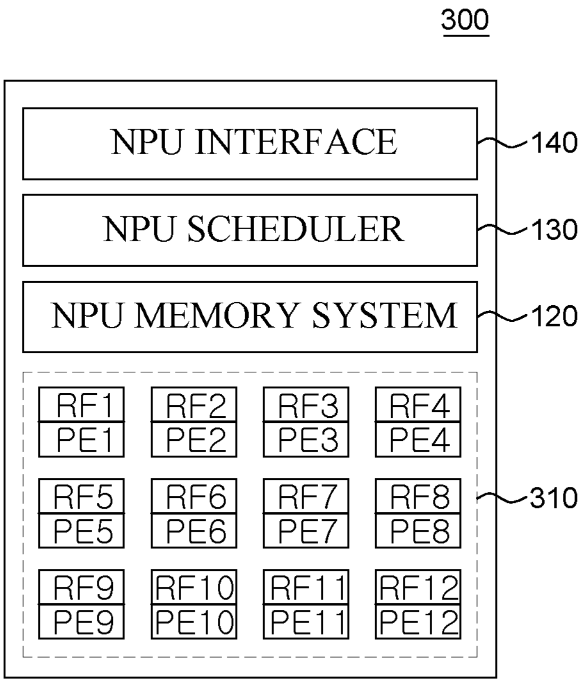
FIG. 7 is a schematic conceptual diagram illustrating a neural network processing unit according to another embodiment of the present disclosure.

FIG. 7 is a schematic conceptual diagram illustrating a neural network processing unit according to another embodiment of the present disclosure.

The neural network processing unit 300 according to the other embodiment of the present disclosure is configured to include a processing element array 310, an NPU memory system 120, an NPU scheduler 130, and an NPU interface 140.

Since the neural network processing unit 300 according to the other embodiment of the present disclosure is substantially the same as the neural network processing unit 100 according to an embodiment of the present disclosure, except for the processing element array 310, hereinafter, a redundant description may be omitted for convenience of description.

The processing element array 310 according to another embodiment of the present disclosure stores the processing element array 310 is configured to further include a plurality of processing elements PE1 to PE12 and respective register files RF1 to RF12 corresponding to each of the processing elements PE1 to PE12.

The plurality of processing elements PE1 to PE12 and the plurality of register files RF1 to RF12 as illustrated in FIG. 7 are merely examples for convenience of description, and the number of the plurality of processing elements PE1 to PE12 and the plurality of register files RF1 to RF12 is not limited thereto.

The size or number of the processing element array 310 may be determined by the number of the plurality of processing elements PE1 to PE12 and the plurality of register files RF1 to RF12. The size of the processing element array 310 and the plurality of register files RF1 to RF12 may be implemented in the form of an N×M matrix, where N and M are integers greater than zero.

The array size of the processing element array 310 may be designed in consideration of the characteristics of the artificial neural network model in which the neural network processing unit 300 operates. In other words, the memory size of the register file may be determined in consideration of the data size of the artificial neural network model to be operated, the required operating speed, the required power consumption, and the like.

The register files RF1 to RF12 of the neural network processing unit 300 are static memory units directly connected to the processing elements PE1 to PE12. The register files RF1 to RF12 may include, for example, flip-flops and/or latches. The register files RF1 to RF12 may be configured to store MAC operation values of the corresponding processing elements RF1 to RF12. The register files RF1 to RF12 may be configured to provide or receive weight data and/or node data to the NPU system memory 120.

Figure 8:
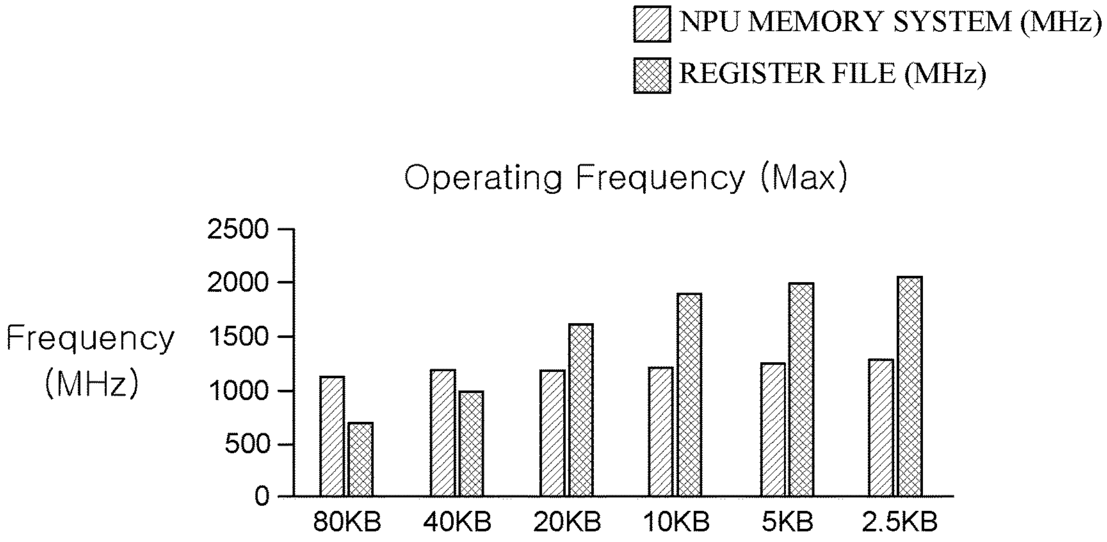
FIG. 8 is a schematic conceptual diagram illustrating characteristics of a maximum transmission speed according to a memory size of an exemplary NPU memory system including SRAM and a memory size of an exemplary register file of a neural network processing unit, according to another embodiment of the present disclosure.

FIG. 8 is a schematic conceptual diagram illustrating characteristics of a maximum transfer rate according to a memory size of an exemplary register file of a neural network processing unit and a memory size of an exemplary NPU memory system composed of SRAM, according to the other embodiment of the present disclosure.

The X axis of FIG. 8 refers to the memory size. The Y axis refers to the maximum transmission rate (MHz). The NPU memory system 120 of FIG. 8 is exemplarily made of SRAM. The register file may have a characteristic that the maximum transfer rate (MHz) rapidly decreases as the memory size increases. However, in the NPU memory system 120, the maximum transfer rate (MHz) degradation characteristic according to the increase in the memory size is less compared to the register file.

Accordingly, the memory size of the register files RF1 to RF12 of the neural network processing unit 300 according to the other embodiment of the present disclosure is smaller than the memory size of the NPU memory system 120, and the maximum transfer rate can be configured to be faster.

That is, the memory size of each of the plurality of register files RF1 to RF12 is smaller than the memory size of the NPU memory system 120, and the maximum transfer rate of each of the plurality of register files RF1 to RF12 may be configured to be faster than the maximum transfer rate of the NPU memory system 120.

For example, in order to improve the maximum transfer speed, the memory size of each register file is 30 KB or less, and the memory size of the NPU memory system 120 may be larger than the memory size of the register file.

For example, it may be more preferable that the memory size of each register file is 20 KB or less and the memory size of the NPU memory system 120 is larger than the memory size of the register file in order to improve the maximum transfer speed. However, the present disclosure is not limited thereto.

According to the above-described configuration, compared to the case of utilizing only the memory of the NPU memory system 120, the processing element array 310 further includes a register file of a memory size having a maximum transfer rate faster than that of the NPU memory system 120, there is an effect that allows the neural network processing unit 300 according to the other embodiment of the present disclosure to operate faster than the neural network processing unit 100 according to an embodiment of the present disclosure.

That is, each of the plurality of register files RF1 to RF12 may be configured to have a memory size having a faster maximum transfer rate than the NPU memory system 120. Accordingly, there is an effect of improving the operating speed of the neural network processing unit 300.

Figure 9:
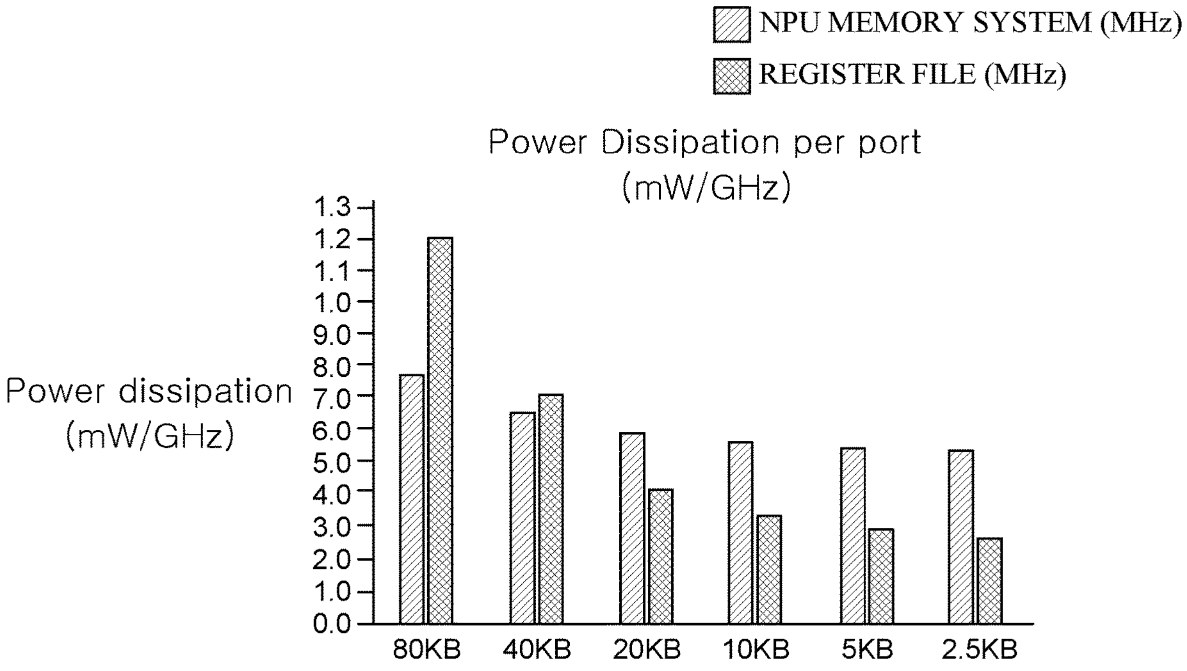
FIG. 9 is a schematic conceptual diagram illustrating power consumption characteristics based on the same transmission speed according to a memory size of an exemplary NPU memory system including SRAM and a memory size of an exemplary register file of a neural network processing unit, according to another exemplary embodiment of the present disclosure.

FIG. 9 is a schematic conceptual diagram illustrating the same transfer rate-based power consumption characteristics according to the memory size of an exemplary register file of a neural network processing unit and the memory size of an exemplary NPU memory system composed of SRAM, according to the other embodiment of the present disclosure.

The X axis of FIG. 9 refers to the memory size. The Y axis means power consumption (mW/GHz) based on the same transmission rate. That is, when the transmission speed is the same as one GHz, there is a change in the power consumption characteristics according to the size of the memory. The NPU memory system 120 of FIG. 9 is exemplarily made of SRAM. The register file may have a characteristic in which power consumption (mW/GHz) at the same transmission rate rapidly increases as the memory size increases. However, the NPU memory system 120 exhibits less of an increase in the power consumption (mW/GHz) at the same transfer rate compared to the register file even when the memory size is increased.

Accordingly, the memory size of the register files RF1 to RF12 of the neural network processing unit 300 according to the other embodiment of the present disclosure is smaller than the memory size of the NPU memory system 120, and may be configured to have relatively low power consumption at the same transfer rate.

That is, the memory size of each of the plurality of register files RF1 to RF12 is smaller than the memory size of the NPU memory system 120, and the power consumption at the same transmission rate of each of the plurality of register files RF1 to RF12 may be configured to be smaller than the power consumption based on the same transmission rate of the NPU memory system 120.

According to the above-described configuration, compared to the case of utilizing only the memory of the NPU memory system 120, the processing element array 310 further includes a register file of a memory size having less power consumption based on the same transfer rate than the NPU memory system 120, so there is an effect that the neural network processing unit 300 according to the other embodiment of the present disclosure can reduce power consumption more than the neural network processing unit 100 according to an embodiment of the present disclosure.

That is, each of the plurality of register files RF1 to RF12 may be configured to have a smaller memory size at the same transmission rate than the NPU memory system 120. Accordingly, there is an effect of reducing the power consumption of the neural network processing unit 300.

That is, each of the plurality of register files RF1 to RF12 has a faster maximum transfer rate than the NPU memory system 120, and may be configured as a memory having relatively low power consumption based on the same transfer rate. Accordingly, it is possible to reduce the power consumption of the neural network processing unit 300, and at the same time, there is an effect of improving the operating speed of the neural network processing unit 300.

Figure 10:
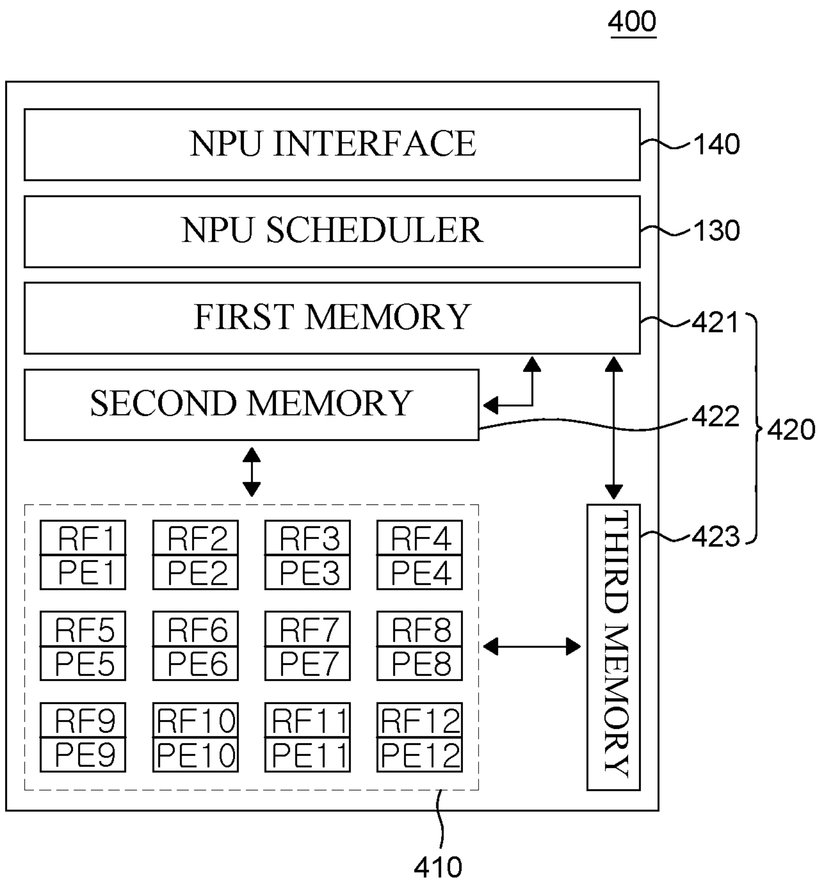
FIG. 10 is a schematic conceptual diagram illustrating a neural network processing unit according to another embodiment of the present disclosure.

FIG. 10 is a schematic conceptual diagram illustrating a neural network processing unit according to another embodiment of the present disclosure.

The neural network processing unit 400 according to another embodiment of the present disclosure is configured to include a processing element array 410, an NPU memory system 420, an NPU scheduler 130, and an NPU interface 140.

Since the neural network processing unit 400 according to the other embodiment of the present disclosure is substantially the same as the neural network processing unit 300 according to an embodiment of the present disclosure, except for the NPU memory system 420, hereinafter, redundant descriptions may be omitted for convenience of explanation.

The NPU memory system 420 according to the other embodiment of the present disclosure is configured to include a first memory 421, a second memory 422, and a third memory 423. The first memory 421, the second memory 422, and the third memory 423 may be logically separated memories or physically separated memories.

That is, the NPU scheduler 130 according to the other embodiment of the present disclosure may control the first memory 421, the second memory 422, and the third memory 423 based on the artificial neural network model structure data or the artificial neural network data locality information. Accordingly, the NPU scheduler 130 may be configured to improve the memory reuse rate of the NPU memory system 420 by controlling the first memory 421, the second memory 422, and the third memory 423 of the NPU memory system 420, based on the artificial neural network model structure data or the artificial neural network data locality information driven in the neural network processing unit 400.

The first memory 421 is configured to communicate with the main memory system 1070, the second memory 422, and the third memory 423. In addition, the second memory 422 and the third memory 423 are configured to communicate with the plurality of processing elements PE1 to PE12 and the plurality of register files RF1 to RF12.

The neural network processing unit 400 according to the other embodiment of the present disclosure may be configured to have a plurality of memory hierarchical structures optimized for memory reuse. The main memory system 1070 may be a first layer memory.

The first memory 421 may be a memory of the second layer. The second memory 422 and the third memory 423 may be memories of a third layer. The plurality of register files RF1 to RF12 may be a memory of the fourth layer. The NPU scheduler 130 may be configured to store data in which information about the memory hierarchy and the size of each memory is stored.

Specifically, the main memory system 1070 of the edge device 1000 may be configured to store all data of the artificial neural network model. In this case, the main memory system 1070 may store at least one artificial neural network model. The NPU memory system 420 may store all or part of the artificial neural network model according to the memory size and the data size of the artificial neural network model.

For example, the first artificial neural network model may be an AI keyword recognition model configured to infer a specific keyword. Further, the second artificial neural network model may be an AI gesture recognition model configured to infer a specific gesture. However, embodiments according to the present disclosure are not limited thereto.

The memory size of the main memory system 1070 may be larger than that of the first memory 421. The memory size of the first memory 421 may be larger than that of the second memory 422 or the third memory 423. In addition, the memory size of each of the second memory 422 and the third memory 423 may be larger than each of the plurality of register files RF1 to RF12. However, embodiments according to the present disclosure are not limited thereto.

The main memory system 1070 may be a first layer memory. The memory of the first layer may have the largest memory size and the largest power consumption. However, embodiments according to the present disclosure are not limited thereto.

The first memory 421 may be a memory of the second layer. The first memory 421 of the neural network processing unit 400 may be configured to store a portion or all data of the artificial neural network model. The memory of the second layer may have a smaller memory size than the memory of the first layer, may consume less power than the memory of the first layer, and may have a faster transmission speed than the memory of the first layer.

Hereinafter, a case in which the data size of the artificial neural network model is smaller than the first memory 421 will be described. The NPU scheduler 130 utilizes structure data or artificial neural network data locality information of the artificial neural network model to store all scheduling data in the first memory 421, data such as node data of layers and weight data of connected networks.

If the storage space of the first memory 421 is larger than the artificial neural network model, all data of the artificial neural network model may be stored in the NPU memory system 420. In this case, it is possible to remove unnecessary data transmission between the main memory system 1070 and the neural network processing unit 400 related to the artificial neural network model except for the initial booting of the edge device 1000. Therefore, the edge device 1000 may continuously reuse the data stored in the NPU memory system 420 to provide an effect of improving the inference speed of the neural network processing unit 400 and reducing power consumption.

Hereinafter, a case in which the data size of the artificial neural network model is larger than that of the first memory 421 will be described. The NPU scheduler 130 utilizes the artificial neural network model structure data or the artificial neural network data locality information to store a portion of data, such as node data of the layer and weight data of the connected networks, in the first memory 421 in the determined scheduling sequence.

If the storage space of the first memory 421 is insufficient or the remaining storage space reaches a specific threshold value, the NPU scheduler 130 stores data up to a specific scheduling sequence, and as the predetermined scheduling is sequentially completed, a storage space of the first memory 421 may be secured by reusing a portion of the scheduling data for which calculation has been completed, and deleting or overwriting data that is not reused. The NPU scheduler 130 may analyze the secured storage space and store data necessary for the subsequent scheduling sequence. According to the above-described configuration, the NPU scheduler 130 can provide scheduling based on structure data of an artificial neural network model or artificial neural network data locality information without scheduling with a scheduling algorithm used in a conventional CPU, for example, prioritizing algorithms for fairness, efficiency, stability, reaction time, and the like. Thus, even when the storage space of the first memory 421 is insufficient, there is an effect that the memory reuse of the NPU memory system 420 can be optimized since the operation sequence can be determined according to the structure of the artificial neural network model, and all operation sequences can be scheduled in advance.

In other words, when the AI gesture recognition model is a VGG16 convolutional artificial neural network model, the AI gesture recognition model may include weight data of sixteen connections, node data of corresponding layers, and operation sequence data according to the layer structure of the AI gesture recognition model. Accordingly, the NPU scheduler 130 may determine the scheduling sequence as, for example, first to sixteenth scheduling based on structure data of an artificial neural network model or the artificial neural network data locality information. In this case, each scheduling may be configured to perform a MAC operation that performs convolution.

At this time, the NPU scheduler 130 may check the size of the node data of each layer and the weight data of the connection network. Therefore, the NPU scheduler 130 may calculate the memory size required for each inference operation for each scheduling. Accordingly, the NPU scheduler 130 may determine the data that can be stored in the first memory 421.

For a specific example, when the NPU scheduler 130 processes the first scheduling to the sixteenth scheduling, it can be calculated that the data size required for the operation from the first scheduling to the sixth scheduling is larger than the size of the first memory 421. Accordingly, only data corresponding to the first to fifth scheduling may be stored from the main memory system 1070 to the first memory 421. After the first scheduling is completed, the NPU scheduler 130 compares the data size of the first scheduling with the data size of the sixth scheduling, and then the data of the sixth scheduling may be stored in the first memory 421 by deleting or overwriting data of the first scheduling stored in the first memory 421. After the second scheduling is completed, the NPU scheduler 130 compares the data size of the second scheduling with the data size of the seventh scheduling, and then the data of the seventh scheduling may be stored in the first memory 421 by deleting or overwriting data of the second scheduling stored in the first memory 421. According to the above-described configuration, there is an effect that can sequentially store the data required in the first memory 421 according to the scheduling sequence within the memory limit of the available NPU memory system 420. In particular, since necessary data is sequentially stored according to the operation sequence, there is an effect of reducing the latency that may be caused by operations such as reading and writing memory.

The NPU scheduler 130 may store the data of the new scheduling in the first memory 421 when the data size of the completed scheduling is larger than the data size of the scheduling to be newly stored. In other words, if the data size of the first scheduling is 500 KB and the data size of the sixth scheduling is 450 KB, the memory usage will not increase even if the data of the sixth scheduling is stored by deleting or overwriting the data of the first scheduling.

The NPU scheduler 130 may not store the data of the new scheduling in the first memory 421 when the data size of the completed scheduling is smaller than the data size of the scheduling to be newly stored. In other words, if the data size of the first scheduling is 450 KB and the data size of the sixth scheduling is 850 KB, even if the data of the first scheduling is deleted or overwritten, an additional memory space of 450 KB is required. At this time, when the memory available limit is 450 KB or less, the NPU scheduler 130 does not store the data of the sixth scheduling in the first memory 421. Further, if the data size of the second scheduling is 400 KB, since the sum of the data sizes of the first scheduling and the second scheduling becomes 850 KB. Therefore, after the second scheduling is completed, data of the sixth scheduling may be stored by deleting or overwriting data of the second scheduling.

That is, the NPU scheduler 130 of the neural network processing unit 400 determines the size of data for each scheduling sequence, and sequentially deletes, overwrites, and/or stores the data required for each scheduling sequence within the available limit of the first memory 421.

According to the above-described configuration, it is possible to efficiently control the memory limit of the first memory 421 and to prevent the memory overflow of the neural network processing unit 400.

The second memory 422 and the third memory 423 may be memories of a third layer. The memory of the third layer may have a smaller memory size than the memory of the second layer and may have a higher maximum transfer rate.

The second memory 422 and the third memory 423 of the neural network processing unit 400 may be configured to selectively store a portion of data stored in the first memory 421 in consideration of a memory reuse rate. That is, the NPU scheduler 130 may be configured to selectively store some of the data stored in the first memory 421 in one of the second memory 422 and the third memory 423 in consideration of the memory reuse rate.

A memory reuse rate of data stored in the second memory 422 may be higher than a memory reuse rate of data stored in the third memory 423.

For example, the weight data of the network of the artificial neural network model may not be changed until the artificial neural network model is updated. That is, when the weight data of the connection network of the artificial neural network model are stored in the second memory 422, the stored data may have a constant characteristic. However, embodiments according to the present disclosure are not limited thereto.

In more detail, when the artificial neural network model infers an input image at a rate of thirty frames per second, the weight data of the connection network stored in the second memory 422 can be reused thirty times per second, and one thousand eight hundred times for one minute.

According to the above-described configuration, the second memory 422 is configured to store data having a constant characteristic, so that the memory reuse rate can be improved, and power consumption can be reduced.

In addition, when data having a constant characteristic is stored in the second memory 422, the first memory 421 may delete duplicate data. That is, the NPU scheduler 130 may be configured to delete the duplicated data of the first memory 421 when the constant characteristic data is stored in the second memory 422.

According to the above-described configuration, since the value of the second memory 422 can be fixed until the artificial neural network model is updated, duplicate data in the first memory 421 can be deleted. Therefore, there is an effect that can improve the memory efficiency of the NPU memory system 400.

Data stored in the third memory 423 may have reusable variable characteristics. However, embodiments according to the present disclosure are not limited thereto.

For example, the MAC operation value of a specific layer of the artificial neural network model can be reused as node data of the next scheduling layer. That is, when the node data of the layer of the artificial neural network model is stored in the third memory 423, the stored data may have a reused variable characteristic. However, embodiments according to the present disclosure are not limited thereto.

According to the above-described configuration, the third memory 423 has an effect that the MAC operation value of each layer can be reused according to the scheduling sequence. Therefore, there is an effect that can improve the memory efficiency of the NPU memory system 400.

The second memory 422 and the third memory 423 are configured to communicate with the register files RF1 to RF12 and/or the processing elements PE1 to PE12. As described above in the neural network processing unit 300 according to the other embodiment of the present disclosure, the register files RF1 to RF12 may be configured with a memory having a higher maximum transfer rate than the NPU memory system 420 and less power consumption at the same transfer rate.

The first memory 421 may be configured as a non-volatile memory, and the second memory 422 and the third memory 423 may be configured as a volatile memory. Accordingly, when the edge device 1000 is rebooted after the power is cut-off, there is an effect that the artificial neural network model does not need to be provided again from the main memory system 1070. In this case, the register files RF1 to RF12 may be configured as volatile memory. However, embodiments according to the present disclosure are not limited thereto. According to the above-described configuration, the neural network processing unit 100 has an effect of reducing power consumption by the DRAM during the inference operation of the artificial neural network model.

The first memory 421, the second memory 422, and the third memory 423 may be configured as non-volatile memories. Accordingly, when the edge device 1000 is rebooted after the power is cut-off, there is an effect that the artificial neural network model does not need to be provided again from the main memory system 1070. In this case, the register files RF1 to RF12 may be configured as volatile memory. However, embodiments according to the present disclosure are not limited thereto. According to the above-described configuration, the neural network processing unit 100 has an effect of reducing power consumption by the DRAM during the inference operation of the artificial neural network model.

According to the above configuration, it is more efficient to improve the memory reuse rate as the memory is closer to the processing element in terms of power consumption and operation speed. Therefore, the NPU scheduler 130 may perform scheduling such that the reuse rate of data stored in the memory of the layer furthest from the processing element is increased toward to the memory of the layer closest to the processing element by utilizing artificial neural network structure data or artificial neural network data locality information and structure data and memory hierarchical structure of the neural network processing unit.

The hierarchical structure of the memory of the neural network processing unit 100 according to embodiments of the present disclosure may not be limited to the NPU memory system 420, and may be extended to the main memory system 1070 of the edge device 1000. In this case, the main memory system 1070 may be the memory of the first layer. The first memory 421 may be a memory of the second layer. The second memory 422 and the third memory 423 may be memories of the third layer. The register files RF1 to RF12 may be a memory of the fourth layer.

The neural network processing unit 400 may be operated to store, based on the structure data of the neural network processing unit 400, in a memory of a layer adjacent to the processing element in the order of data having a high memory reuse rate.

That is, embodiments according to the present disclosure are not limited to the main memory system 1070, and the neural network processing unit 400 may be configured to include the main memory system 1070.

Figure 11:
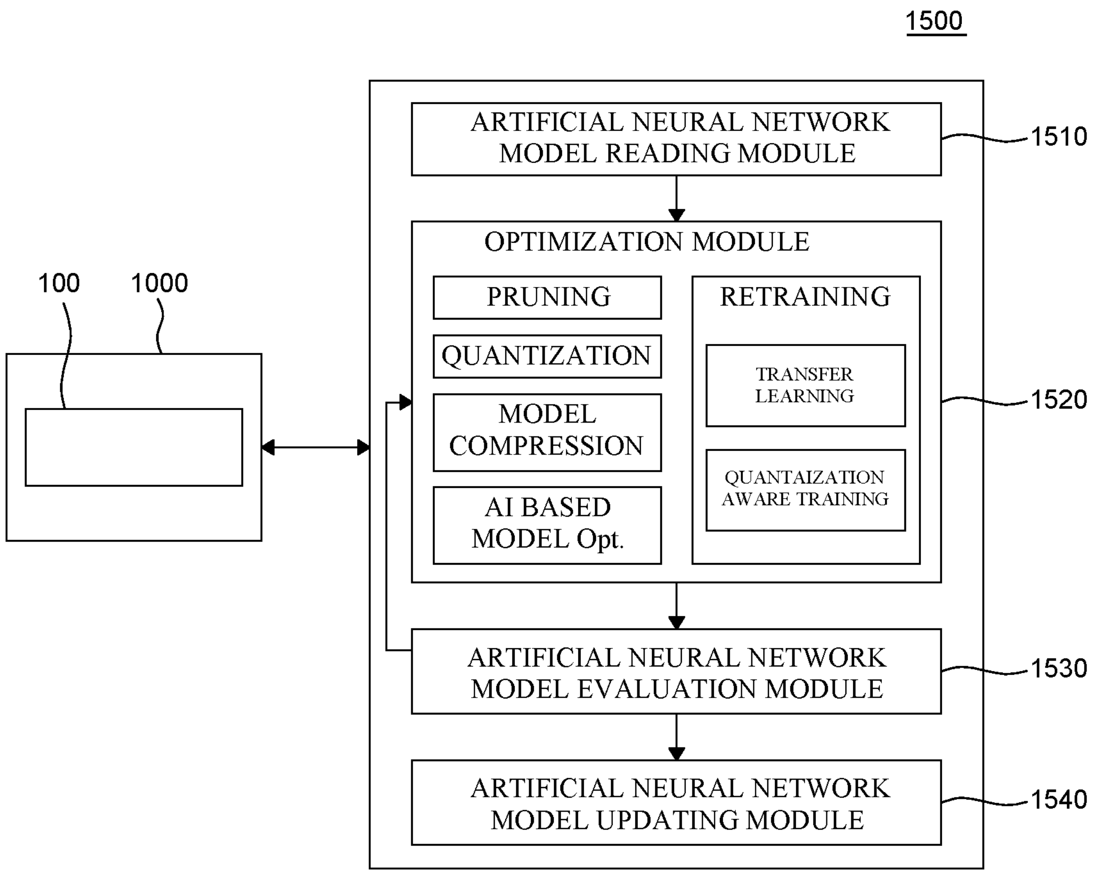
FIG. 11 is a schematic conceptual diagram illustrating an optimization system capable of optimizing an artificial neural network model that can be processed by a neural network processing unit according to an embodiment of the present disclosure.

FIG. 11 is a schematic conceptual diagram illustrating an optimization system capable of optimizing an artificial neural network model that can be processed by a neural network processing unit according to an embodiment of the present disclosure.

The optimization system 1500 may be configured to optimize the artificial neural network model driven in the neural network processing unit 100 with respect to the neural network processing unit 100.

The optimization system 1500 is a separate external system of the edge device 1000 and refers to a system configured to optimize an artificial neural network model used in the neural network processing unit 100 according to an embodiment of the present disclosure. Therefore, the optimization system 1500 may be referred to as a dedicated artificial neural network model emulator or an artificial neural network model simulator of the neural network processing unit 100.

In detail, the conventional artificial neural network model is an artificial neural network model trained without considering the hardware characteristics of the neural network processing unit 100 and the edge device 1000. That is, the conventional artificial neural network model was trained without considering the hardware limitations of the neural network processing unit 100 and the edge device 1000. Therefore, when processing the conventional artificial neural network model, the processing performance in the neural network processing unit may not be optimized. For example, the decrease in processing performance may be due to inefficient memory management of edge devices and processing of large amounts of computation of artificial neural network models. Therefore, the conventional edge device that processes the conventional artificial neural network model may have a problem of high power consumption or low processing speed.

The optimization system 1500 according to an embodiment of the present disclosure is configured to optimize the artificial neural network model by using the artificial neural network model structure data or the artificial neural network data locality information, and hardware characteristic data of the neural network processing unit 100 and the edge device 1000.

Therefore, when the optimized artificial neural network model is processed in the edge device 1000 including the neural network processing unit 100, there is an effect that can provide relatively improved performance and reduced power consumption compared to the unoptimized artificial neural network model.

The optimization system 1500 may be configured to include an artificial neural network model reading module 1510, an optimization module 1520, an artificial neural network model evaluation module 1530, and an artificial neural network model updating module 1540.

Here, the module may be a module configured of hardware, a module configured of firmware, or a module configured of software, and the optimization system 1500 is not limited to hardware, firmware, or software.

The optimization system 1500 may be configured to communicate with the edge device 1000. However, it is not limited thereto, and the optimization system 1500 may be configured to separately receive the data of the edge device 1000 and the neural network processing unit 100 included in the edge device 1000.

The optimization system 1500 may be configured to receive the structure data of an artificial neural network model or the artificial neural network data locality information, to be optimized.

Structure data or artificial neural network data locality information of an artificial neural network model may be configured to include at least one of node data of a layer, weight data of a connection network, arrangement structure data of layers of an artificial neural network model, or artificial neural network data locality information, an activation map, and a weight kernel of an artificial neural network model.

Here, the weight kernel may be a weight kernel used for convolution for extracting features of a certain portion of input data while scanning it. The weight kernel traverses each channel of the input data, calculates the convolution, and then generates a feature map for each channel.

The optimization system 1500 may be configured to further receive structure data of the neural network processing unit 100. However, it is not limited thereto.

Structure data of the neural network processing unit 100 may be configured to include at least one data of the memory size of the NPU memory system 130, the hierarchical structure of the NPU memory system 130, the maximum transfer rate and access latency of each memory of the hierarchical structure of the NPU memory system 130, the number of processing elements PE1 to PE12, and the operator structure of the processing elements PE1 to PE12.

The optimization system 1500 may be configured to further receive structure data of the main memory system 1070 of the edge device 1000. However, it is not limited thereto.

The structure data of the memory system 1070 may be configured to include at least one of the memory size of the memory system 1070, the hierarchical structure of the memory system 1070, the access latency of the memory system 1070, and the maximum transfer rate of the memory system 1070.

The optimization system 1500 may be configured to provide a simulation function that can predict the performance of the artificial neural network model when it operates on the edge device 1000 based on the structure data of the artificial neural network model, the structure data of the neural network processing unit 100, and the structure data of the main memory system 1070 of the edge device 1000. That is, the optimization system 1500 may be an emulator or simulator of an artificial neural network model that can operate in the edge device 1000.

The optimization system 1500 may be configured to adjust various values of the artificial neural network model based on the structure data or artificial neural network data locality information of the artificial neural network model, the structure data of the neural network processing unit 100, and the structure data of the main memory system 1070 of the edge device 1000. Therefore, the optimization system 1500 may be configured to lighten the artificial neural network model so that the artificial neural network model is optimized for the edge device 1000.

For example, the optimization system 1500 may receive various data from the edge device 1000 and the neural network processing unit 100 to simulate an artificial neural network model to be driven. The optimization system 1500 may determine whether the artificial neural network model can be effortlessly operated in the edge device 1000 by simulating the corresponding artificial neural network model. The optimization system 1500 may provide simulation results such as computation time, number of inferences per second, hardware resource usage, inference accuracy, and power consumption when a specific artificial neural network model operates on a specific edge device including a specific neural network processing unit by using data such as arithmetic processing power of the edge device 1000 and the neural network processing unit 100, available memory bandwidth, maximum bandwidth, memory access latency, and the like along with data such as the amount of computation and memory usage of each layer of the artificial neural network model.

For example, the optimization system 1500 may be configured to optimize the artificial neural network model through the optimization module 1520 when it is determined that a specific artificial neural network model is difficult to operate smoothly in the edge device 1000.

For example, the optimization system 1500 may be configured to optimize the artificial neural network model to a specific condition by providing various cost functions.

For example, the optimization system 1500 may be configured to lighten the weight data and node data of each layer of the artificial neural network model so as to satisfy the condition that the deterioration of inference accuracy is maintained above a specific value.

For example, the optimization system 1500 may be configured to lighten the weight data and node data of each layer of the artificial neural network model so that the data size of the artificial neural network model becomes less than or equal to a specific value and the condition of the smallest degradation in inference accuracy is satisfied.

The artificial neural network model reading module 1510 is configured to receive an artificial neural network model to be optimized from external. Here, the artificial neural network model to be optimized may be a conventional artificial neural network model trained by a user who wants to use the neural network processing unit 100.

The artificial neural network model reading module 1510 may be configured to analyze the artificial neural network model to be optimized to extract the artificial neural network model structure data or the artificial neural network data locality information. However, it is not limited thereto, and the artificial neural network model reading module 1510 may be configured to receive the artificial neural network model structure data or the artificial neural network data locality information from external.

The artificial neural network model reading module 1510 may be configured to additionally receive structure data of the neural network processing unit 100.

The artificial neural network model reading module 1510 may be configured to additionally receive structure data of the main memory system 1070 of the edge device 1000.

The optimization module 1520 may optimize the artificial neural network model based on the artificial neural network model structure data or the artificial neural network data locality information provided from the artificial neural network model reading module 1510.

The optimization module 1520 may be configured to further receive at least one of the structure data of the neural network processing unit 100 and the structure data of the memory system 1070 from the artificial neural network model reading module 1510. In this case, the optimization module 1520 can optimize the artificial neural network model based on structure data or artificial neural network data locality information of the artificial neural network model, structure data of the neural network processing unit 100, and structure data of an artificial neural network model or artificial neural network data locality information and additional structure data among the structure data of the memory system 1070 provided from the artificial neural network model reading module 1510.

The optimization module 1520 may be configured to selectively utilize a quantization algorithm, a pruning algorithm, a retraining algorithm, a quantization aware retraining algorithm, a model compression algorithm, and an AI based model optimization algorithm.

The pruning algorithm is a technology that can reduce the amount of computation of an artificial neural network model. The pruning algorithm may be configured to substitute zero for small values close to zero among weight data and/or weight kernels of all layers of the artificial neural network model. When specific weight data is replaced with zero by the pruning algorithm, the pruning algorithm can provide substantially the same effect as disconnecting the neural network model having the corresponding weight data.

Referring to FIG. 3, the multiplier 111 of the first processing element PE1 of the neural network processing unit 100 according to an embodiment of the present disclosure may process a convolution matrix multiplication. If the value input to the first input unit or the second input unit of the multiplier 111 is zero, the result value of the multiplier 111 becomes zero regardless of the values of the other operands. Accordingly, the first processing element PE1 may be configured to determine a case in which data input to at least one input unit of the multiplier 111 is zero and to skip the corresponding multiplication operation.

According to the above-described configuration, the counter value of L loops of the accumulator 113 may be reduced by the number of zero data. That is, there is an effect that the unnecessary multiplication operation of the multiplier 111 and the subsequent unnecessary addition operation of the adder 112 and the unnecessary accumulation operation of the accumulator 113 can be skipped. In addition, as zero data is further increased by the pruning algorithm, the computational efficiency of the processing element array 110 of the neural network processing unit 100 increases accordingly, there is an effect that the computational processing speed can be increased.

The pruning algorithm may be configured to evaluate accuracy by gradually increasing or decreasing the threshold level for replacing small values close to zero to zero among weight data and/or weight kernels of all layers of the artificial neural network model. For example, the pruning algorithm may be configured to increase the level of the threshold in such a way that weight data of 0.01 or less is replaced with zero, and then weighted data of 0.02 or less is replaced with zero. When the level of the threshold value increases, there is an effect that the weight data conversion rate substituted with zero may increase.

The artificial neural network model evaluation module 1530 may evaluate the artificial neural network model to which the pruning algorithm is applied. If the evaluated inference accuracy is higher than the target inference accuracy, the artificial neural network model evaluation module 1530 is configured to instruct the optimization module 1520 to gradually increase the level of the substitution threshold of the pruning algorithm of the artificial neural network model. Whenever the substitution threshold value changes, the artificial neural network model evaluation module 1530 is configured to evaluate the inference accuracy. The artificial neural network model evaluation module 1530 may be configured to gradually reduce the amount of computation of the artificial neural network model by repeatedly instructing the pruning algorithm until the evaluated inference accuracy falls below the target inference accuracy. In this case, the artificial neural network model evaluation module 1530 may be configured to store and evaluate the artificial neural network models of various versions to which the threshold value is selectively applied.

According to the above-described configuration, the optimization system 1500 has the effect of generating an artificial neural network model with a relatively high conversion rate of weight data substituted with zero while minimizing the decrease in accuracy of the artificial neural network model while evaluating and comparing various versions of the pruned artificial neural network model.

The pruning algorithm may be configured to increase or decrease the level of a threshold value for substituting small values close to zero among weight data and/or weight kernels of at least one connection network among all layers of the artificial neural network model. For example, the pruning algorithm may be configured to increase the level of the threshold value of the weight data of a specific layer by substituting zero for weight data of 0.01 or less of a specific layer and evaluating the result, and then substituting zero for weight data of 0.02 or less of the corresponding layer for evaluation. When the level of the threshold value of the weight data of a specific layer increases, there is an effect that the conversion rate of the weight data substituted with zero in the specific layer may increase.

The pruning algorithm may be configured to preferentially prune weight data of a specific layer among weight data of a plurality of layers.

For example, the pruning algorithm may preferentially select and prune a layer having the largest data size among weight data of a plurality of layers.

For example, the pruning algorithm may preferentially select and prune weight data of some layers in the order of the largest data size among weight data of a plurality of layers. For example, weight data of the upper three layers having the largest data size may be preferentially pruned.

In other words, if the pruning threshold level of the weight data of the layer with the largest data size among the layers of the artificial neural network model is made higher than the pruning threshold level of the weight data of the layer with the smallest data size, the weight data conversion rate of the layer having the largest data size may be higher than the weight data conversion rate of the layer having the smallest data size.

Therefore, in the pruned artificial neural network model, the weight data conversion rate of layers with a large data size may be higher than the weight data conversion rate of layers with a small data size.

According to the above-described configuration, the pruning degree of weight data of layers with large data can be relatively large, and as a result, the total amount of computation of the artificial neural network model can be further reduced, power consumption can be reduced, and degradation of inference accuracy can be minimized.

For example, the pruning algorithm may preferentially prune a layer with the largest amount of computation among weight data of a plurality of layers.

For example, the pruning algorithm may preferentially select and prune weight data of some layers in an order of the greatest amount of computation among weight data of a plurality of layers.

For example, the pruning algorithm may preferentially prune the weight data of the top three layers with the largest amount of computation.

In other words, when one of the layers of the artificial neural network model is pruned to a specific threshold level, the corresponding layer affects the operation of all other layers. That is, the degree of optimization of the layer pruned later may vary depending on the layer pruned first.

In other words, if the weight data of a layer with a small amount of computation or small data size but sensitive to pruning is first pruned, efficiency of weight data pruning of the layer with the largest amount of computation or the largest data size may decrease.

In other words, if the weight data of the layer with a large amount of computation or large data size and less sensitive to pruning is first pruned, even if the efficiency of weight data pruning of a layer with a small amount of computation or a small data size is reduced, the overall pruning efficiency of the artificial neural network model can be improved.

In other words, if the pruning threshold level of the weight data of the layer with the highest amount of computation among the layers of the artificial neural network model is set higher than the pruning threshold level of the weight data of the layer with the least amount of computation, the weight data conversion rate of the layer with the largest amount of computation may be higher than the weight data conversion rate of the layer with the least amount of computation.

Therefore, the weight data conversion rate of layers with a large amount of computation of the artificial neural network model may be higher than the weight data conversion rate of layers with a small amount of computation.

If the evaluated inference accuracy with respect to the pruned layer is higher than the target inference accuracy, the artificial neural network model evaluation module 1530 may be configured to command the optimization module 1520 to gradually increase the level of the threshold value of the weight data of the layer being pruned. Whenever the threshold value is changed, the artificial neural network model evaluation module 1530 is configured to evaluate the inference accuracy of the neural network model to which the pruned layer is applied. The artificial neural network model evaluation module 1530 may be configured to gradually reduce the amount of computation of the artificial neural network model by repeatedly applying the pruning algorithm until the evaluated inference accuracy falls below the target inference accuracy. In this case, the artificial neural network model evaluation module 1530 may be configured to store and evaluate the artificial neural network models of various versions to which the alternative threshold values are selectively applied.

When the pruning of the weight data of a specific layer is optimized, the optimization system 1500 terminates the pruning of the corresponding layer and finalize the weight data of the optimized layer. The optimization system 1500 may then prune the weight data of each layer of the artificial neural network model in a manner that starts pruning the weight data of another layer. Therefore, there is an effect that the pruning degree of the weight data of each layer of the artificial neural network model can be optimized for each layer.

In other words, if the pruning degree of the weight data of all layers of the artificial neural network model is the same, the degree of deterioration of the inference accuracy of the artificial neural network model can be significantly increased. However, in such case, there is a disadvantage in that it cannot be determined which layer has reduced inference accuracy by the pruning algorithm.

However, according to the above-described configuration, since the inference accuracy of the artificial neural network model can be evaluated while selectively varying the pruning degree for each specific layer of the artificial neural network model, there is an effect that the pruning degree of the artificial neural network model can be optimized for each layer by applying the pruning degree of layers that are not sensitive to pruning higher than the pruning degree of layers sensitive to pruning.

In other words, in an artificial neural network model such as VGG16, even if more than 90% of weight data is replaced with zero, a case with almost lossless of inference accuracy for the artificial neural network model can also be implemented. Therefore, there is an effect that about 90% of the entire inference operation can be performed without the operation of the actual processing element owing to the pruning algorithm. Therefore, the artificial neural network model to which the pruning algorithm is applied has the effect of reducing the actual amount of computation of the neural network processing unit 100 without substantially reducing inference accuracy, thereby reducing power consumption and improving the computation speed.

In other words, in an artificial neural network model such as VGG16, even if more than 60% of the activation map using the ReLU activation function is replaced with zero, a case with almost lossless of inference accuracy for the artificial neural network model can also be implemented.

The quantization algorithm is a technology that can reduce the data size of an artificial neural network model. The quantization algorithm may be configured to selectively reduce the number of bits of node data of each layer of the artificial neural network model and weight data of each connection network. When the number of bits of node data and specific weight data of a specific layer is reduced by the quantization algorithm, the quantization algorithm may reduce the data size of the artificial neural network model stored in the NPU memory system 120, and may provide an effect of reducing the size of input data input to each input unit of the processing element.

Referring to FIG. 3, for the first processing element PE1 of the neural network processing unit 100 according to an embodiment of the present disclosure, the first input unit may be configured to receive quantized N-bit data, and the second input unit may be configured to receive quantized M-bit data. When each input unit of the multiplier 111 of the first processing element PE1 receives data of the quantized number of bits, corresponding adder 112 and accumulator 113 may also be configured to perform an operation with data of the quantized number of bits.

For example, the first input unit may be configured to receive node data of a layer quantized to N bits, and the second input unit may be configured to receive weight data of a layer quantized to M bits. Accordingly, the number of bits of data input to the first input unit may be different from the number of bits of data input to the second input unit. For example, five-bit data may be input to the first input unit and seven-bit data may be input to the second input unit.

Referring to FIGS. 3 and 5, output data of the bit quantization unit 114 may be input data of a next layer. Accordingly, if the node data of the next layer has been quantized to a specific number of bits, the bit quantization unit 114 may be configured to correspondingly convert the number of bits of the output data.

Referring to FIG. 4, it can be seen that the power consumption of the multiplier 111 and the adder 112 of the processing element can be reduced according to the quantization degree.

The optimization module 1520 may be configured to quantize node data of a specific layer of the artificial neural network model, weight data of a specific layer, a specific weight kernel, and/or a specific feature map based on the memory size of the NPU memory system 120, and the artificial neural network model evaluation module 1530 may be configured to evaluate the size of quantized data for each quantized node data, weight data, weight kernel, and/or feature map. The size of the target data may be determined based on the memory size of the NPU memory system 120. Accordingly, the optimization module 1520 may be configured to gradually reduce the number of bits of node data and/or weight data of a specific layer of the artificial neural network model to be quantized in order to achieve a target data size. The node data size of a specific layer of the artificial neural network model, the weight data size of the specific layer, the data size of the specific weight kernel, and/or the data size of the specific feature map may be quantized to be smaller than the memory size of the NPU memory system 120. At this time, the artificial neural network model evaluation module 1520 may be configured to evaluate the inference accuracy of the quantized node data, weight data, weight kernel, and/or feature map smaller than the memory size of the NPU memory system 120. In addition, when the size of the specific data of the artificial neural network model is smaller than the memory size of the NPU memory system 120, there is an effect that the inference operation can be efficiently performed only with the internal memory of the NPU memory system 120.

The optimization module 1520 may be configured to quantize node data of a specific layer, weight data of a specific layer, a specific weight kernel, and/or a specific feature map of the artificial neural network model based on the memory size of the NPU memory system 120 and the memory size of the main memory system 1070, and the artificial neural network model evaluation module 1530 may be configured to evaluate the size of quantized data for each quantized node data, weight data, weight kernel, and/or feature map. The size of the target data may be determined based on the memory sizes of the NPU memory system 120 and the main memory system 1070. Accordingly, the optimization module 1520 may be configured to gradually reduce the number of bits of node data and/or weight data of a specific layer of the artificial neural network model to be quantized in order to achieve a target data size. The node data size of a specific layer, the weight data size of a specific layer, the data size of a specific weight kernel, and/or the data size of a specific feature map of the artificial neural network model may be quantized to be smaller than the memory size of the NPU memory system 120 and/or the memory size of the main memory system 1070. At this time, the artificial neural network model evaluation module 1520 is configured to evaluate the inference accuracy of node data, weight data, weight kernel, and/or feature map quantized to be smaller than the memory size of the NPU memory system 120 and/or the memory size of the main memory system 1070. In other words, when the size of specific data of the artificial neural network model is smaller than the memory size of the NPU memory system 120 and/or the memory size of the main memory system 1070, there is an effect that the inference operation can be efficiently performed by selectively using the memory of the NPU memory system 120 and the memory of the main memory system 1070.

The main memory system 1070 of the edge device 1000 may be configured to include on-chip memory and/or off-chip memory.

The neural network processing unit 100 may be configured to divide and stores the data of the artificial neural network model in the NPU memory system 120 and the main memory system 170 based on the maximum transfer rate and access latency information of each memory of the main memory system 1070.

For example, when the size of specific data is smaller than the memory size of the NPU memory system 120, the data is stored in the NPU memory system 120 and data larger than the memory size of the NPU memory system 120 may be stored in the main memory system 1070.

For example, a weight kernel having a high frequency of use and a small data size may be stored in the NPU memory system 120, and the feature map may be stored in the main memory system 1070.

When information such as weight data, node data, input data, and the like of the artificial neural network model is stored in each memory, and the neural network processing unit 100 refers to information such as available memory bandwidth, maximum memory bandwidth, and memory access latency of each memory, memory management efficiency may be improved, so that the operation speed of the neural network processing unit 100 may be improved.

When the artificial neural network model to which the quantization algorithm is applied is provided to the neural network processing unit 100 of the edge device 1000, the optimization system 1500 may be configured to provide node data of each layer of the quantized artificial neural network model and quantized bit number data of weight data of each layer.

When the neural network processing unit 100 stores the node data of each quantized layer and the weight data of each quantized layer in the NPU memory system 120, it may be configured to be stored in the NPU memory system 120 as an individually quantized number of bits. In detail, the conventional memory may be configured to store data in units of 8 bits, 16 bits, 32 bits, 64 bits, or 128 bits. However, the NPU memory system 120 may be configured to store the weight data and node data of the artificial neural network model as the number of quantized bits.

For example, the weight data of the layer quantized to three bits may be stored in the NPU memory system 120 or the main memory system 1070 in a unit of three bits. The node data of the layer quantized to seven bits may be stored in the NPU memory system 120 in a unit of seven bits.

For example, the NPU memory system 120 may be configured to store eight weight data quantized to four bits in a memory cell stored in a unit of 32 bits.

Therefore, the neural network processing unit 100 has the effect of efficiently storing the quantized data in the NPU memory system 120 because it has quantized bit number data for each layer.

According to the above-described configuration, as the number of bits of data of each input unit of the first processing element PE1 is reduced, the memory usage and the amount of calculation may be reduced. In addition, since data can be stored in the number of quantized bits in the NPU memory system 120 or the main memory system 1070, there is an effect that the memory usage efficiency can be improved.

The quantization algorithm may be configured to evaluate inference accuracy while gradually reducing the number of bits of node data and weight data of all layers of the artificial neural network model. For example, the quantization algorithm may be configured to reduce the number of bits of node data and weight data of all layers from 32 bits to 31 bits, and then from 31 bits to 30 bits. In this case, the number of bits may be quantized within a range in which the inference accuracy is not substantially reduced for each layer. When the number of bits is reduced, there is an effect that the size of node data and weight data of each layer can be reduced. Therefore, there is an effect that the data size of the artificial neural network model can be reduced.

The artificial neural network model evaluation module 1530 may evaluate the artificial neural network model to which the quantization algorithm is applied. If the evaluated inference accuracy is higher than the target inference accuracy, the artificial neural network model evaluation module 1530 may be configured to instruct the optimization module 1520 to gradually reduce the number of bits of the quantization algorithm of the artificial neural network model. Whenever the number of bits decreases, the artificial neural network model evaluation module 1530 is configured to evaluate the inference accuracy. The artificial neural network model evaluation module 1530 may be configured to gradually reduce the data size of the artificial neural network model by repeatedly instructing the quantization algorithm until the evaluated inference accuracy falls below the target inference accuracy. In this case, the artificial neural network model evaluation module 1530 may be configured to store and evaluate various versions of the artificial neural network model to which the number of bits is selectively applied.

According to the above-described configuration, there is an effect that the optimization system 1500 can generate an artificial neural network model in which the number of bits of node data and weight data of all layers is minimized while evaluating and comparing various versions of quantized artificial neural network models while minimizing deterioration in inference accuracy of the artificial neural network model.

The quantization algorithm may be configured to reduce the number of bits of node data and/or weight data of at least one connection network among all layers of the artificial neural network model. For example, the quantization algorithm may be configured to reduce the number of bits of node data of a specific layer by reducing and evaluating the node data of a specific layer from thirty-two bits to thirty-one bits, and reducing and evaluating the node data of the corresponding layer from thirty-one bits to thirty bits. When the number of bits of node data and/or weight data of a specific layer is decreased, there is an effect that a quantization degree of a specific layer may be increased. The number of quantized bits may be evaluated while being reduced by a specific bit unit. Here, the specific bit unit may be one bit or more, and is not limited to the number of bits. In this case, the number of bits of each layer may be individually reduced within a range in which the evaluated inference accuracy is not substantially deteriorated.

The quantization algorithm may be configured to preferentially quantize node data and/or weight data of a specific layer among node data and/or weight data of a plurality of layers.

For example, the quantization algorithm may preferentially select and quantize node data and/or weight data of a layer having the largest data size among node data and/or weight data of a plurality of layers.

For example, the quantization algorithm may preferentially select and quantize node data and/or weight data of some layers in an order of the largest data size among node data and/or weight data of a plurality of layers. For example, weight data of the upper three layers having the largest data size may be preferentially quantized.

In other words, when the quantization degree of the node data and/or weight data of the layer with the largest data size among the layers of the artificial neural network model is higher than the quantization degree of the node data and/or weight data of the layer with the smallest data size, the quantization degree of the layer having the largest data size may be higher than the quantization degree of the layer having the smallest data size.

Therefore, in the quantized artificial neural network model, the quantization degree of layers with a large data size may be higher than the quantization degree of layers with a small data size.

According to the above-described configuration, the quantization degree of node data and/or weight data of layers with large data may be relatively high. As a result, the overall size of the artificial neural network model can be made lighter, power consumption can be reduced, and the deterioration of inference accuracy can be minimized.

The quantization algorithm may be configured to perform optimization based on structure data of an artificial neural network model or artificial neural network data locality information. The quantization order of the quantization algorithm may be determined based on various criteria based on structure data of an artificial neural network model or artificial neural network data locality information. The artificial neural network model evaluation module 1530 may be configured to perform optimization based on the structure data of the neural network processing unit 100.

For example, the quantization algorithm may preferentially quantize a layer with the largest amount of computation among node data and/or weight data of a plurality of layers.

For example, the quantization algorithm may preferentially select and quantize node data and/or weight data of some layers in an order of the greatest amount of computation among node data and/or weight data of a plurality of layers.

For example, the quantization algorithm may preferentially quantize node data and/or weight data of a layer of an upper group with the largest amount of computation. The number of upper groups may be, for example, three, five, or the like.

For example, the quantization algorithm may preferentially quantize weight data with high frequency of use. For example, in the case of the artificial neural network model of VGG16, it is possible to use weight data of a specific layer as weight data of another layer.

In other words, when one of the layers of the artificial neural network model is quantized with a specific number of bits, the quantized layer affects the operation of all other layers. That is, the degree of optimization of the layer quantized later may vary depending on the layer quantized first.

In other words, if the node data and/or weight data of the layer sensitive to quantization are first quantized although the amount of computation is small or the data size is small, quantization efficiency of node data and/or weight data of a layer having the largest amount of computation or the largest data size may decrease.

In other words, if the node data and/or weight data of a layer with a large amount of computation or large data size and less sensitive to pruning are first quantized, even if the quantization efficiency of node data and/or weight data of a layer having a small amount of computation or a small data size is reduced, the overall quantization efficiency of the artificial neural network model can be improved.

In other words, when the quantization degree of the node data and/or weight data of the layer with the largest amount of computation among the layers of the artificial neural network model is set higher than the quantization degree of the node data and/or weight data of the layer with the least amount of computation, the number of bits of data of a layer having the largest amount of computation may be smaller than the number of bits of data of a layer having the least amount of computation. Here, the number of bits of data of a specific layer may be the sum of the number of bits of node data of the corresponding layer and the number of bits of weight data.

Therefore, the quantization degree of layers with a large amount of computation of the artificial neural network model may be higher than the quantization degree of layers with a small amount of computation.

If the evaluated inference accuracy of the quantized layer is higher than the target inference accuracy, the artificial neural network model evaluation module 1530 may be configured to gradually reduce the number of bits of node data and/or weight data of the layer being quantized by the optimization module 1520. If the number of bits decreases, the artificial neural network model evaluation module 1530 is configured to evaluate the inference accuracy of the artificial neural network model to which the quantized layer is applied. The artificial neural network model evaluation module 1530 may be configured to gradually reduce the data size of the artificial neural network model by repeatedly applying the quantization algorithm until the evaluated inference accuracy falls below the target inference accuracy. In this case, the artificial neural network model evaluation module 1530 may be configured to store and evaluate various versions of the artificial neural network model to which the number of bits is selectively applied.

If the data size of the evaluated layer is larger than the target data size of the layer, the artificial neural network model evaluation module 1530 may be configured to evaluate both the inference accuracy and the data size of the layer while repeating the act of reducing the number of bits. The final number of bits of a specific quantized layer may be determined as the number of bits at which the data size of the layer becomes smaller than the target data size of the layer. If the evaluated inference accuracy is lower than the target inference accuracy, the final number of bits may be determined as the number of bits before the evaluated inference accuracy becomes lower than the target inference accuracy.

When the quantization of node data and/or weight data of a specific layer is optimized, the optimization system 1500 terminates quantization of the corresponding layer and fixes the number of bits of node data and/or weight data of the optimized layer. Next, the optimization system 1500 may then quantize node data and/or weight data of each layer of the artificial neural network model in a manner that starts quantization of node data and/or weight data of other layers. Accordingly, there is an effect that the quantization degree of node data and/or weight data of each layer of the artificial neural network model can be optimized for each layer. That is, the degree of quantization of node data of each layer of the artificial neural network model has an effect that can be optimized for each layer. That is, the degree of quantization of the weight data of each layer of the artificial neural network model has an effect that can be optimized for each layer.

In other words, if the quantization of node data and/or weight data of all layers of the artificial neural network model is the same, the degree of degradation of inference accuracy of the artificial neural network model may be significantly increased. However, in this case, there is a disadvantage in that it cannot be determined which layer has reduced inference accuracy by the quantization algorithm.

However, according to the above-described configuration, since the inference accuracy of the artificial neural network model can be evaluated while selectively varying the quantization degree for each node data and/or weight data of a specific layer of the artificial neural network model, there is an effect that the quantization level of the artificial neural network model can be optimized for each layer node data and/or weight data by applying the quantization degree of layers that are not sensitive to quantization higher than the quantization level of layers that are sensitive to quantization.

The artificial neural network model evaluation module 1530 may be configured to perform optimization based on structure data of the main memory system 1070 of the edge device 1000.

The optimization module 1520 quantizes node data of a specific layer and/or weight data of a specific layer of the artificial neural network model based on the memory size of the memory system 1070, and the artificial neural network model evaluation module 1530 may be configured to evaluate the size of data of a quantized layer for each quantized layer. The target data size of the layer may be determined based on the memory size of the NPU memory system 120.

If the data size of the evaluated layer is larger than the target data size of the layer, the artificial neural network model evaluation module 1530 may be configured to evaluate both the inference accuracy and the data size of the layer while repeating the act of reducing the number of bits of a specific layer. The final number of bits of a specific quantized layer may be determined as the number of bits at which the data size of the layer becomes smaller than the target data size of the layer. If the evaluated accuracy is lower than the target inference accuracy, the final number of bits may be determined as the number of bits before the evaluated inference accuracy is lower than the target inference accuracy.

Node data of each layer and weight data of each layer of the quantized artificial neural network model may be configured to have individually optimized number of bits. According to the above-described configuration, since the node data of each layer and the weight data of each layer of the quantized artificial neural network model were individually quantized, the inference accuracy was evaluated individually, so there is an effect that the node data of each layer and the weight data of each layer can have individually optimized number of bits without substantially reducing the inference accuracy of the artificial neural network model.

In addition, since the artificial neural network model can be quantized in consideration of the hardware characteristics of the neural network processing unit 100 and/or the edge device 1000, there is an effect that can be optimized for the neural network processing unit 100 and/or the edge device 1000.

Hereinafter, an example of a method for optimizing an artificial neural network model using a quantization algorithm will be described.

The optimization system 1500 may provide an artificial neural network model to be quantized through the artificial neural network model reading module 1510.

The optimization system 1500 may be configured to analyze the structure data of an artificial neural network model to be optimized or the artificial neural network data locality information. Furthermore, the optimization system 1500 may be configured to further analyze the artificial neural network model structure data to be optimized or the artificial neural network data locality information and the structure data of the neural network processing unit 100. Furthermore, the optimization system 1500 may be configured to further analyze the artificial neural network model structure data to be optimized or the artificial neural network data locality information, the structure data of the neural network processing unit 100, and the structure data of the edge device 1000.

The above-described structure data or the artificial neural network data locality information analysis can be implemented in one of the artificial neural network model reading module 1510, the optimization module 1520, and the artificial neural network model evaluation module 1530 of the optimization system 1500. Here, an example in which the optimization module 1520 analyzes at least one of structure data or artificial neural network data locality information will be described, but the present disclosure is not limited thereto.

The optimization module 1520 may be configured to apply a quantization algorithm to an artificial neural network model to be optimized.

For example, the optimization module 1520 may be configured to perform a grouping policy of a quantization algorithm. The grouping policy may be a policy of grouping quantized data among structure data of an artificial neural network model or artificial neural network data locality information according to a specific criterion.

That is, the quantization algorithm can group and quantize data having features or a common denominator. The features may include similar or common features for grouping. In this case, the degree of reduction in the number of bits of the quantization algorithm can be improved and the deterioration in inference accuracy can be minimized.

The grouping policy may be subdivided into a first grouping policy, a second grouping policy, a third grouping policy, and a fourth grouping policy.

The first grouping policy is a policy for grouping based on the operation sequence or scheduling order of the artificial neural network model. The optimization system 1500 may analyze the operation sequence of the artificial neural network model by analyzing the artificial neural network model structure data or the artificial neural network data locality information. Therefore, when the first grouping policy is selected, the quantization sequence may be determined by grouping each layer or weighted kernel of the artificial neural network model.

For example, the first grouping policy may determine a quantization sequence by grouping at least one layer. In more detail, for example, node data and/or weight data of at least one layer may be grouped. In this case, node data and/or weight data of at least one layer may be grouped and quantized by a predetermined number of bits. That is, one layer or a plurality of layers may be quantized according to an operation sequence for each analyzed group.

For example, the first grouping policy may determine a quantization sequence by grouping at least one weight kernel. In more detail, for example, at least one weight kernel and/or feature map may be grouped. In this case, at least one weight kernel and/or feature map may be grouped and quantized by a predetermined number of bits. That is, one weight kernel or a plurality of weight kernels may be quantized according to an operation sequence for each analyzed group.

The reason for the first grouping policy is that, in the case of a specific artificial neural network model, the earlier the layer in the operation sequence, the greater the degradation of inference accuracy during quantization. In this case, if the degradation of inference accuracy due to quantization is verified in advance while preferentially quantizing the layer or convolution placed in front, which may be sensitive to quantization, it is possible to improve the quantization degree of the quantization-insensitive layer or convolution placed at the back while minimizing the reduction in the inference accuracy of the quantized artificial neural network model. However, the present disclosure is not limited thereto, and in a specific artificial neural network model, a layer disposed at the back may be more sensitive to quantization.

The second grouping policy is a grouping policy based on the size of the computational amount of the artificial neural network model. The optimization system 1500 may analyze the amount of computation of the artificial neural network model by analyzing the artificial neural network model structure data or the artificial neural network data locality information. Therefore, when the second grouping policy is selected, the quantization sequence may be determined by grouping by layer or weighted kernel of the artificial neural network model.

For example, the second grouping policy may determine a quantization sequence by grouping at least one layer. In more detail, for example, node data and/or weight data of at least one layer may be grouped. In this case, node data and/or weight data of at least one layer may be grouped and quantized by a predetermined number of bits. That is, one layer or a plurality of layers may be quantized according to the order of the amount of computation for each analyzed group.

For example, the second grouping policy may determine a quantization sequence by grouping at least one weight kernel. In more detail, for example, at least one weight kernel and/or feature map may be grouped. In this case, at least one weight kernel and/or feature map may be grouped and quantized by a predetermined number of bits. That is, one weight kernel or a plurality of weight kernels may be quantized according to the order of the amount of computation for each analyzed group.

The reason for the second grouping policy is that, in the case of a specific artificial neural network model, the difference in the amount of computation for each layer or for each weighted kernel may be quite large. In this case, if a layer or a convolution with a large amount of computation is first quantized and the deterioration of inference accuracy due to quantization is verified in advance, the reduction in inference accuracy of the quantized artificial neural network model can be minimized while reducing the amount of computation. However, the present disclosure is not limited thereto.

The third grouping policy is a grouping policy based on the memory usage size of the artificial neural network model. The optimization system 1500 may analyze the memory usage size of the artificial neural network model by analyzing the artificial neural network model structure data or the artificial neural network data locality information. Therefore, when the third grouping policy is selected, the quantization sequence can be determined by grouping by layer or weighted kernel of the artificial neural network model.

For example, the third grouping policy may determine a quantization sequence by grouping at least one layer. In more detail, for example, node data and/or weight data of at least one layer may be grouped. In this case, node data and/or weight data of at least one layer may be grouped and quantized by a predetermined number of bits. That is, one layer or a plurality of layers may be quantized according to the sequence of memory usage size for each analyzed group.

For example, the third grouping policy may determine a quantization sequence by grouping at least one weight kernel. In more detail, for example, at least one weight kernel and/or feature map may be grouped. In this case, at least one weight kernel and/or feature map may be grouped and quantized by a predetermined number of bits. That is, one weight kernel or a plurality of weight kernels may be quantized according to the sequence of memory usage size for each analyzed group.

The reason for the third grouping policy is that, in the case of a specific artificial neural network model, the size difference in memory usage may be quite large for each layer or for each weighted kernel. In this case, if a layer or convolution with a large memory usage size is first quantized and the inference accuracy degradation due to quantization is verified in advance, it is possible to minimize the reduction in the inference accuracy of the quantized artificial neural network model while reducing the memory usage. However, the present disclosure is not limited thereto.

The fourth grouping policy is a policy for selectively applying the first to third grouping policies. Since each of the above-described policies may have advantages and disadvantages, the first to third grouping policies may be selectively used according to the characteristics of the artificial neural network model. For example, in the case of a specific artificial neural network model, the quantization sequence may be determined in the order of memory usage size as the first priority. However, as the second priority, the quantization sequence may be readjusted in the order of the amount of computation. In addition, as the third priority, the quantization sequence may be rearranged in the operation sequence. When each grouping policy is combined and applied, the optimization system 1500 may be configured to provide a grouping policy of various combinations by giving each grouping policy a weight value.

The optimization system 1500 completes data grouping for quantization of the artificial neural network model according to a policy selected among the grouping policies described-above, and the ordered data groups may be sequentially quantized.

The optimization system 1500 is configured to sequentially quantize the ordered grouped data according to the grouping policy. The quantization algorithm can be quantized according to the quantization degree. When the quantization degree is one, data grouped can be quantized by one bit. If the quantization degree is two, data grouped can be quantized by two bits. That is, the quantization degree may be an integer of one or more.

The optimization module 1520 may selectively apply a quantization aware training algorithm to improve inference accuracy of an artificial neural network model to which quantization is applied. The quantization aware training algorithm quantizes a data group and then performs re-training to compensate for the decrease in inference accuracy of the artificial neural network model due to quantization.

The artificial neural network model evaluation module 1530 is configured to evaluate the inference accuracy, memory usage requirements, power consumption, computational performance, for example, number of inferences per second, and the like of the artificial neural network model including the data group being quantized determined by the grouping policy. For example, the artificial neural network model evaluation module 1530 may be configured to provide the evaluation result through various cost functions.

If the evaluated inference accuracy of the artificial neural network model including the data group being quantized is higher than the target inference accuracy set in the artificial neural network model evaluation module 1530, the artificial neural network model evaluation module 1530 instructs the optimization module 1520 to further reduce the number of bits of the artificial neural network model including the data group being quantized. Then, the inference accuracy of the artificial neural network model including the data group being quantized with a further reduced number of bits is evaluated again. The above-described quantization of the data group being quantized may be repeated until the evaluated inference accuracy of the artificial neural network model becomes smaller than the target inference accuracy.

If the evaluated inference accuracy of the artificial neural network model including the data group being quantized is less than the target inference accuracy set in the neural network model evaluation module 1530, the artificial neural network model evaluation module 1530 may be configured to restore the quantized data group to the moment when the target inference accuracy was high and terminate the quantization of the quantized data group to determine the number of quantized bits.

When the above-described quantization of the data group is completed, quantization of the data group next in order may be started, and quantization of each data group may be repeated in the same order. Therefore, all data groups may be quantized according to a preset grouping policy order.

The artificial neural network model evaluation module 1530 may be configured to simulate performance of the artificial neural network model quantized according to the grouping policy order when operating in the neural network processing unit 100.

The artificial neural network model evaluation module 1530 of the optimization system 1500 may be configured to receive various data from the edge device 1000 and the neural network processing unit 100 and to provide a simulation result of the quantized artificial neural network model according to the grouping policy order.

The optimization system 1500 may simulate the quantized artificial neural network model according to the grouping policy order, and determine whether the corresponding artificial neural network model can be adequately operated in the edge device 1000 including the neural network processing unit 100.

The optimization system 1500 may provide simulation results or simulation estimates, such as computation time, number of inferences per second, hardware resource usage, inference accuracy, and power consumption, when the artificial neural network model quantized according to the grouping policy order, operates on a specific edge device including a specific neural network processing unit by utilizing data such as the computational processing power, available memory bandwidth, maximum memory bandwidth, memory access latency, and the like, and data such as the amount of computation and memory usage of each layer of the artificial neural network model of the edge device 1000 and the neural network processing unit 100.

The optimization system 1500 may be configured to determine the priority of the grouping policy by considering application requirements, for example, inference accuracy, memory size limit, power consumption limit, inference speed limit per second, and the like, of the edge device 1000, the neural network processing unit 100, and/or the artificial neural network model in combination.

For example, when the inference rate per second should be prioritized among the performance of a specific edge device, the optimization system 1500 may optimize the artificial neural network model by changing the grouping policy order of the optimization module 1520 to reduce the amount of computation in consideration of application characteristics of a specific edge device.

For example, when memory usage should be prioritized among the performance of a specific edge device, the optimization system 1500 may optimize the artificial neural network model by changing the grouping policy order of the optimization module 1520 to reduce memory usage in consideration of application characteristics of a specific edge device.

The model compression algorithm is a technique for compressing weight data, activation map, or feature map of an artificial neural network model. The compression technique may utilize conventional known compression techniques. Therefore, the data size of the artificial neural network model can be reduced.

According to the above configuration, the optimization module 1520 has an effect that the data size can be reduced when the artificial neural network model compressed into data of a relatively small size is stored in the NPU memory system 120.

The re-training algorithm is a technology capable of compensating for inference accuracy that is deteriorated when various algorithms of the optimization module 1520 are applied. For example, when techniques such as a quantization algorithm, a pruning algorithm, and a model compression algorithm are applied, the inference accuracy of the artificial neural network model may be reduced. In this case, the optimization system 1500 may retrain the pruned, quantized, and/or compressed artificial neural network model. In this case, there is an effect that the accuracy of the retrained artificial neural network model can be increased again. Accordingly, there is an effect that can improve the performance of the portable artificial neural network apparatus 100 with limited hardware resources.

The optimization system 1500 may be configured to include one or more training data sets and a corresponding evaluation data set to perform a retraining algorithm.

The transfer learning algorithm is a type of re-learning algorithm and may be included in the retraining algorithm. Transfer learning algorithms can also be configured to use knowledge distillation techniques. The knowledge distillation technology is a technology for learning a lightweight artificial neural network model that is intended to be applied to the edge device 1000 by using an artificial neural network model with a relatively large size of data that has been trained well as a reference model. For example, an artificial neural network having a relatively large size of previously trained data may be an artificial neural network model composed of about one hundred layers of an input layer, hidden layers, and an output layer, and an artificial neural network model to be applied to the edge device 1000 may be an artificial neural network model composed of about fifty layers of an input layer, hidden layers, and an output layer. That is, a large artificial neural network model having a relatively large number of layers and a relatively large amount of weight data implements a relatively high level of artificial intelligence, but it is difficult to adequately process a large amount of computation in a hardware resource-constrained environment such as the edge device 1000. In this case, when training a relatively small artificial neural network model, when a lightweight artificial neural network model is trained using the data and information of an artificial neural network model that has completed training and has excellent performance but has a relatively large data size, it has the effect of shortening the training time of the lightweight artificial neural network model and achieving the inference accuracy similar. The transfer learning algorithm may be configured to store the artificial neural network model to be referenced. The artificial neural network models to be referenced are the reference models, and may be stored in the optimization system.

The quantization aware retraining algorithm is an algorithm that can be included in the retraining algorithm as a type of retraining algorithm. The quantization aware training algorithm is a technology for retraining a quantized artificial neural network model using training dataset. When the quantized artificial neural network model is retrained with training dataset once again, there is an effect that the inference accuracy of the artificial neural network model can be improved.

The artificial intelligence-based optimization algorithm is not based on a weight reduction method such as a method of generating an optimally lightweight artificial neural network model through a process in which the optimization system 1500 searches the structure of an artificial neural network model in an artificial intelligence reinforcement training method using various algorithms of the optimization module 1520 or a lightweight method such as a quantization algorithm, a pruning algorithm, a retraining algorithm, a model compression algorithm, and a model compression algorithm, but is a method in which the artificial intelligence of the optimization system 1500 performs a weight reduction process by itself to obtain an optimal weight reduction result.

The optimization system 1500 may be configured to selectively apply a plurality of optimization algorithms to the artificial neural network model to be optimized through the optimization module 1520

For example, the optimization system 1500 may be configured to provide a lightweight artificial neural network model by applying a pruning algorithm.

For example, the optimization system 1500 may be configured to provide a lightweight artificial neural network model by applying a pruning algorithm and then applying a quantization algorithm.

For example, the optimization system 1500 may be configured to provide a lightweight artificial neural network model by applying a pruning algorithm, then applying a quantization algorithm, and then applying a retraining algorithm.

For example, the optimization system 1500 may be configured to provide a lightweight artificial neural network model by applying the pruning algorithm, then applying the quantization algorithm, then applying the retraining algorithm, and then applying the model compression algorithm.

According to the above-described configuration, there is an effect that the optimization efficiency of the artificial neural network model can be improved according to the order of applying the algorithm.

According to the above-described configuration, there is an effect that the optimization system 1500 sequentially applies at least one optimization algorithm included in the various optimization modules 1520 to optimize an artificial neural network model that can be operated in the neural network processing unit 100 applied to the edge device 1000.

The artificial neural network model evaluation module 1530 is configured to receive the evaluation data set of the artificial neural network model to be verified. For example, if the artificial neural network model is a car inference model, the evaluation data set may be image files of various cars. The artificial neural network model evaluation module 1530 is configured to input the evaluation data set into the artificial neural network model to determine inference accuracy. Depending on the evaluated inference accuracy and/or the degree of weight reduction, the optimization system 1500 may repeat or terminate the optimization.

The artificial neural network model update module 1540 is configured to update the optimized model and provide it to an external system connected to the optimization system 1500. Accordingly, the edge device 1000 may receive an optimized artificial neural network model from the optimization system 1500.

Figure 12:
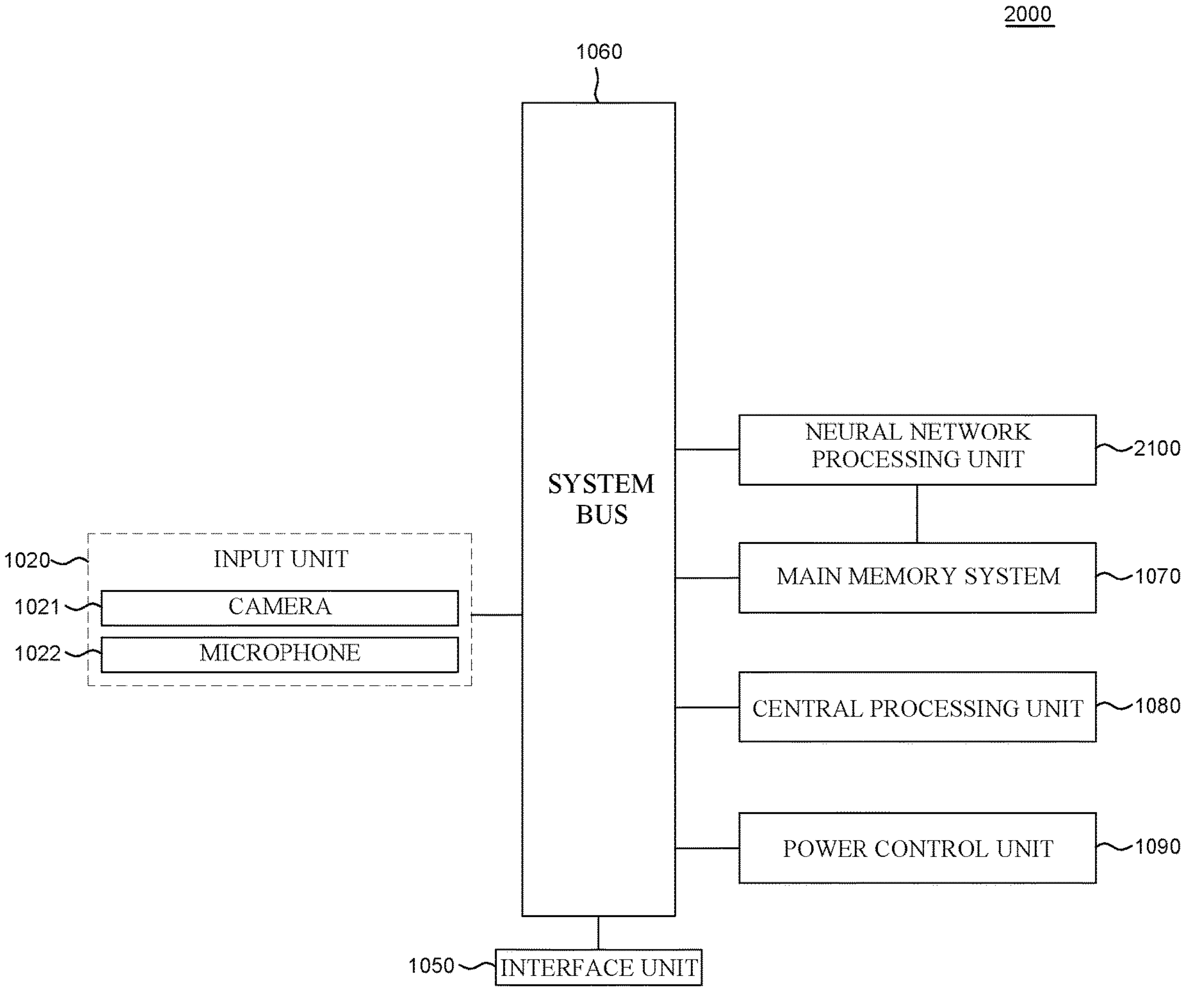
FIG. 12 is a schematic conceptual diagram illustrating an edge device according to another embodiment of the present disclosure.
Figure 13:
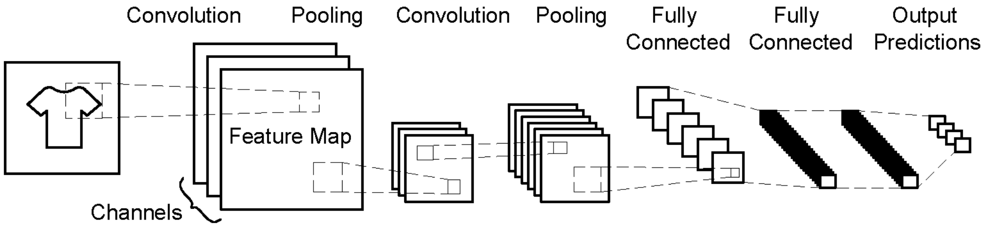
FIG. 13 is a schematic conceptual diagram illustrating a convolutional neural network.

FIG. 12 is a schematic conceptual diagram illustrating an edge device according to another embodiment of the present disclosure.

The edge device 2000 according to the other embodiment of the present disclosure is an example configured to provide various values to users by applying various embodiment of the present disclosure.

The edge device 2000 is characterized in that it is configured to provide keyword recognition and gesture recognition through one neural network processing unit 2100. That is, it is characterized in that one neural network processing unit 2100 is configured to provide a plurality of inference functions. According to the above configuration, the edge device 2000 may perform a plurality of inference operations with one neural network processing unit, thereby reducing the number of components and manufacturing cost of the edge device 2000.

The above-described edge device 1000 and the edge device 2000 according to the other embodiment of the present disclosure include a plurality of substantially similar configurations. Therefore, for the convenience of description only, redundant descriptions may be omitted.

The edge device 2000 may be variously modified. For example, the neural network processing unit 2100 may be configured substantially the same as one of the neural network processing unit 100, the neural network processing unit 200, the neural network processing unit 300, and the neural network processing unit 400 described above.

The edge device 2000 is a mobile phone, a smart phone, an artificial intelligence speaker, a digital broadcast terminal, a navigation device, a smart refrigerator, a smart television, an artificial intelligence CCTV, a tablet, a notebook computer, an autonomous vehicle, a personal digital assistance (PDA), or a personal multimedia player (PMP). However, embodiments of the present disclosure are not limited thereto.

The central processing unit 1080 may be configured to control the power control unit 1090 and the neural network processing unit 2100. The power control unit 1090 may be configured to selectively supply or cut-off power of each element of the edge device 2000. However, embodiments of the present disclosure are not limited thereto.

The edge device 2000 may be configured to include an input unit 1020 including at least a neural network processing unit 2100, a camera 1021, and a microphone 1022.

The camera 1021 and the microphone 1022 may also be referred to as an input unit 1020 configured to provide a plurality of sensing data.

The input unit 1020 is not limited to the camera 1021 and the microphone 1022, and may be made of a combination of elements of the above-described input unit 1020.

Hereinafter, for convenience of description, an example to which the camera 1021 and the microphone 1022 are applied will be described in detail.

The edge device 2000 may be configured to include at least a microphone 1022 configured to sense acoustic data, a camera 1021 configured to sense image data, and a neural network processing unit 2100 configured to perform at least two different inference operations. The neural network processing unit 2100 may be configured to drive the trained AI keyword recognition model to infer keywords based on acoustic data. Further, the neural network processing unit 2100 may drive the AI gesture recognition model trained to infer a gesture based on the image data in response to the keyword inference result.

Specifically, for example, the edge device 2000 may be in the first mode to reduce power consumption. The first mode may also be referred to as a sleep mode.

The first mode may be set when there is no particular input to the edge device 2000 for a predetermined time. When there is no input for a predetermined time, the central processing unit 1080 may instruct the power control unit 1090 to put the edge device 2000 in the first mode. However, embodiments of the present disclosure are not limited thereto. The power control unit 1090 may be configured to supply power to the microphone 1022 and cut-off power to the camera 1021 in the first mode. According to the above-described configuration, the edge device 2000 has an effect of suppressing power consumption of the camera 1021 in the first mode. In addition, there is an effect of preventing misjudgment of a gesture due to an unintended operation of the user in the first mode.

In more detail, in the first mode, the power control unit 1090 may be configured to selectively cut-off power of various elements.

For example, when the edge device 2000 includes an output unit, the power control unit 1090 may be configured to cut-off power to the output unit.

For example, when the edge device 2000 includes a wireless communication unit, the power control unit 1090 may be configured to cut-off the power of the wireless communication unit.

That is, the power control unit 1090 may provide various power cut-off policies according to the configuration of the edge device 2000.

The neural network processing unit 2100 may be configured to stop inference of the AI gesture recognition model in the first mode. Accordingly, the edge device 2000 has an effect of simultaneously reducing power consumption of the camera 1021 and the neural network processing unit 2100.

In the first mode, when the user speaks a specific keyword into the microphone 1022 of the edge device 2000, the neural network processing unit 2100 may be configured to receive acoustic data and drive the AI keyword recognition model to infer a keyword capable of driving the AI gesture recognition model. That is, when a specific keyword is input into the microphone 1022 in the first mode, the AI gesture recognition model may be driven in response to the inference result of the AI keyword recognition model of the neural network processing unit 400.

In this case, the AI keyword recognition model may be an artificial neural network trained to recognize only specific keywords. For example, specific keywords may be simple keyword commands such as "Alexa," "Hey Siri," "Volume Up," "Volume Down," "Search," "Turn On," "Turn Off," "Internet," "Music," and "Movie." For example, certain keywords may be one to one hundred frequently used keyword commands.

The edge device 2000 may be switched from the first mode to the second mode according to the inference result.

The central processing unit 1080 may receive the inference result of the AI keyword recognition model of the neural network processing unit 2100 and instruct the power control unit 1090 to set the edge device 2000 to the second mode. The power control unit 1090 may be configured to supply power to the camera 1021 in the second mode.

Subsequently, the neural network processing unit 2100 may be configured to perform an inference operation of the AI gesture recognition model in the second mode.

In this case, the AI gesture recognition model may be an artificial neural network trained to recognize only specific gestures. For example, the specific gestures may be specific hand gestures, body gestures, facial expressions, and the like.

In more detail, the neural network processing unit 2100 of the edge device 2000 may be configured as a stand-alone neural network processing unit. That is, the edge device 2000 may be configured to independently perform an inference operation by a stand-alone neural network processing unit. If the edge device receives the artificial neural network inference service from the cloud computing-based server through the wireless communication network, the data of the camera 1021 and the microphone 1022 for inference must be stored in the main memory system 1070 and then transmitted through a wireless communication unit.

As described above, the main memory system 1070 is inefficient compared to the NPU memory system in terms of power consumption. However, there is an effect of reducing power consumption of the edge device 2100 by the neural network processing unit 2100 that can operate independently.

Also, the voice data and the image data may include private data. If the edge device continuously transmits conversations or captured images of the user's private life through the wireless communication unit, a privacy problem may occur.

Accordingly, the edge device 2000 may infer and then delete data of the input unit 1020 that may include privacy data by the neural network processing unit 2100. That is, image data and sound data in which privacy data may be included may be deleted after an inference operation by the neural network processing unit 2100.

Also, the edge device 2000 may be configured to block transmission of data of the input unit 1020 that may include privacy data through the wireless communication unit.

Also, the edge device 2000 may be configured not to store data of the input unit 1020, which may include privacy data, in the main memory system 1070.

Also, the edge device 2000 may be configured to classify data of the input unit 1020 that may include privacy data into data that includes privacy data.

According to the above-described configurations, the edge device 2000 provides convenience to the user, reduces power consumption, and prevents the problem of disclosing the privacy, simultaneously.

On the other hand, the neural network processing unit 2100 may be optimized to provide a multi-tasking function. The neural network processing unit 2100 may be configured to drive at least two artificial neural network models to provide at least two different inference operations. In addition, it may be configured to drive another artificial neural network model according to the inference result of one artificial neural network model. That is, one artificial neural network model may be an artificial neural network model that always operates, and the other artificial neural network model may be an artificial neural network model that operates under specific conditions.

That is, the edge device 2000 may be configured to include an input unit 1020 configured to provide a plurality of sensed data, and a neural network processing unit 2100 configured to drive a plurality of artificial neural network models, wherein a first artificial neural network model among the plurality of artificial neural network models may be an artificial neural network model that operates at all times, and a second artificial neural network model among the plurality of artificial neural network models may be configured as an artificial neural network model that operates under a specific condition.

According to the above-described configuration, when the artificial neural network model that operates only under a specific condition does not operate, power consumption of the edge device 2000 can be reduced.

For multi-tasking of the neural network processing unit 2100, the NPU scheduler of the neural network processing unit 2100 may be configured to determine a scheduling sequence based on structure data or artificial neural network data locality information of a plurality of neural network models.

For multi-tasking of the neural network processing unit 2100, processing elements of the neural network processing unit 2100 may be selectively assigned. For example, when the number of processing elements is one hundred, thirty processing elements may be allocated for the inference operation of the first artificial neural network model, and fifty processing elements may be allocated for the inference operation of the second artificial neural network model. In this case, the remaining unallocated processing elements may be controlled not to operate.

The NPU scheduler may determine a scheduling sequence based on the size and structure data of node data of each layer of the plurality of artificial neural network models and weight data of each connection network, and may allocate processing elements according to the scheduling sequence.

According to the above-described configuration, since specific processing elements can be assigned for inference of a specific neural network model by the NPU scheduler, there is an effect that one neural network processing unit 2100 can simultaneously infer a plurality of artificial neural network models in parallel.

Since the NPU scheduler can check the size of the node data of each layer of the plurality of artificial neural network models and the weight data of each connection network by using the artificial neural network model structure data or the artificial neural network data locality information, it is possible to calculate the amount of memory required for the inference operation for each scheduling. Accordingly, the NPU scheduler may store data required for each scheduling sequence within the memory available limit of the NPU memory system of the neural network processing unit 2100 capable of performing multi-tasking.

The NPU scheduler may be configured to set the priority of data stored in the NPU memory system.

For example, the AI keyword recognition model may be configured to always operate in the neural network processing unit 2100. Accordingly, the neural network processing unit 2100 may set the priority of data of the AI keyword recognition model to be high.

For example, the AI gesture recognition model may be configured to operate only under specific conditions in the neural network processing unit 2100. Accordingly, the neural network processing unit 2100 may set the priority of data of the AI gesture recognition model to be low.

According to the above-described configuration, since the high priority data is maintained in the NPU memory system, the memory reuse rate can be increased by reusing the stored data. Accordingly, there is an effect of reducing the inference speed and power consumption.

The neural network processing unit according to an embodiment of the present disclosure may include a processing element array, an NPU memory system configured to store at least a portion data of the artificial neural network model processed in the processing element array, and an NPU scheduler configured to control the processing element array and the NPU memory system based on the artificial neural network model structure data or artificial neural network data locality information.

The processing element array may include a plurality of processing elements configured to perform MAC operations.

The NPU scheduler may be further configured to control the read and write sequence of the processing element array and the NPU memory system.

The NPU scheduler may be further configured to control the processing element array and the NPU memory system by analyzing the artificial neural network model structure data or the artificial neural network data locality information.

The NPU scheduler may further include node data of each layer of the artificial neural network model, data of an arrangement structure of the layers, and weight data of a network connecting nodes of each layer.

The NPU scheduler may be further configured to schedule an operation sequence of the artificial neural network model based on the artificial neural network model structure data or the artificial neural network data locality information.

The NPU scheduler may be configured to schedule an operation sequence of a plurality of processing elements included in the processing element array based on the arrangement structure data of layers of the artificial neural network model among the artificial neural network model structure data.

The NPU scheduler may be configured to access a memory address value in which node data of a layer and a weight data of a connection network of an artificial neural network model is stored based on the artificial neural network model structure data or the artificial neural network data locality information.

The NPU scheduler may be configured to control the NPU memory system and the processing element array so that operations are performed in a set scheduling sequence.

The artificial neural network model may be configured to schedule a processing sequence based on a structure of layers of an artificial neural network and operation sequence data corresponding to the structure.

The neural network processing unit, wherein the NPU scheduler is configured to schedule the processing sequence based on the structure data from the input layer to the output layer of the artificial neural network or the artificial neural network data locality information of the artificial neural network model.

The NPU scheduler may be configured to improve a memory reuse rate by controlling the NPU memory system by using a scheduling sequence based on the artificial neural network model structure data or the artificial neural network data locality information.

The NPU scheduler may be configured to reuse a memory address value in which the first operation value of the first scheduling is stored as a memory address value corresponding to the node data of the second layer of the second scheduling, which is the next scheduling of the first scheduling.

The NPU scheduler may be configured to reuse the value of the memory address in which the operation result is stored for a subsequent operation.

The NPU memory system may include a static memory.

The NPU memory system may include at least one of SRAM, MRAM, STT-MRAM, eMRAM, HBM, and OST-MRAM.

The edge device according to an embodiment of the present disclosure may be configured to include a central processing unit, a main memory system configured to store an artificial neural network model, a system bus that controls communication between the central processing unit and the main memory system, and a neural network processing unit comprising a processing element array, an NPU memory system, an NPU scheduler configured to control the processing element array and the NPU memory system, and an NPU interface, wherein the NPU interface is configured to communicate with the central processing unit through the system bus, and wherein the NPU interface may be configured to directly communicate data related to the artificial neural network model with the main memory system.

The edge device may be one of a mobile phone, a smart phone, an artificial intelligence speaker, a digital broadcasting terminal, a navigation device, a wearable device, a smart watch, a smart refrigerator, a smart television, digital signage, a VR device, an AR device, an artificial intelligence CCTV, an artificial intelligence robot a vacuum cleaner, a tablet, a laptop computer, an autonomous vehicle, an autonomous drone, an autonomous biped walking robot, an autonomous quadruped robot, a device using an autonomous driving mobility service, an artificial intelligence robot, a PDA, and a PMP.

The NPU memory system of the neural network processing unit may be configured such that a read/write speed of an inference operation of an artificial neural network model is faster than and consumes less power than the main memory system.

The neural network processing unit may be configured to improve a memory reuse rate of the NPU memory system based on the artificial neural network model structure data or the artificial neural network data locality information.

The neural network processing unit may be configured to acquire data of at least one of a number of memories, a memory type, a data transmission speed, and a memory size of the main memory system.

The neural network processing unit may be configured to control the reuse of data stored in the NPU memory system based on the artificial neural network model structure data or the artificial neural network data locality information, and the neural network processing unit is configured not to request memory access to the main memory system when data is reused.

The NPU memory system may not include DRAM, and the NPU memory system may include static memory configured to have faster read and write speeds and consume less power than the main memory system.

The NPU memory system may be configured to control scheduling by comparing the data size of the artificial neural network model to be loaded from the main memory system and the memory size of the NPU memory system.

The neural network processing unit according to another embodiment of the present disclosure may be configured to include a processing element array, an NPU memory system configured to store an artificial neural network model processed in the processing element array, and an NPU scheduler configured to control the processing element array and the NPU memory system based on the artificial neural network model structure data or artificial neural network data locality information, wherein the processing element array may be configured to perform a MAC operation, and the processing element array may be configured to quantize and output the MAC operation result.

A first input of each processing element of the processing element array may be configured to receive a variable value, and a second input of each processing element of the processing element array may be configured to receive a constant value.

The processing element may be configured to include a multiplier, an adder, an accumulator and a bit quantization unit.

The NPU scheduler may be configured to recognize reusable variable values and reusable constant values based on the artificial neural network model structure data or the artificial neural network data locality information and control the NPU memory system to reuse memory using the reusable variable values and the reusable constant values.

It may be configured to reduce the number of bits of an operation value of the processing element array in consideration of MAC operation characteristics and power consumption characteristics of the processing element array.

The NPU memory system may be a low-power memory system configured to reuse a specific memory address in which weight data is stored in consideration of the data size and operation steps of the artificial neural network model.

The NPU scheduler stores the MAC operation value of the artificial neural network model according to the scheduling order in a specific memory address of the NPU memory system, and the specific memory address in which the MAC operation value is stored may be input data of the MAC operation in the next scheduling order.

The NPU system memory may be configured to preserve weight data of networks stored in the NPU system memory while the inference operation continues.

The number of updates at a memory address in which input data of the first input unit of each processing element of the processing element array is stored may be greater than the number of updates at a memory address in which input data of the second input unit is stored.

The NPU system memory may be configured to reuse the MAC operation value stored in the NPU system memory while the inference operation continues.

A neural network processing unit according to another embodiment of the present disclosure may include a processing element array comprising a plurality of processing elements and a plurality of register files, an NPU memory system configured to store the artificial neural network model processed in the processing element array, and an NPU scheduler configured to control the processing element array and the NPU memory system based on the artificial neural network model's structure data or artificial neural network data locality information.

The memory size of each of the plurality of register files is smaller than the memory size of the NPU memory system, and the maximum transmission speed of each of the plurality of register files may be higher than the maximum transmission speed of the NPU memory system.

The memory size of each of the plurality of register files may be configured to have a memory size having a maximum transmission speed that is faster than the memory size of the NPU memory system.

The memory size of each of the plurality of register files is smaller than the memory size of the NPU memory system, and the power consumption based on the same transmission speed of each of the plurality of register files may be lower than the power consumption based on the same transmission speed of the NPU memory system.

The memory size of each of the plurality of register files may be configured to have a memory size that is smaller in terms of power consumption based on the same transmission speed than the memory size of the NPU memory system.

Each of the plurality of register files may be configured as a memory having a higher maximum transmission speed than the NPU memory system and a relatively small amount of power consumption based on the same transmission speed.

An NPU memory system may further include a first memory, a second memory, and a third memory having a hierarchical structure, and an NPU scheduler may be configured to improve the memory reuse rate of the NPU memory system by controlling the first memory, the second memory, and the third memory of the NPU memory system based on the hierarchical structure based on the artificial neural network model structure data or the artificial neural network data locality information running in the neural network processing unit.

The first memory may be configured to communicate with the second memory and the third memory, and the second memory and the third memory may be configured to communicate with a plurality of processing elements and a plurality of register files.

The NPU memory system may be configured to have a plurality of memory hierarchical structures optimized for memory reuse.

The NPU scheduler may be configured to determine the size of data for each scheduling sequence, and to sequentially store data for each scheduling sequence within an available limit of the first memory.

The NPU scheduler may be configured to selectively store a portion of the data stored in the first memory in one of the second memory and the third memory by comparing the memory reuse rate.

A memory reuse rate of data stored in the second memory may be higher than a memory reuse rate of data stored in the third memory.

The NPU scheduler may be configured to delete redundant data in the first memory when the characteristic data is stored in the second memory.

Data stored in the third memory may be configured to have variable characteristics that can be reused.

An edge device according to another embodiment of the present disclosure may include a microphone configured to detect acoustic data, a camera configured to detect image data, and a neural network processing unit configured to perform at least two different inference operations, wherein the neural network processing unit may be configured to drive an AI keyword recognition model trained to infer keywords based on acoustic data, and wherein the neural network processing unit may be configured to drive an AI gesture recognition model trained to infer a gesture based on image data in response to the keyword inference result.

The edge device further includes a central processing unit, wherein the central processing unit may generate a command to enter the first mode when there is no input for a predetermined period of time, and the power control unit may be configured to supply power to the microphone and to cut-off power to the camera in the first mode.

The neural network processing unit may be configured to stop the inference operation of the AI gesture recognition model in the first mode.

The central processing unit may be configured to receive the inference result of the AI keyword recognition model of the neural network processing unit and generate a command to enter the second mode, and the power control unit may be configured to supply power to the camera in the second mode.

The neural network processing unit may be configured to perform an inference operation of the AI gesture recognition model in the second mode.

The neural network processing unit may be a standalone neural network processing unit.

Image data and sound data including privacy data may be configured to be deleted after an inference operation by a neural network processing unit.

In the first mode, when a specific keyword is input to the microphone, the AI gesture recognition model may be driven in response to an inference result of the AI keyword recognition model of the neural network processing unit.

An edge device according to another embodiment of the present disclosure may include an input unit configured to provide a plurality of sensing data, and a neural network processing unit configured to drive a plurality of artificial neural network models, wherein among the plurality of artificial neural network models, the first artificial neural network model may be an artificial neural network model that operates at all times, and wherein the second artificial neural network model among the plurality of artificial neural network models may be an artificial neural network model configured to operate only under a preset condition.

The second artificial neural network model may be configured to be controlled whether to be driven or not according to the inference result of the first artificial neural network model.

The neural network processing unit further includes an NPU scheduler, and the NPU scheduler may be configured to determine a scheduling sequence based on structure data of a plurality of artificial neural network models or artificial neural network data locality information.

The neural network processing unit further includes a plurality of processing elements, wherein the NPU scheduler may be configured to determine the scheduling sequence based on the data size of the node data of each layer of the plurality of artificial neural network models and the weight of each network, and the structure data of the plurality of artificial neural network models or artificial neural network data locality information, and to allocate the processing elements according to the determined scheduling sequence.

The neural network processing unit further includes an NPU memory system, and the NPU scheduler may be configured to prioritize data stored in the NPU memory system.

The neural network processing unit according to another embodiment of the present disclosure may include a processing element array, an NPU memory system configured to store an artificial neural network model processed in the processing element array, an NPU scheduler configured to control the processing element array and the NPU memory system, and an NPU batch mode configured to infer a plurality of different input data using an artificial neural network model.

A plurality of different input data may be a plurality of image data.

The NPU batch mode may be configured to increase an operation frame by combining a plurality of image data.

The NPU batch mode may be configured to recycle weight data of an artificial neural network model to perform an inference operation on a plurality of different input data.

The NPU batch mode may be configured to convert a plurality of input data into one continuous data.

The neural network processing unit according to another embodiment of the present disclosure may include at least one processing element, an NPU memory system capable of storing an artificial neural network model that can be inferred by at least one processing element, and an NPU scheduler configured to control at least one processing element and an NPU memory system based on the artificial neural network model's structure data or artificial neural network data locality information.

The NPU scheduler may be configured to further receive structure data of the neural network processing unit.

The structure data of the neural network processing unit may include at least one of a memory size of an NPU memory system, a hierarchical structure of an NPU memory system, data on the number of at least one processing element, and an operator structure of at least one processing element.

The neural network processing unit (NPU) includes an artificial neural network model trained to perform inference function; an array of processing elements configured to infer input data using the artificial neural network model; an NPU memory system configured to communicate with the processing element array; and an NPU scheduler configured to control the processing element array and the NPU memory system. The NPU compares the data size of the artificial neural network model with the memory size of the NPU memory system. The artificial neural network model may be configured to be optimized in consideration of the memory size of the NPU memory system by at least one of the quantization algorithm, pruning algorithm, relearning algorithm, quantization recognition learning algorithm, model compression algorithm, and artificial intelligence-based optimization algorithm.

The artificial neural network model may be optimized for the neural network processing unit through an optimization system configured to communicate with the neural network processing unit.

The artificial neural network model may be optimized based on at least one of the artificial neural network model structure data or artificial neural network data locality information and the structure data of the processing unit.

In the artificial neural network model, a quantization algorithm can be applied after the pruning algorithm is applied.

In the artificial neural network model, after the pruning algorithm is applied, the quantization algorithm can be applied and then the relearning algorithm can be applied.

In the artificial neural network model, after the pruning algorithm is applied, the quantization algorithm is applied, after which the relearning algorithm is applied, and then a model compression algorithm can be applied.

The artificial neural network model includes a plurality of layers, each of the plurality of layers includes weight data, and each of the weight data may be pruned.

Among the weight data, one or more weight data having a relatively large data size may be preferentially pruned.

Among the weight data, one or more weight data having a relatively large computation amount may be preferentially pruned.

The artificial neural network model includes a plurality of layers, each of the plurality of layers includes node data and weight data, and the weight data may be quantized.

Node data can be quantized.

Node data and weight data of at least one layer may be quantized, respectively.

Among the weight data, one or more weight data having a relatively large size may be quantized with priority.

At least one node data having a relatively large size among the node data may be preferentially quantized.

The processing element array includes at least one processing element, and the at least one processing element may be configured to compute node data and weight data, each quantized in number of bits.

The processing element array further includes a bit quantization unit, and the number of bits of the output data of the processing element array may be configured to be quantized by the bit quantization unit.

The artificial neural network model is a quantized artificial neural network model, and the NPU memory system may be configured to store data of the artificial neural network model corresponding to the number of bits of the plurality of quantized weight data and the number of bits of the plurality of quantized node data of the artificial neural network model.

The artificial neural network model is a quantized artificial neural network model, and the processing element array may be configured to receive a plurality of quantized weight data and a plurality of quantized node data from the NPU memory system in response to the number of bits of the plurality of quantized weight data and the number of bits of the plurality of quantized node data of the artificial neural network model.

The neural network processing unit includes an artificial neural network model, a plurality of processing elements configured to process the artificial neural network model, an NPU memory system configured to supply data of the artificial neural network model to the processing element array, and an NPU scheduler configured to control the processing element array and the NPU memory system, and the artificial neural network model may be quantized by at least one grouping policy.

The at least one grouping policy may use at least one of the operation sequence of the artificial neural network model, the size of the computational amount of the artificial neural network model, and the size of memory usage of the artificial neural network model as the criterion for determining the at least one grouping policy.

At least one grouping policy is a plurality of grouping policies, and each of the plurality of grouping policies may determine an order of the grouping policies according to respective weight values.

Neural network processing unit, in which the artificial neural network model is quantized in an order according to at least one grouping policy having a predetermined order of grouped data.

In the artificial neural network model, a quantization recognition learning algorithm can be applied.

When the artificial neural network model is quantized according to the grouping policy, it can be quantized with reference to the inference accuracy of the artificial neural network model including the data group being quantized.

In the artificial neural network model, when the evaluated inference accuracy of the artificial neural network model including the data group being quantized is higher than the preset target inference accuracy, the number of bits of the artificial neural network model including the data group being quantized may be reduced.

In the artificial neural network model, if the evaluated inference accuracy of the artificial neural network model including the data group being quantized is less than the preset target inference accuracy, the quantization can be terminated by returning the data group being quantized to the moment when the target inference accuracy was high.

The neural network processing unit further includes an edge device connected to the neural network processing unit, and the artificial neural network model may be quantized according to the grouping policy order determined based on at least one data of the processing power of edge devices, the computational processing power of the neural network processing unit, the available memory bandwidth of the edge device, the available memory bandwidth of the neural network processing unit, the maximum memory bandwidth of the edge device, the maximum memory bandwidth of the neural network processing unit, the maximum memory latency of the edge device, and the maximum memory latency of the neural network processing unit.

The neural network processing unit includes an artificial neural network model, a plurality of processing elements configured to process the artificial neural network model, an NPU memory system configured to supply data of the artificial neural network model to the processing element array, and an NPU scheduler configured to control the processing element array and the NPU memory system, wherein the artificial neural network model may quantize node data of at least one layer or weight data of at least one layer of the artificial neural network model based on the memory size of the NPU memory system.

The NPU memory system may be configured to store the data of the quantized number of bits of each of node data of at least one layer or weight data of at least one layer of the artificial neural network model.

The number of bits of data input to each input unit of the plurality of processing elements may be configured to operate in correspondence with information about the number of bits of the quantized input data.

The edge device includes a main memory system and a neural network processing unit configured to communicate with the main memory system, and the neural network processing unit includes a processing element array, an NPU memory system, a processing element array, and an NPU scheduler configured to control the NPU memory system, and quantized node data, quantized weight data, quantized weight kernel, and/or quantized feature map of artificial neural network model stored in main memory system and NPU memory system may be quantized with reference to the memory size of the main memory system and the memory size of the NPU memory system.

Features, structures, effects, and the like described in the embodiments above are included in one embodiment of the present disclosure, and are not necessarily limited to only one embodiment. Furthermore, the features, structures, effects, and the like illustrated in each embodiment may be combined or modified for other embodiments by a person having ordinary knowledge in the art to which the embodiments belong. Accordingly, contents related to such combinations and modifications should be construed as being included in the scope of the present disclosure.

In addition, although the above has been described with reference to the embodiment, this is only an example and does not limit the present invention and those ordinary skilled person in the art to which the present disclosure pertains will appreciate that various modifications and applications not illustrated above are possible without departing from the essential characteristics of the present embodiment. For example, each element specifically shown in the embodiment can be modified and implemented. Thus, differences related to these modifications and applications should be construed as being included in the scope of the present disclosure defined in the appended claims.

[National R&D Project Supporting this Invention]

[Project unique number] 1711117015

[Task number] 2020-0-01297

[Name of Ministry] Ministry of Science and ICT

[Name of task management (specialized) institution] Information and Communication Planning and Evaluation Institute

[Research project name] Next-generation intelligent semiconductor technology development project

[Research project name] Deep learning processor technology development for advanced data reuse and ultra-low-power edge

[Contribution rate]

1/1

[Name of the organization performing the task] DeepX Co., Ltd.

[Research period] 2020 Apr. 1~2024 Dec. 31

What is claimed is:

1. A neural network processing unit (NPU) for processing an artificial neural network model compiled by a compiler, the NPU comprising:

a processing element array;

a SRAM memory configured to store at least one data of the artificial neural network model processed in the processing element array; and an NPU scheduler configured to control the processing element array and the SRAM memory based on predefined operation order information of the artificial neural network model processed by the processing element array, wherein the NPU scheduler is configured to assign, based on the predefined operation order information, a single memory address value of the SRAM memory for both a result value of a first layer of a first scheduling and an input data of a second layer of a second scheduling subsequent to the first scheduling, the input data of the second layer being the result value of the first layer remaining stored at the single memory address value without being relocated within the SRAM memory, and being provided to the processing element array.

2. The NPU of claim 1, wherein the processing element array includes a plurality of processing elements configured to perform MAC operations.

3. The NPU of claim 1, wherein the NPU scheduler is configured to control a read and write order of the processing element array and the SRAM memory.

4. The NPU of claim 1, wherein the NPU scheduler is configured to control the processing element array and the SRAM memory by analyzing predefined operation order information of the artificial neural network model.

5. The NPU of claim 1, wherein the NPU scheduler is configured to schedule an operation order of the artificial neural network model based on a structural data of the artificial neural network model or an artificial neural network data locality information.

6. The NPU of claim 1, wherein the NPU scheduler is configured to access a memory address value where a node data and a weight data of layers of the artificial neural network model are stored based on a predefined operation order information of the artificial neural network model.

7. The NPU of claim 1, wherein the NPU scheduler is configured to schedule a processing order based on a structural data from an input layer to an output layer of the artificial neural network or an artificial neural network data locality information.

8. The NPU of claim 1, wherein the SRAM memory includes static memory.

9. The NPU of claim 8, wherein the SRAM memory includes at least one of SRAM, MRAM, STT-MRAM, eMRAM, HBM, and OST-MRAM.

10. A neural network processing unit (NPU) for processing an artificial neural network model compiled by a compiler, the NPU comprising:

a processing element array;

a SRAM memory configured to store the artificial neural network model processed in the processing element array; and an NPU scheduler configured to control the processing element array and the SRAM memory based on predefined operation order information of the artificial neural network model processed by the processing element array, the processing element array being configured to perform MAC operation, and being configured to quantize and output a result of MAC operation, and wherein the NPU scheduler is configured to assign, based on the predefined operation order information, a single memory address value of the SRAM memory for both a result value of a first layer of a first scheduling and an input data of a second layer of a second scheduling subsequent to the first scheduling, the input data of the second layer being the result value of the first layer remaining stored at the single memory address value without being relocated within the SRAM memory, and being provided to the processing element array.

11. The NPU of claim 10, wherein the processing element array includes a multiplier, an adder, an accumulator, and a bit quantization unit.

12. The NPU of claim 10, wherein the NPU scheduler is configured to recognize reusable variable values and reusable constant values based on predefined operation order information of the artificial neural network model and configured to control to reuse the SRAM memory using the reusable variable value and the reusable constant value.

13. The NPU of claim 10, wherein the NPU scheduler is configured to schedule an operation order of an artificial neural network (ANN) model based on ANN data locality information.

14. A neural network processing unit (NPU) comprising:

a processing element array;

a SRAM memory configured to store at least one data of an artificial neural network model processed in the processing element array; and an NPU scheduler configured to control the processing element array and the SRAM memory based on predefined operation order information of the artificial neural network model processed by the processing element array, wherein the NPU scheduler is configured to assign, based on the predefined operation order information, a single memory address value of the SRAM memory for both a result value of a first layer of a first scheduling and an input data of a second layer of a second scheduling subsequent to the first scheduling, the input data of the second layer being the result value of the first layer remaining stored at the single memory address value without being relocated within the SRAM memory, and being provided to the processing element array.

15. The NPU of claim 14, wherein the processing element array includes a plurality of processing elements configured to perform MAC operations.

16. The NPU of claim 14, wherein the NPU scheduler is configured to control a read and write order of the processing element array and the SRAM memory.

17. The NPU of claim 14, wherein the NPU scheduler is configured to control the processing element array and the SRAM memory by analyzing predefined operation order information of the artificial neural network model.

18. The NPU of claim 14, wherein the NPU scheduler is configured to schedule an operation order of the artificial neural network model based on a structural data of the artificial neural network model or an artificial neural network data locality information.

19. The NPU of claim 14, wherein the NPU scheduler is configured to access a memory address value where a node data and a weight data of layers of the artificial neural network model are stored based on a predefined operation order information of the artificial neural network model.

20. The NPU of claim 14, wherein the NPU scheduler is configured to schedule a processing order based on a structural data from an input layer to an output layer of the artificial neural network or an artificial neural network data locality information.

* * * * *